(12) United States Patent
Lehti

(10) Patent No.: US 9,581,469 B2
(45) Date of Patent: Feb. 28, 2017

(54) RETRACTABLE ENVIRONMENT DETECTOR

(71) Applicant: Michael Lehti, Ashburn (CA)

(72) Inventor: Michael Lehti, Ashburn (CA)

( * ) Notice: Subject to any disclaimer, the term of this patent is extended or adjusted under 35 U.S.C. 154(b) by 310 days.

(21) Appl. No.: 14/552,524

(22) Filed: Nov. 25, 2014

(65) Prior Publication Data

US 2015/0077233 A1 Mar. 19, 2015

Related U.S. Application Data

(63) Continuation of application No. 13/541,657, filed on Jul. 3, 2012, now Pat. No. 8,904,862.

(51) Int. Cl.
| | | |
|---|---|---|
| *G08B 17/10* | (2006.01) | |
| *G01D 11/24* | (2006.01) | |
| *G01L 19/14* | (2006.01) | |
| *G01P 1/02* | (2006.01) | |
| *G08B 17/113* | (2006.01) | |
| *G08B 3/10* | (2006.01) | |

(52) U.S. Cl.
CPC .............. *G01D 11/245* (2013.01); *G08B 3/10* (2013.01); *G08B 17/10* (2013.01); *G08B 17/113* (2013.01)

(58) Field of Classification Search
CPC ..... G08B 17/113; G08B 17/10; G08B 17/107; G08B 13/08; G08B 13/1481

USPC .... 340/384.1, 515, 628–630, 545.1; 73/431; 250/574

See application file for complete search history.

(56) References Cited

U.S. PATENT DOCUMENTS

| | | | | |
|---|---|---|---|---|
| 4,374,329 A | * | 2/1983 | Schoenfelder | G08B 17/113 250/574 |
| 6,215,396 B1 | * | 4/2001 | Script | G08B 13/08 340/539.1 |
| 6,288,647 B1 | * | 9/2001 | Yamano | G08B 17/107 250/574 |
| 6,522,254 B1 | * | 2/2003 | Yamano | G08B 17/113 250/574 |
| 8,904,862 B2 | * | 12/2014 | Lehti | G08B 17/10 73/431 |
| 2010/0259376 A1 | * | 10/2010 | Hong | A62C 37/50 340/515 |
| 2014/0007678 A1 | * | 1/2014 | Lehti | G08B 17/10 73/431 |
| 2015/0077233 A1 | * | 3/2015 | Lehti | G08B 17/10 340/384.1 |

* cited by examiner

*Primary Examiner* — Hoi Lau
(74) *Attorney, Agent, or Firm* — Michael G. Smith, Esq.

(57) ABSTRACT

Systems, methods and apparatus are provided through which in some implementations a retractable environmental detector system includes two portions, a base or retractor unit that can be attached to a ceiling and a retractable environmental detector operably coupled to the base or retractor through a flexible retractable connector that retracts and extends the retractable environmental detector from and to the base or retractor.

18 Claims, 76 Drawing Sheets

3000

RETRACTABLE ENVIRONMENT DETECTOR

RELATED APPLICATIONS

This application is a continuation of, and claims the benefit and priority under 35 U.S.C. 120 of co-pending U.S. Original application Ser. No. 13/541,657 filed on 3 Jul. 2012, which is hereby incorporated by reference in its entirety.

FIELD

This disclosure relates generally to environmental detectors, and more particularly to the mounting apparatus of environmental detectors.

BACKGROUND

Smoke detectors and other environmental detectors are fixedly attached to a ceiling or other structural component of a building.

BRIEF DESCRIPTION

The above-mentioned shortcomings, disadvantages and problems are addressed herein, which will be understood by reading and studying the following specification.

In one aspect, an apparatus includes a movement actuator and a smoke detector moveably coupled to the movement actuator.

In another aspect, a retractable smoke detector system includes two portions, a base or retractor unit that can be attached to a ceiling and a retractable smoke detector operably coupled to the base or retractor through a flexible retractable connector that retracts and extends the retractable smoke detector from and to the base or retractor.

Apparatus, systems, and methods of varying scope are described herein. In addition to the aspects and advantages described in this summary, further aspects and advantages will become apparent by reference to the drawings and by reading the detailed description—that follows.

BRIEF DESCRIPTION OF THE DRAWINGS

FIG. 1 illustrates a human operator operating a retractable smoke detector system with a pull-down string in which the retractable smoke detector system is in a retracted position, according to an implementation;

FIG. 2 illustrates a human operator operating a retractable smoke detector assembly with a pull-down pole having a hook, according to an implementation;

FIG. 3 illustrates a human operator operating a retractable smoke detector assembly with a pull-down string in which the retractable smoke detector assembly is in an extended position, according to an implementation;

FIG. 4 is a bottom-view of an isometric block diagram of a retractable environmental detector system with a pull-down string shown with an environmental detector assembly in which the retractable environmental detector assembly is in a retracted position, according to an implementation;

FIG. 5 is a side view block diagram of a retractable environmental detector system with a pull-down string in which the retractable environmental detector system is in a retracted position, according to an implementation;

FIG. 6 is a bottom view block diagram of a retractable environmental detector system, according to an implementation;

FIG. 7 is a side view block diagram of a retractable environmental detector system with a pull-down string without an environmental detector assembly, according to an implementation;

FIG. 8 is a top-view of an isometric block diagram of a retractable environmental detector system with a pull-down string shown with an environmental detector assembly in which the retractable environmental detector assembly is in an extended position, according to an implementation;

FIG. 9 is a bottom-view of an isometric block diagram of a retractable environmental detector system with a pull-down string shown with an environmental detector assembly in which the retractable environmental detector assembly is in an extended position, according to an implementation;

FIG. 10 is a bottom-view of an isometric block diagram of a retractable environmental detector system with a pull-down string having a housing top mounting plate for the environmental detector assembly in an extended position, according to an implementation;

FIG. 11 is a bottom-view of an exploded isometric block diagram of a retractable environmental detector system with a pull-down string, according to an implementation;

FIG. 12 is a bottom-view of an exploded isometric block diagram of a retractable environmental detector system in an extended position having an internal clockspring and a cable incorporated inside the environmental detector, according to an implementation;

FIG. 13 is a top-view of an isometric block diagram of a retractable environmental detector system in a retracted position having an internal clockspring and a cable incorporated inside the environmental detector, according to an implementation;

FIG. 14 is a bottom-view of an isometric block diagram of a retractable environmental detector system in a retracted position having an internal clockspring and a cable incorporated inside the environmental detector and having a rotatable U-coupling at the middle of the base of the retractable environmental detector system, according to an implementation;

FIG. 15 is a side view block diagram of a retractable environmental detector system in a retracted position mounted on a ceiling having an internal clockspring and a cable incorporated inside the environmental detector and having a rotatable U-coupling at the middle of the base of the retractable environmental detector assembly, according to an implementation;

FIG. 16 is a side view block diagram of a retractable environmental detector system in a retracted position having an internal clockspring and a cable incorporated inside the environmental detector and having a rotatable U-coupling at the middle of the base of the retractable environmental detector system, according to an implementation;

FIG. 17 is a bottom view block diagram of a retractable environmental detector system in a retracted position having an internal clockspring and a cable incorporated inside the environmental detector, according to an implementation;

FIG. 18 is a top-view of an isometric block diagram of a retractable environmental detector system in an extended position having an internal clockspring and a cable incorporated inside the environmental detector, according to an implementation;

FIG. 19 is a bottom-view of an isometric block diagram of a retractable environmental detector system in an extended position having an internal clockspring and a cable incorporated inside the environmental detector, according to an implementation;

FIG. 20 is a bottom-view of an exploded isometric block diagram of a retractable environmental detector system having an internal clockspring and a cable incorporated inside the environmental detector, according to an implementation;

FIG. 21 is a top-view of an isometric block diagram of a retractable environmental detector assembly in a retracted position having a clockspring incorporated into a retractor of the retractable environmental detector system, according to an implementation;

FIG. 22 is a top-view of an isometric block diagram of a housing top of a retractable environmental detector assembly, according to an implementation;

FIG. 23 is a side view block diagram of a retractable environmental detector assembly in a retracted position having a clockspring incorporated into a retractor and having a rotatable U-coupling at the middle of the cover of the retractable environmental detector assembly, according to an implementation;

FIG. 24 is a bottom view block diagram of a retractable environmental detector assembly in a retracted position having a clockspring incorporated into a retractor of the environmental detector, according to an implementation;

FIG. 25 is an bottom-view of an exploded isometric block diagram of a retractable environmental detector assembly having a clockspring incorporated into a retractor of the retractable environmental detector assembly, according to an implementation;

FIG. 26 is a top-view of an isometric block diagram of a retractable environmental detector assembly in an extended position having a clockspring incorporated into a retractor of the retractable environmental detector assembly, according to an implementation;

FIG. 27 is a bottom-view of an isometric block diagram of a retractable environmental detector assembly in an extended position having a clockspring incorporated into a retractor of the retractable environmental detector assembly, according to an implementation;

FIG. 28 is a bottom-view of an exploded isometric block diagram of a retractable environmental detector assembly having a clockspring incorporated into a retractor of the retractable environmental detector assembly, according to an implementation;

FIG. 29 is a bottom-view of an isometric block diagram of a retractable environmental detector assembly having a clockspring incorporated into a retractor of the retractable environmental detector assembly, according to an implementation;

FIG. 30 is a bottom-view of an isometric block diagram of a retractable environmental detector assembly having an electric motor and cable inside the environmental detector to retract and extend the environmental detector, according to an implementation;

FIG. 31 is a top-view of an isometric block diagram of a retractable environmental detector assembly in a retracted position having an electric motor and cable inside the environmental detector to retract and extend the environmental detector, according to an implementation;

FIG. 32 is a side view block diagram of a retractable environmental detector assembly in a retracted position mounted on a ceiling having an electric motor and cable inside the environmental detector to retract and extend the environmental detector, according to an implementation;

FIG. 33 is a side view block diagram of a retractable environmental detector assembly in a retracted position having an electric motor and cable inside the environmental detector to retract and extend the environmental detector, according to an implementation;

FIG. 34 is a bottom-view of an isometric block diagram of a cover of a retractable environmental detector assembly having an electric motor and cable inside the environmental detector to retract and extend the environmental detector, according to an implementation;

FIG. 35 is a top-view of an isometric block diagram of a base for a retractable environmental detector assembly having an electric motor and cable inside the environmental detector to retract and extend the environmental detector, according to an implementation;

FIG. 36 is a bottom-view of an exploded isometric block diagram of a retractable environmental detector assembly in an extended position detector having an electric motor and cable inside the environmental detector to retract and extend the environmental detector, according to an implementation;

FIG. 37 is a top-view of an isometric block diagram of a retractable environmental detector assembly in an extended position having an electric motor and cable inside the environmental detector to retract and extend the environmental detector, according to an implementation;

FIG. 38 is a bottom-view of an isometric block diagram of a retractable environmental detector assembly in an extended position having an electric motor and cable inside the environmental detector to retract and extend the environmental detector, according to an implementation;

FIG. 39 is a bottom-view of an isometric block diagram of a retractable environmental detector assembly having an electric motor and cable inside the environmental detector to retract and extend the environmental detector, according to an implementation;

FIG. 40 is a bottom-view of an isometric block diagram of a retractable environmental detector assembly having an electric motor and cable inside the retractor to retract and extend the environmental detector, according to an implementation;

FIG. 41 is a side view block diagram of a retractable environmental detector assembly in a retracted position having an electric motor and cable inside the retractor to retract and extend the environmental detector, according to an implementation;

FIG. 42 is a bottom view block diagram of a retractable environmental detector assembly in a retracted position having an electric motor and cable inside the retractor to retract and extend the environmental detector, according to an implementation;

FIG. 43 is a side view block diagram of a retractable environmental detector assembly in a retracted position having an electric motor and cable inside the retractor to retract and extend the environmental detector, according to an implementation;

FIG. 44 is a top-view of an isometric block diagram of a retractable environmental detector assembly in an extended position having an electric motor and cable inside the retractor to retract and extend the environmental detector, according to an implementation;

FIG. 45 is a bottom-view of an isometric block diagram of a retractable environmental detector assembly in an extended position having an electric motor and cable inside the retractor to retract and extend the environmental detector, according to an implementation;

FIG. 46 is a bottom-view of an isometric block diagram of a retractor of a retractable environmental detector assembly in an extended position having an electric motor and cable inside the retractor to retract and extend the environmental detector, according to an implementation;

FIG. 47 is a bottom-view of an exploded isometric block diagram of a retractor of a retractable environmental detector assembly in an extended position having an electric motor and cable inside the retractor to retract and extend the environmental detector, according to an implementation;

FIG. 48 is a side view block diagram of a retractable environmental detector assembly in a retracted position mounted on a ceiling having remote motor wires implemented by electrical cable wires and also having a battery and motor inside the environmental detector housing, according to an implementation;

FIG. 49 is a bottom view block diagram of a retractable environmental detector assembly in a retracted position having remote motor wires implemented by electrical cable wires and also having a battery and motor inside the environmental detector housing, according to an implementation;

FIG. 50 is a side view block diagram of a retractable environmental detector assembly in a retracted position having remote motor wires implemented by electrical cable wires and also having a battery and motor inside the environmental detector housing, according to an implementation;

FIG. 51 is a top-view of an isometric block diagram of a base of a retractable environmental detector assembly in an extended position having remote motor wires implemented by electrical cable wires and also having a battery and motor inside the environmental detector housing, according to an implementation;

FIG. 52 is a bottom-view of an isometric block diagram of a retractable environmental detector assembly in an extended position having remote motor wires implemented by electrical cable wires and also having a battery and motor inside the environmental detector housing with the cover of the environmental detector removed, according to an implementation;

FIG. 53 is a top-view of an isometric block diagram of a retractable environmental detector assembly in an extended position having remote motor wires implemented by electrical cable wires and also having a battery and motor inside the environmental detector housing, according to an implementation;

FIG. 54 is a bottom-view of an isometric block diagram of a retractable environmental detector assembly in an extended position having remote motor wires implemented by electrical cable wires and also having a battery and motor inside the environmental detector housing, according to an implementation;

FIG. 55 is a bottom-view of an exploded isometric block diagram of a retractable environmental detector assembly in an extended position having remote motor wires implemented by electrical cable wires and also having a battery and motor inside the environmental detector housing with ring gear hub cover removed, according to an implementation;

FIG. 56 is bottom-view of an exploded isometric block diagram of a retractable environmental detector assembly in an extended position having remote motor wires implemented by electrical cable wires and also having a battery and motor inside the environmental detector housing with ring gear hub cover and wire busing terminal removed, according to an implementation;

FIG. 57 is a bottom-view of an exploded isometric block diagram of a retractable environmental detector assembly having remote motor wires implemented by electrical cable wires and also having a battery and motor inside the environmental detector housing, according to an implementation;

FIG. 58 is a top-view of an isometric block diagram of a retractable environmental detector assembly in a retracted position having remote motor wires implemented by electrical cable wires and also having a battery and motor inside the environmental detector housing, according to an implementation;

FIG. 59 is a bottom-view of an isometric of a retractable environmental detector assembly in a retracted position having remote motor wires implemented by electrical cable wires and also having a battery and motor inside the environmental detector housing, according to an implementation;

DETAILED DESCRIPTION

In the following detailed description, reference is made to the accompanying drawings that form a part hereof, and in which is shown by way of illustration specific implementations which may be practiced. These implementations are described in sufficient detail to enable those skilled in the art to practice the implementations, and it is to be understood that other implementations may be utilized and that logical, mechanical, electrical and other changes may be made without departing from the scope of the implementations. The following detailed description is, therefore, not to be taken in a limiting sense.

The detailed description is divided into five sections. In the first section, apparatus of implementations are described. In the second section, implementations of methods are described. In the third section, a hardware and the operating environment in conjunction with which implementations may be practiced are described. Finally, in the fourth section, a conclusion of the detailed description is provided.

Apparatus Implementations

In the previous section, a system level overview of the operation of an implementation was described. In this section, the particular apparatus of such an implementation are described by reference to a series of diagrams.

Figure 1:
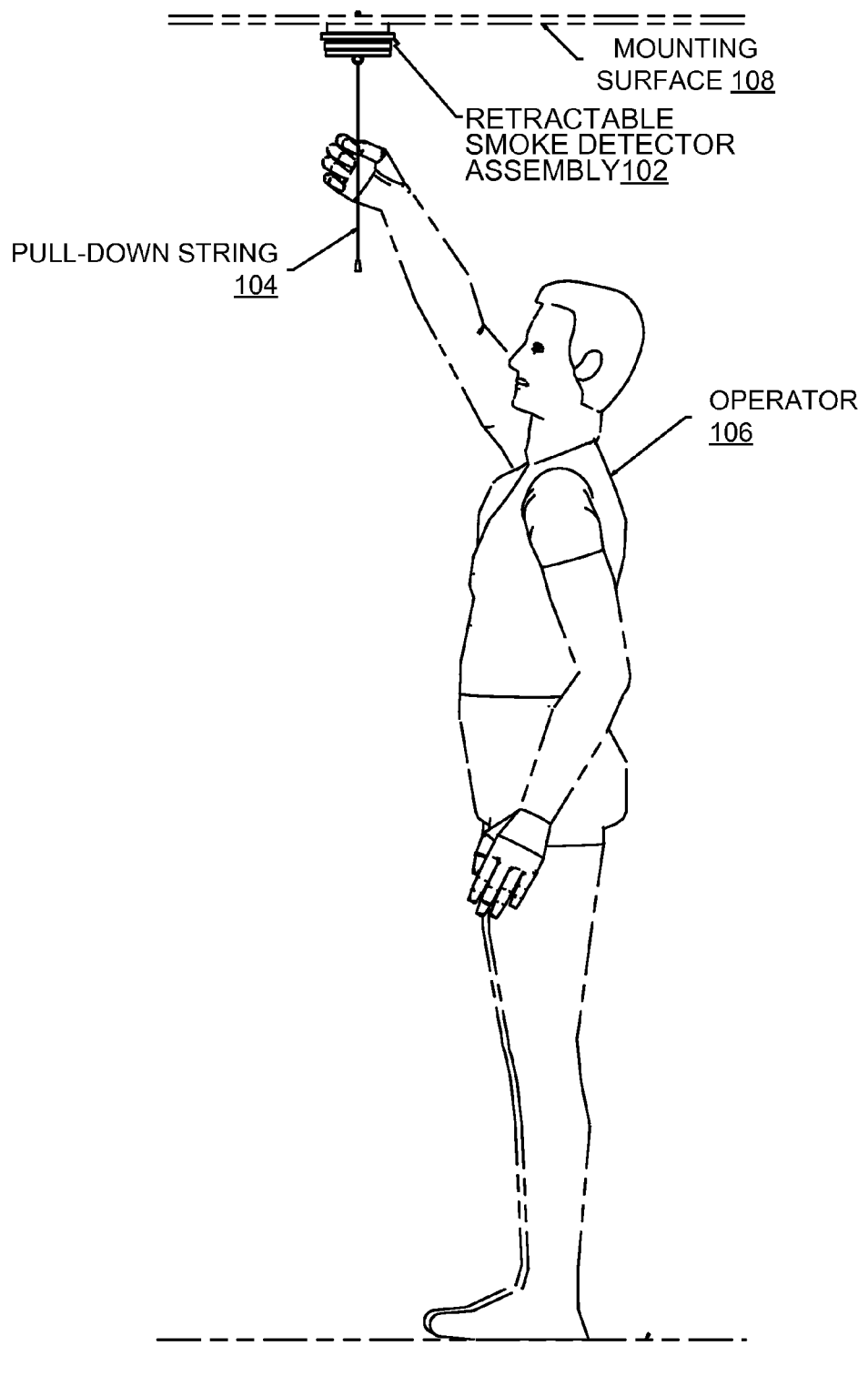
FIG. 1-3 illustrate a human operator operating a retractable smoke detector system, according to an implementation.
Figure 2:
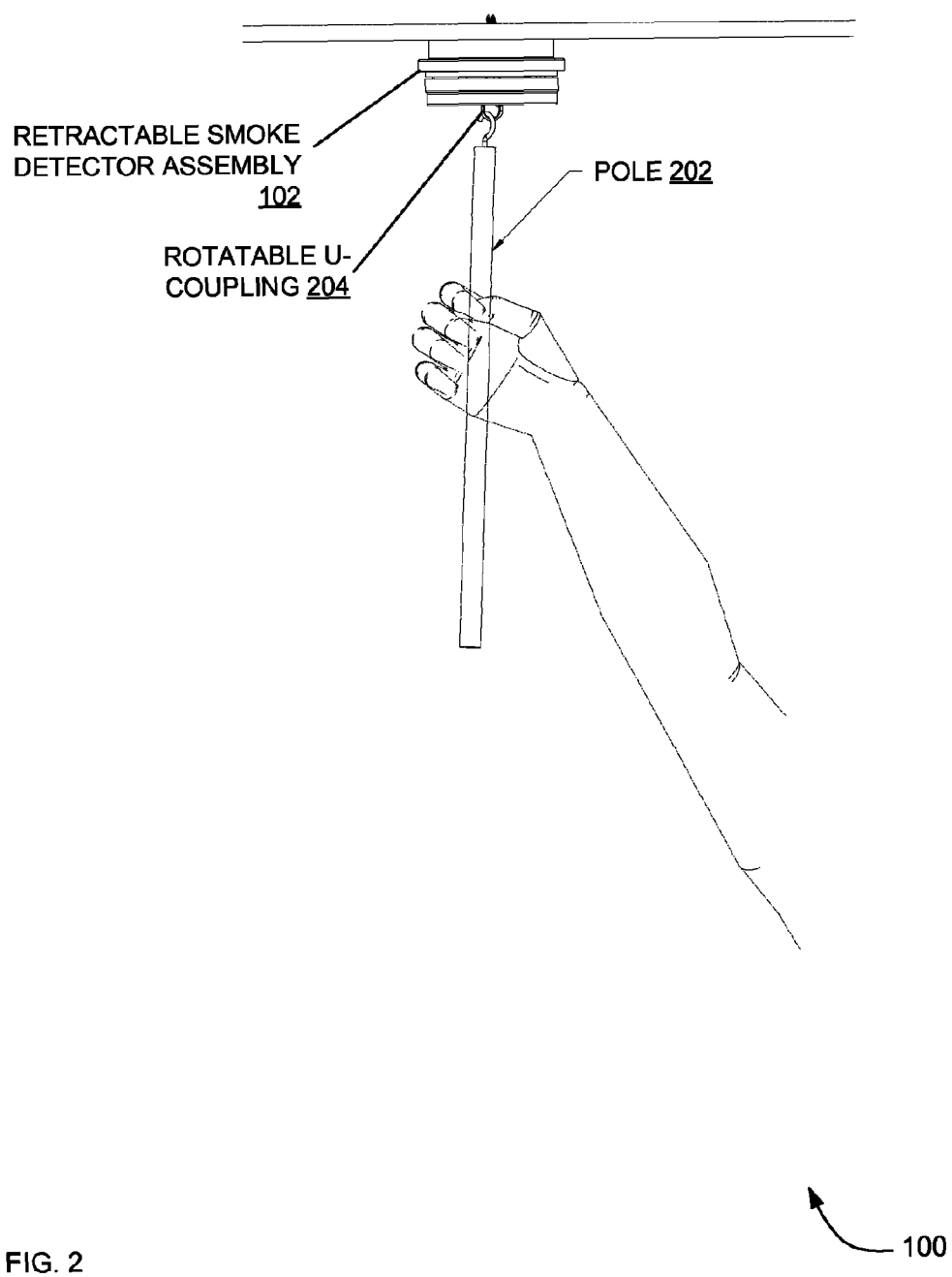
Figure 3:
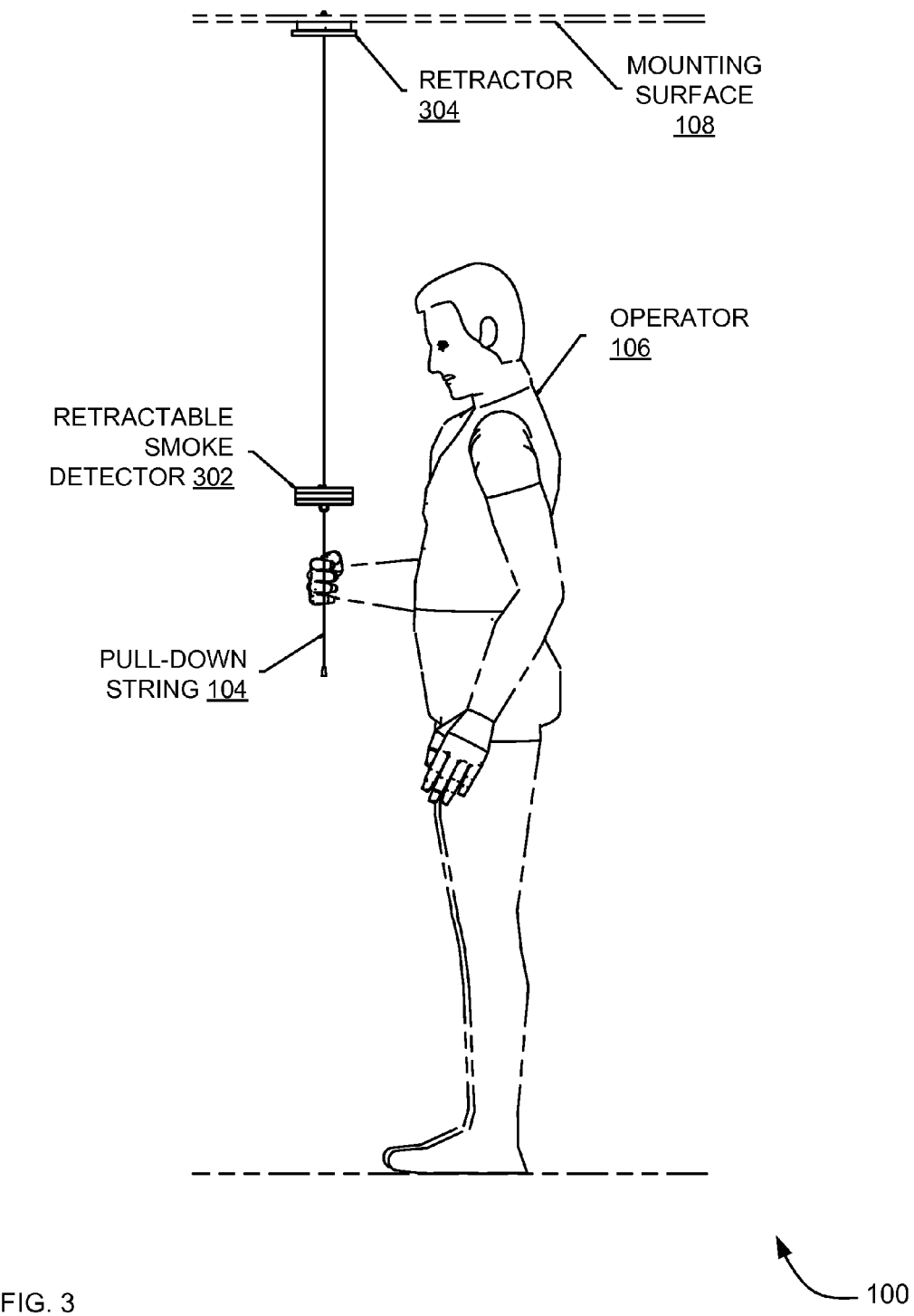

FIG. 1-3 illustrate a scenario 100 in which a human operator operates a retractable smoke detector assembly, according to an implementation.

FIG. 1 illustrates a scenario 100 in which a human operator operates a retractable smoke detector assembly with a pull-down string in which the retractable smoke detector assembly is in a retracted position, according to an implementation.

The retractable smoke detector assembly 102 includes a housing (not labeled) and the retractor (not labeled). The retractable smoke detector assembly 102 in scenario 100 is shown in a retracted position in which housing and the retractor are substantially in contact to each other. The retractable smoke detector assembly 102 includes a pull-down string 104 which can be grasped by an operator 106 to either retract the retractable smoke detector assembly 102 or to extend the retractable smoke detector assembly 102. The retractor of the retractable smoke detector assembly 102 is mountable to a mounting surface 108, such as a ceiling, a roof or a wall. Other implementations of the retractable smoke detector assembly 102 not include the pull-down string 104, such as shown in FIG. 2.

FIG. 2 illustrates a scenario 100 in which a human operator operating a retractable smoke detector assembly 102 with a pull-down pole having a hook, according to an implementation.

In FIG. 2, the retractable smoke detector assembly 102 is operably coupled to a pole 202 with a hook at an end of the pole 202. The hook at the end of the pole 202 is engaged with a rotatable U-coupling 204 on the bottom of the retractable smoke detector assembly 102. The rotatable U-coupling 202 is grasped by the operator 106 through the hook at the end of the rotatable U-coupling 204 either retract the retractable smoke detector assembly 102 or to extend the retractable smoke detector assembly 102. The retractable smoke detector assembly 102 as shown in FIG. 2 does not include a pull-down string 104. However other implementations of the retractable smoke detector assembly 102 that do include a pull-down string 104 are nonetheless operable with the pole 202 having the hook at the end because the presence of a pull-down string 104 attached to the rotatable U-coupling 204 does not preclude being engaged by the hook at the end of the pole 202 through the rotatable U-coupling 204.

FIG. 3 illustrates a scenario 100 in which a human operator operates a retractable smoke detector assembly with a pull-down string in which the retractable smoke detector assembly is in an extended position, according to an implementation.

In FIG. 3, the retractable smoke detector assembly 102 includes a retractable smoke detector 302 and a retractor 304. The retractable smoke detector assembly 102 in scenario 100 is shown in an extended position in which the retractable smoke detector 302 and the retractor 304 are not substantially in contact to each other. The retractable smoke detector assembly 102 includes a pull-down string 104 which can be grasped by an operator 106 to either extend the retractable smoke detector assembly 102, as shown in FIG. 3, or to retract the retractable smoke detector assembly 102. The retractor 304 of the retractable smoke detector assembly 102 is mountable to a mounting surface 108, such as a ceiling, a roof or a wall. Other implementations of the retractable smoke detector assembly 102 do not include the pull-down string 104, such as shown in FIG. 2.

FIG. 4-11 illustrate a retractable environmental detector system 400 having a clockspring inside the base attached to the ceiling, according to an implementation. The retractable environmental detector system 400 in FIG. 4-11 is one example of the retractable environmental detector system 102 in FIG. 1-3.

Figure 4:
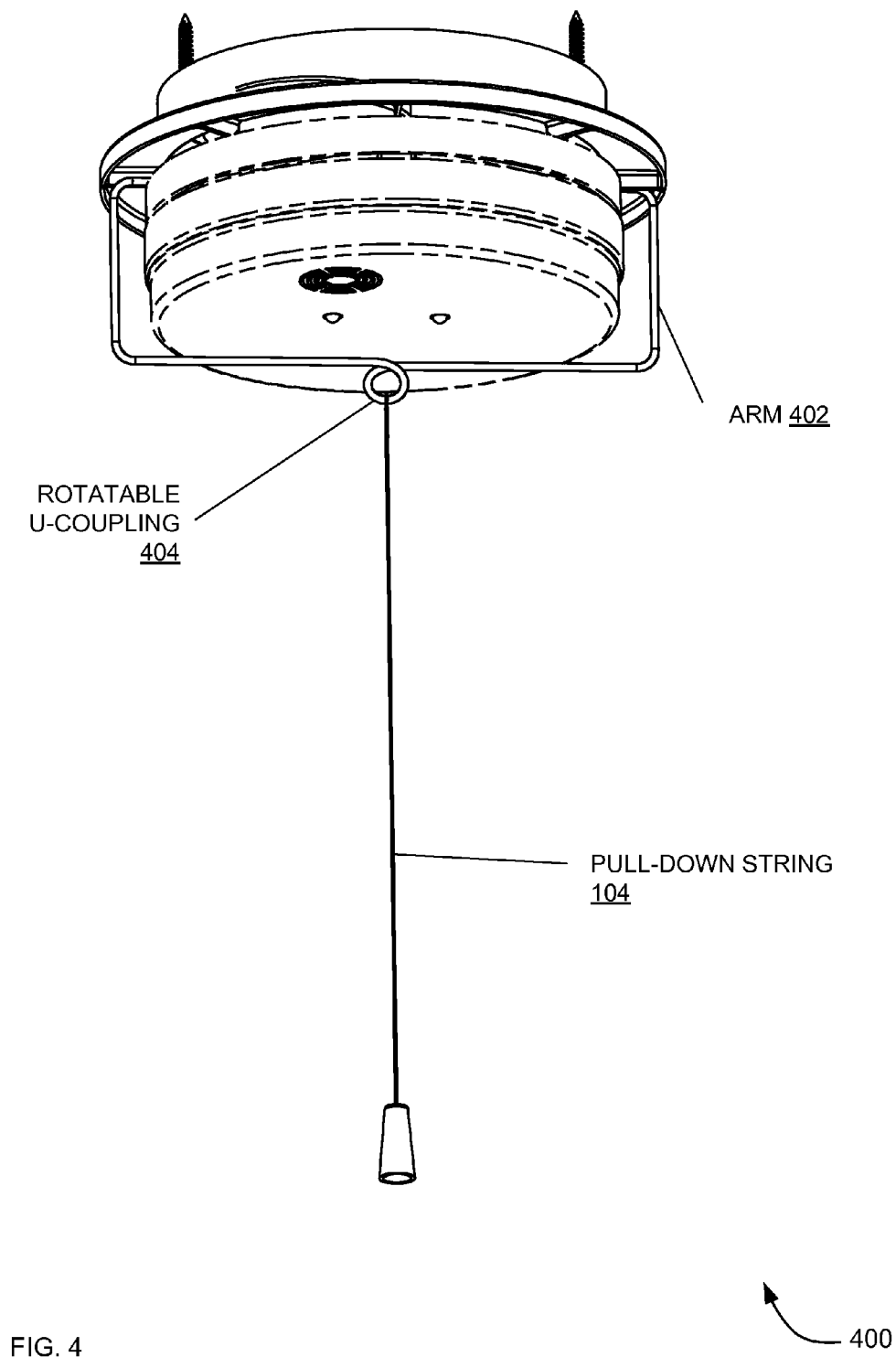
FIG. 4-11 illustrate a retractable smoke detector system having a clockspring inside the base attached to the ceiling, according to an implementation.

FIG. 4 is a bottom-view of an isometric block diagram of a retractable environmental detector system 400 with a pull-down string in which the retractable environmental detector system 400 shown with an environmental detector assembly is in a retracted position, according to an implementation. One example of an environmental detector is a smoke detector in which an ionization detector has an ionization chamber and a source of ionizing radiation. The source of ionizing radiation is a minute quantity of americium-241 (perhaps ⅕₀₀₀th of a gram), which is a source of alpha particles (helium nuclei). The ionization chamber consists of two plates separated by about a centimeter. The battery applies a voltage to the plates, charging one plate positive and the other plate negative. Alpha particles constantly released by the americium knock electrons off of the atoms in the air, ionizing the oxygen and nitrogen atoms in the chamber. The positively-charged oxygen and nitrogen atoms are attracted to the negative plate and the electrons are attracted to the positive plate, generating a small, continuous electric current. When smoke enters the ionization chamber, the smoke particles attach to the ions and neutralize them, so the smoke particles do not reach the plate. The drop in current between the plates triggers the alarm.

In another example of a smoke detector, smoke blocks a light beam between photoelectric detector(s) and the reduction in light reaching a photocell sets off the alarm. In one type of photoelectric unit, however, light is scattered by smoke particles onto a photocell, initiating an alarm.

Carbon monoxide detectors trigger an alarm based on an accumulation of carbon monoxide over time. Detectors may be based on a chemical reaction causing a color change, an electrochemical reaction that produces current to trigger an alarm, or a semiconductor sensor that changes electrical resistance in the presence of CO.

In FIG. 4, a retractable environmental detector system 400 includes an arm 402 that is attached to the top of the retractable environmental detector system 400. The arm of 402 includes a rotatable U-coupling 404 to which a pull-down string 104 is operably attached.

Figure 5:
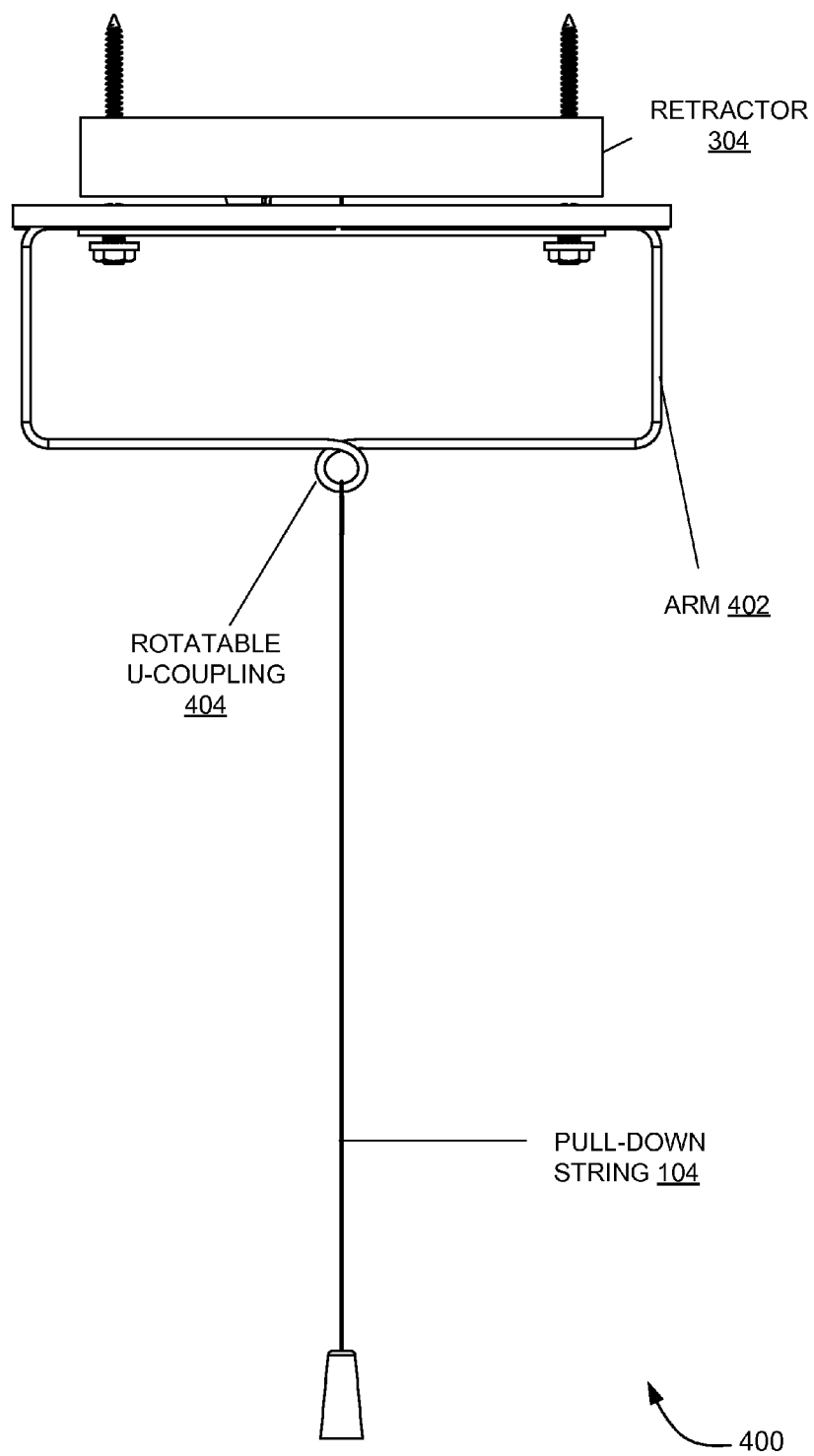

FIG. 5 is a side view block diagram of a retractable environmental detector system 400 with a pull-down string 104 in which the retractable environmental detector system is in a retracted position, according to an implementation.

In FIG. 5, the retractable environmental detector system 400 is attached to a retractor 304. Similar to FIG. 4, the retractable environmental detector system 400 includes an arm 402 that is attached to the top of the retractable environmental detector system 400. The arm of 402 includes a rotatable U-coupling 404 to which a pull-down string 104 is operably attached.

Figure 6:
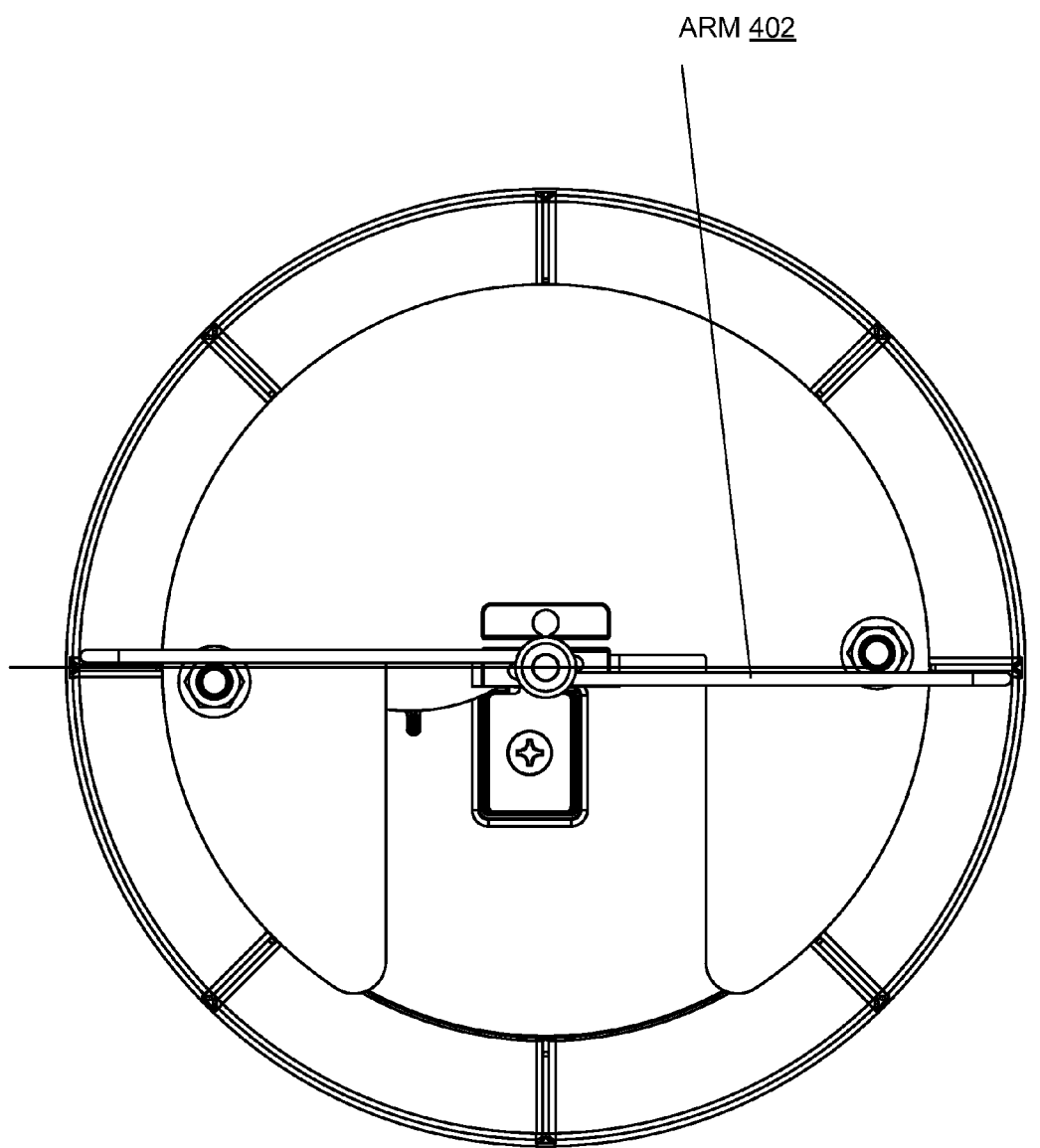

FIG. 6 is a bottom view block diagram of a retractable environmental detector system 400, according to an implementation. Similar to FIGS. 4 and 5, the retractable environmental detector system 400 includes an arm 402 that is attached to the top of the retractable environmental detector system 400.

Figure 7:
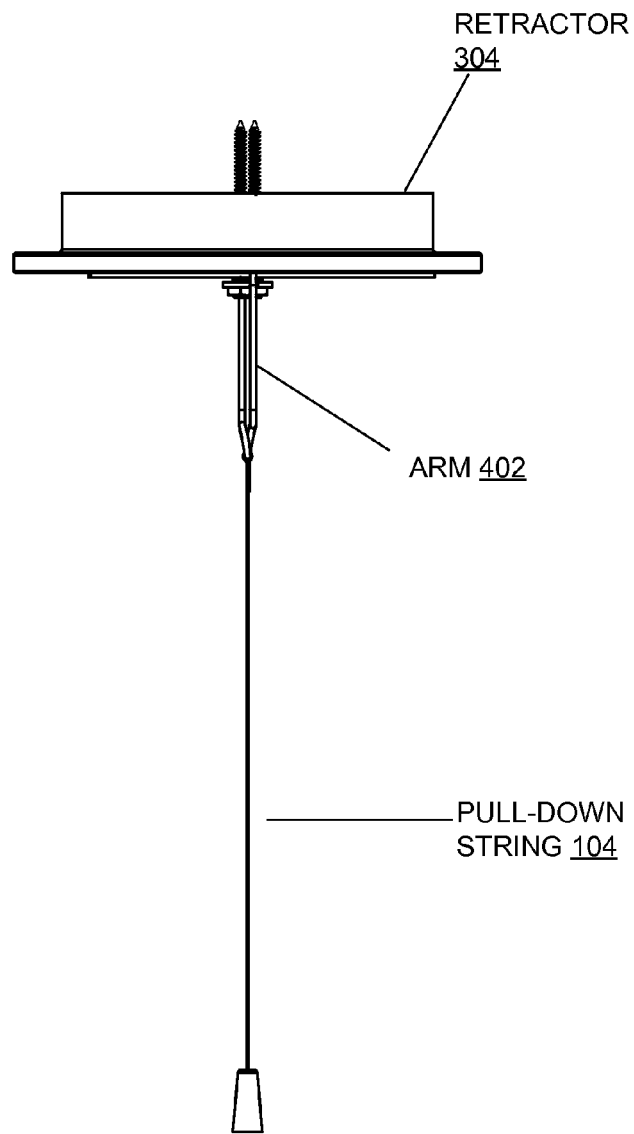
Figure 7:

FIG. 7 is a side view block diagram of a retractable environmental detector system 400 with a pull-down string and not showing an environmental detector assembly, according to an implementation. Similar to FIGS. 4-6, an arm 402 is attached to an apparatus that is attached to a retractor 304. The arm 402 is operably attached to a pull-down string 104.

Figure 8:
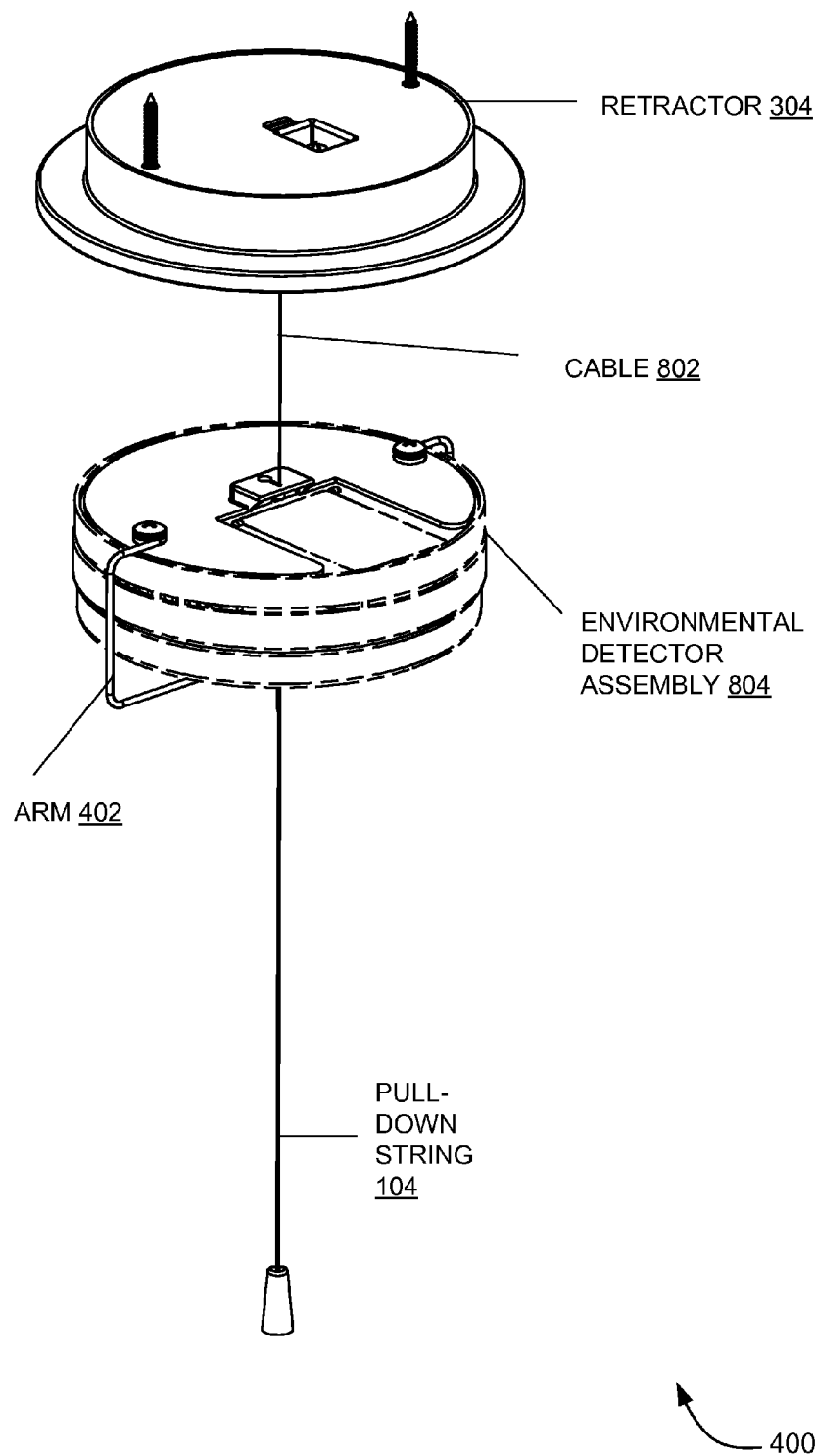

FIG. 8 is a top-view of an isometric block diagram of a retractable environmental detector system 400 with a pull-down string in which the retractable environmental detector assembly shown with an attached environmental detector assembly is in an extended position, according to an implementation.

In FIG. 8, the retractable environmental detector system 400 includes the environmental detector assembly 804 and the retractor 304. The retractable environmental detector system 400 in FIG. 8 is shown in an extended position in which the environmental detector assembly 804 and the retractor 304 are not substantially in contact to each other. The retractable environmental detector system 400 includes a pull-down string 104 which can be grasped by an operator to either extend the retractable environmental system 400, as shown in FIG. 8, or to retract the retractable environmental detector system 400. The retractor 304 of the retractable environmental detector system 400 is mountable to a mounting surface (not shown), such as a ceiling, a roof or a wall. Other implementations of the retractable environmental detector system 400 do not include the pull-down string 104, such as shown in FIG. 2. Similar to FIG. 4-7, an arm 402 is attached to an apparatus that is attached to a retractor 304. The arm 402 is operably attached to a pull-down string 104.

The retractable environmental detector system 400 includes a cable 802 or other flexible connector such as a cable 802 or other flexible connector such as a string that is fixedly attached to the top of the environmental detector assembly 804 and that is movably attached to the retractor 304.

Figure 9:
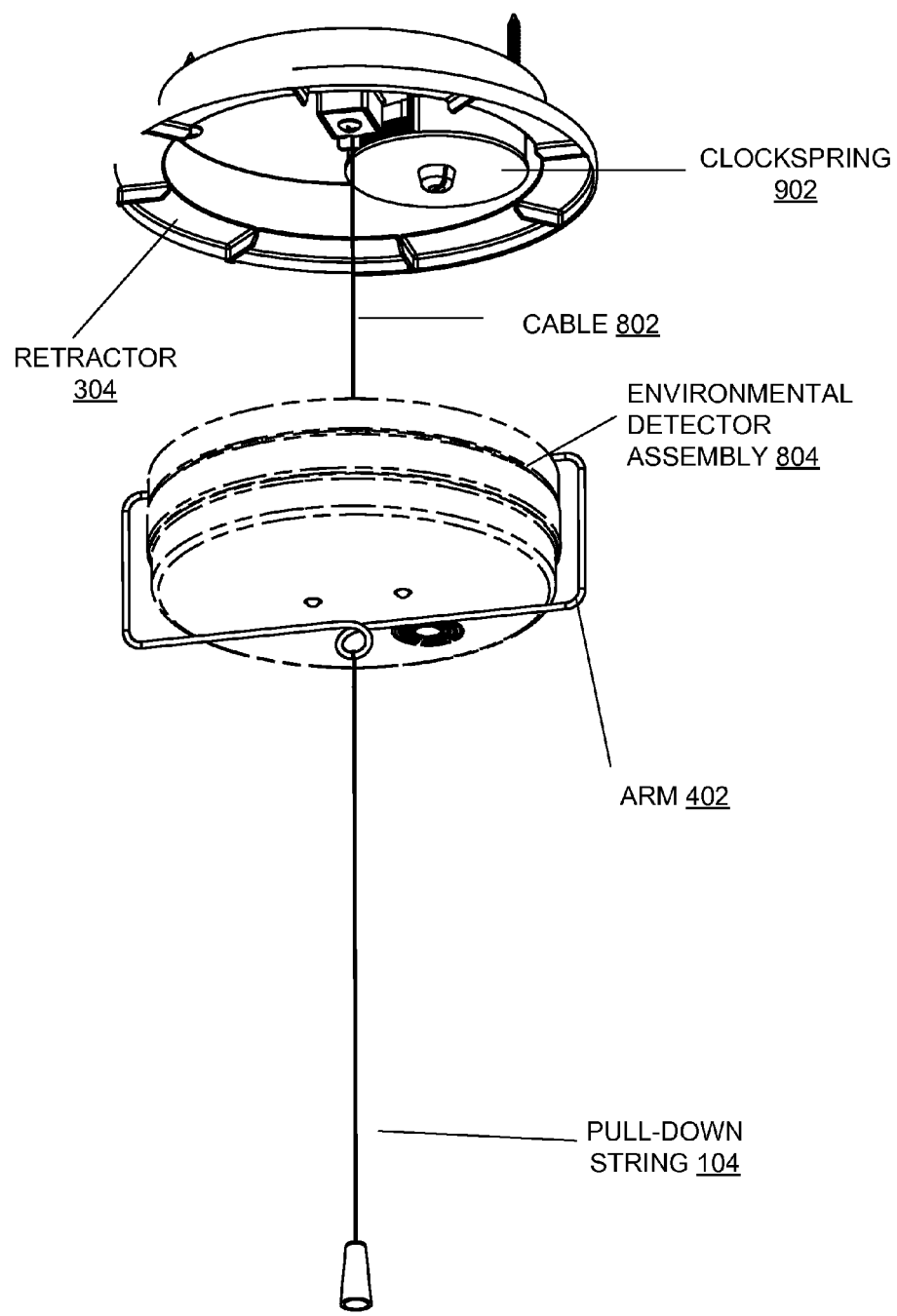

FIG. 9 is a bottom-view of an isometric block diagram of a retractable environmental detector system 400 with a pull-down string in which the retractable environmental detector assembly 400 is in an extended position, according to an implementation.

In FIG. 9, the retractable environmental detector system 400 includes the environmental detector assembly 804 and the retractor 304. The retractable environmental detector system 400 in FIG. 9 is shown in an extended position in which the environmental detector assembly 804 and the retractor 304 are not substantially in contact to each other. The retractable environmental detector system 400 includes a pull-down string 104 which can be grasped by an operator to either extend the retractable environmental detector system 400, as shown in FIG. 9, or to retract the retractable environmental detector system 400. The retractor 304 of the retractable environmental detector system 400 is mountable to a mounting surface (not shown), such as a ceiling, a roof or a wall. Other implementations of the retractable environmental detector system 400 do not include the pull-down string 104, such as shown in FIG. 2. Similar to FIG. 4-7, an arm 402 is attached to an apparatus that is attached to a retractor 304. The arm 402 is operably attached to a pull-down string 104.

The retractable environmental detector system 400 includes the cable 802 or other flexible connector such as a cable 802 or other flexible connector such as a string that is fixedly attached to the top of the environmental detector assembly 804. The cable 802 is movably attached to the retractor 304 through a rotatable clockspring 902. Clocksprings are also known as spring coils. Clocksprings are one type of movement actuators. A base having a clockspring 902 is a retractor 304.

Figure 10:
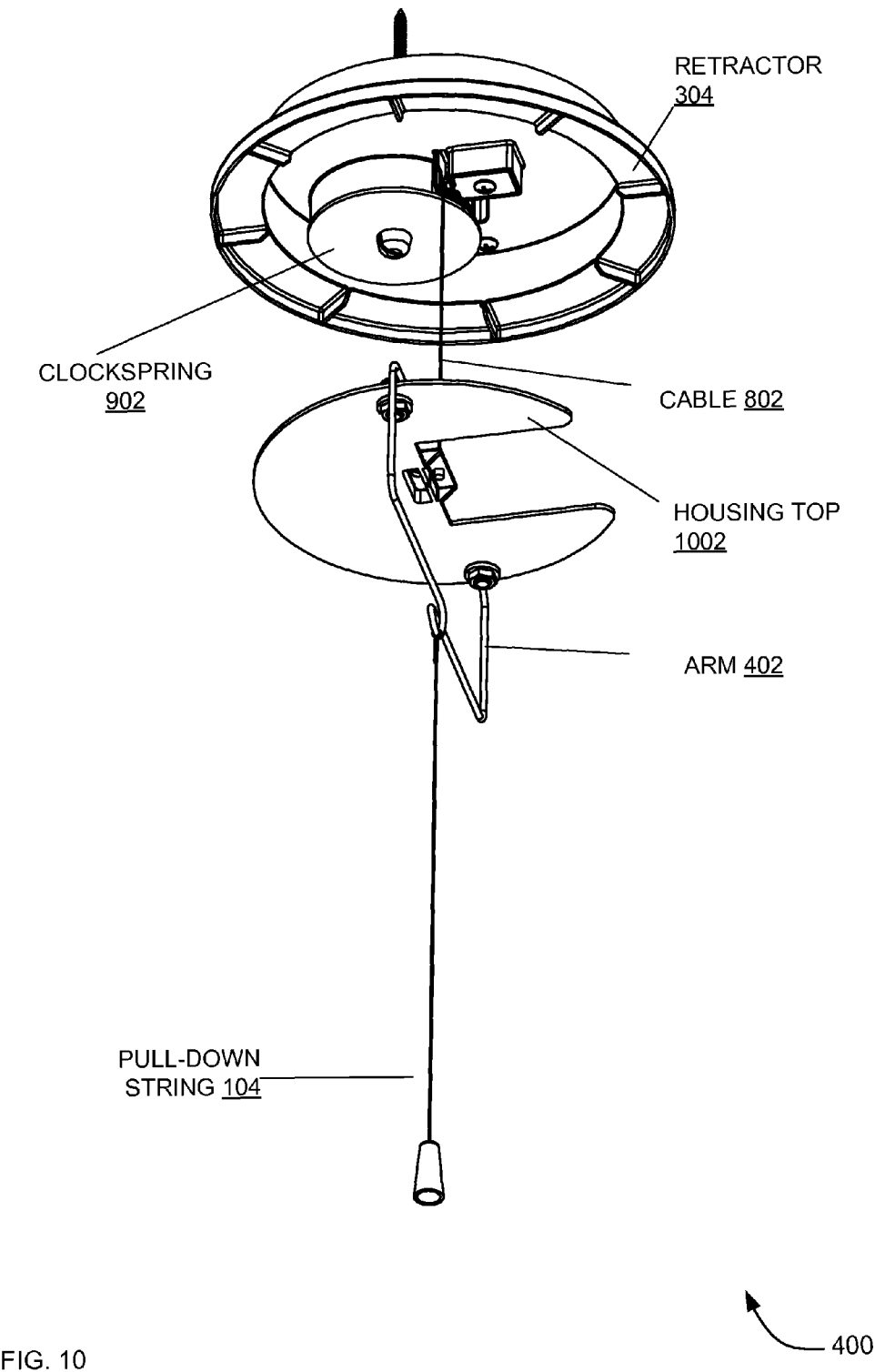

FIG. 10 is a bottom-view of an isometric block diagram of a retractable environmental detector system 400 with a pull-down string having a housing top mounting plate for the environmental detector assembly in an extended position, according to an implementation.

In FIG. 10, the retractable environmental detector system 400 includes a housing top 1002 and the retractor 304. The retractable environmental detector system 400 in FIG. 10 is shown in an extended position in which the housing top 1002 and the retractor 304 are not substantially in contact to each other. The retractable environmental detector system 400 includes a pull-down string 104 which can be grasped by an operator to either extend the retractable environmental detector system 400, as shown in FIG. 10, or to retract the retractable environmental detector system 400. The retractor 304 of the retractable environmental detector assembly 400 is mountable to a mounting surface (not shown), such as a ceiling, a roof or a wall. Other implementations of the retractable environmental detector assembly 400 do not include the pull-down string 104, such as shown in FIG. 2. Similar to FIG. 4-7, an arm 402 is attached to an apparatus that is attached to a retractor 304. The arm 402 is operably attached to a pull-down string 104.

The retractable environmental detector system 400 includes the cable 802 or other flexible connector such as a cable 802 or other flexible connector such as a string that is fixedly attached to the housing top 1002 of the environmental detector assembly 804. The cable 802 is movably attached to the retractor 304 through the rotatable clockspring 902.

Figure 11:
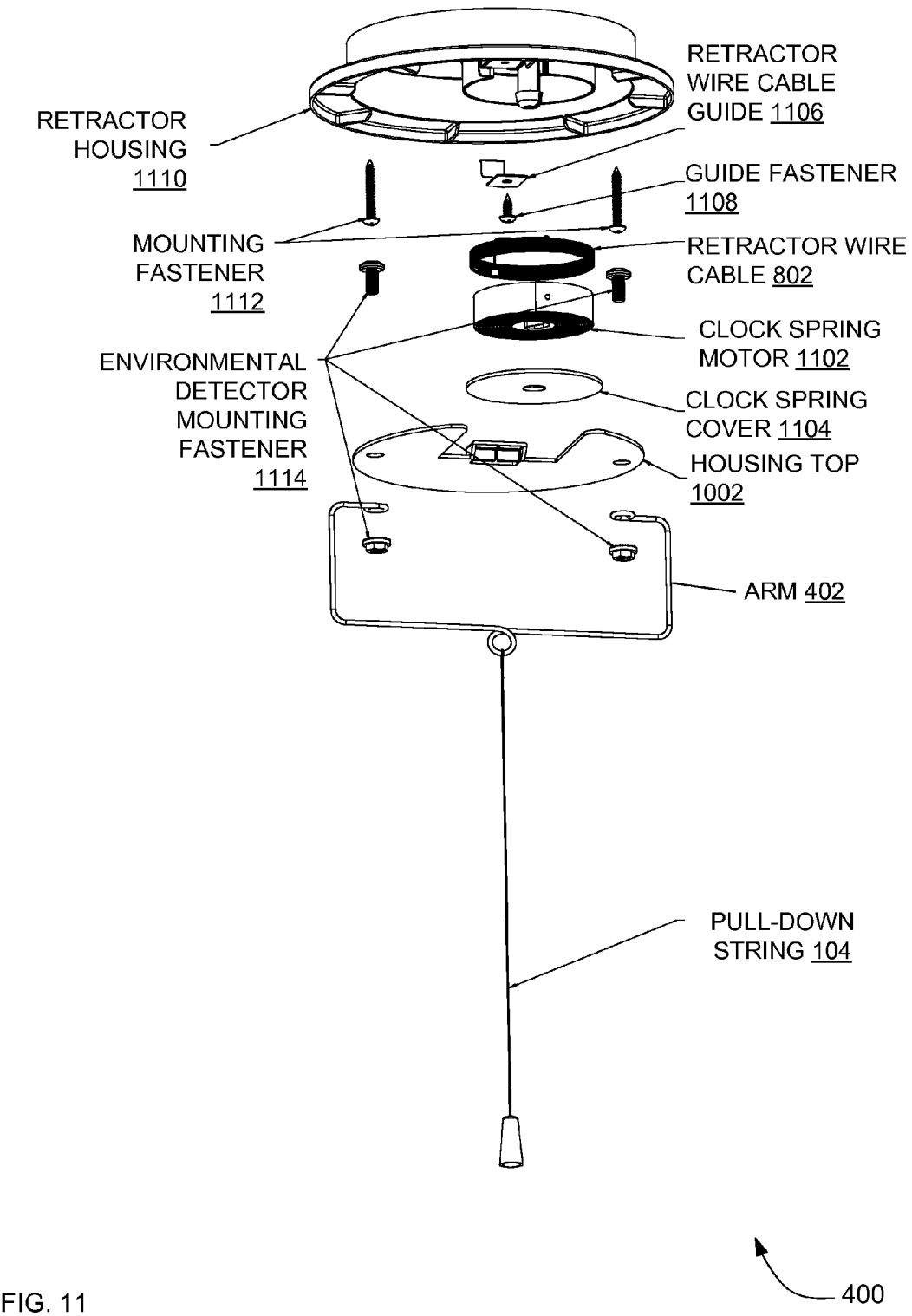

FIG. 11 is a bottom-view of an exploded isometric block diagram of a retractable environmental detector system 400 with a pull-down string, according to an implementation.

In FIG. 11, the retractable environmental detector system 400 includes the retractor 304. The retractable environmental detector system 400 includes a pull-down string 104 which can be grasped by an operator to either extend the retractable environmental detector system 400, as shown in FIG. 11, or to retract the retractable environmental detector system 400. The retractor 304 of the retractable environmental detector system 400 is mountable to a mounting surface (not shown), such as a ceiling, a roof or a wall. Other implementations of the retractable environmental detector system 400 do not include the pull-down string 104, such as shown in FIG. 2. Similar to FIG. 4-7, an arm 402 is attached to an apparatus that is attached to a retractor 304. The arm 402 is operably attached to a pull-down string 104.

The retractable environmental detector system 400 includes the cable 802 or other flexible connector such as a cable 802 or other flexible connector such as a string that is fixedly attached to the housing top 1002 fixedly attached to the environmental detector 804. The cable 802 is movably attached to the retractor 304 through the rotatable clockspring 902. The rotatable clock spring 902 includes a clock spring motor 1102 that is operably coupled to the retractor cable 802, a clock spring cover 1104, a retractor wire cable guide 1106 and a guide fastener 1108; all of which are inside a retractor housing 1110 of the retractor 304. The retractor 304 also includes mounting fasteners 1112. The retractable environmental detector system 400 includes environmental detector mounting fastener set 1114 that attaches the arm 402 to the housing top 1002 fixedly attached to the environmental detector assembly 804 through a roundhead machine screw and a nut.

FIG. 12-20 illustrate a retractable environmental detector assembly having an internal clockspring and a cable incorporated inside the retractable environmental detector.

Figure 12:
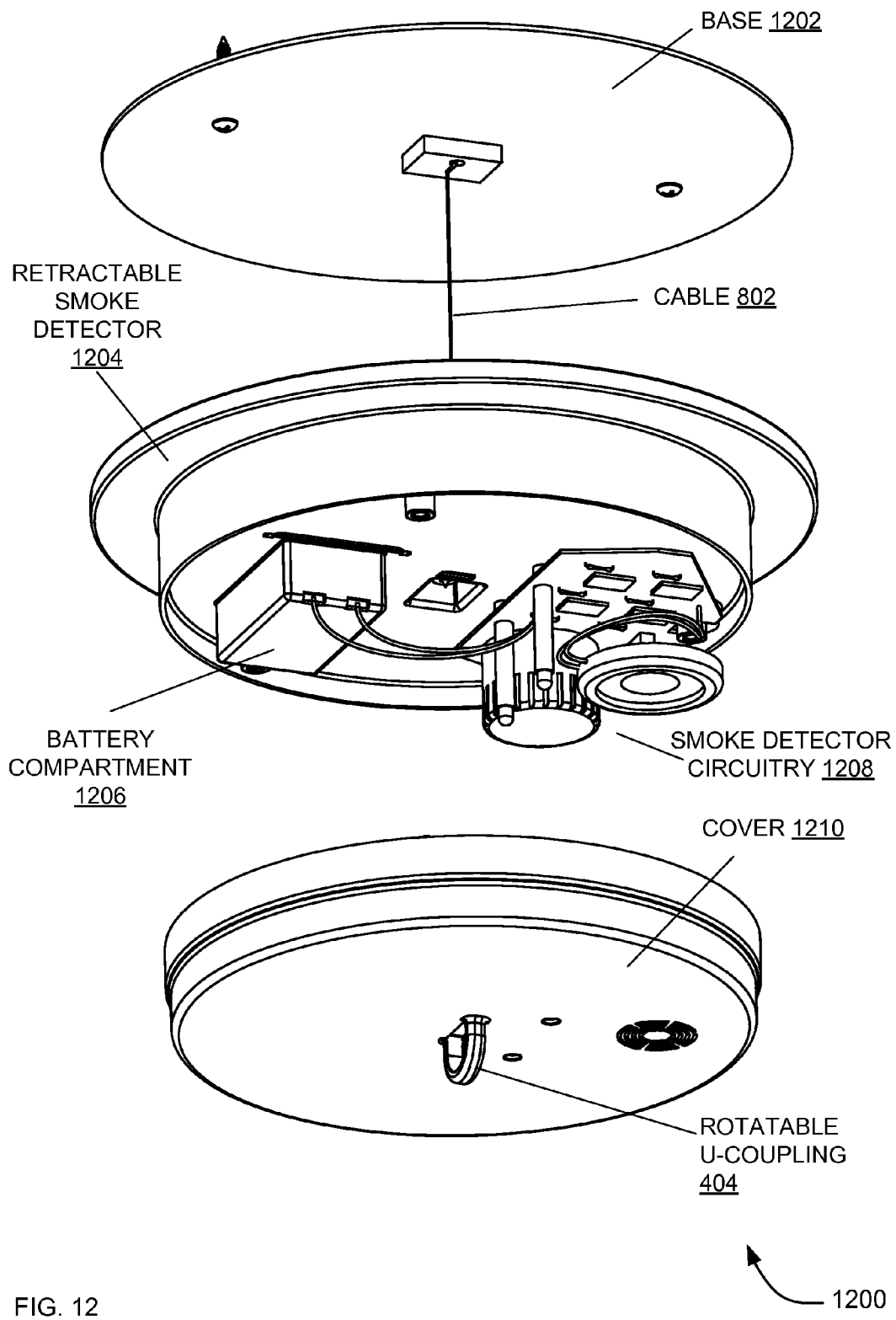
FIG. 12-20 illustrate a retractable environmental detector system having an internal clockspring and a cable incorporated inside the retractable environmental detector.

FIG. 12 is a bottom-view of an exploded isometric block diagram of a retractable environmental detector assembly in an extended position having an internal clockspring and a cable incorporated inside the retractable environmental detector, according to an implementation.

In FIG. 12, the retractable environmental detector system 1200 includes a base 1202. The base 1202 of the retractable environmental detector system 1200 is mountable to a mounting surface (not shown), such as a ceiling, a roof or a wall.

The retractable environmental detector system 1200 includes the cable 802 or other flexible connector such as a cable 802 or other flexible connector such as a string that is fixedly attached to the base 1202. The cable 802 is movably attached to a retractable environmental detector 1204 through the rotatable clockspring (not shown in FIG. 12).

The retractable environmental detector 1204 includes a battery compartment 1206 and environmental detector circuitry 1208 that includes a sensor audible warning speaker and operational switches.

The retractable environmental detector also includes a cover 1210 and the cover 1210 includes a rotatable U-coupling 404 which can be grasped by an operator to either extend the retractable environmental detector 1202, as shown in FIG. 3, or to retract the retractable environmental detector 1202, such as shown in FIG. 12.

Figure 13:
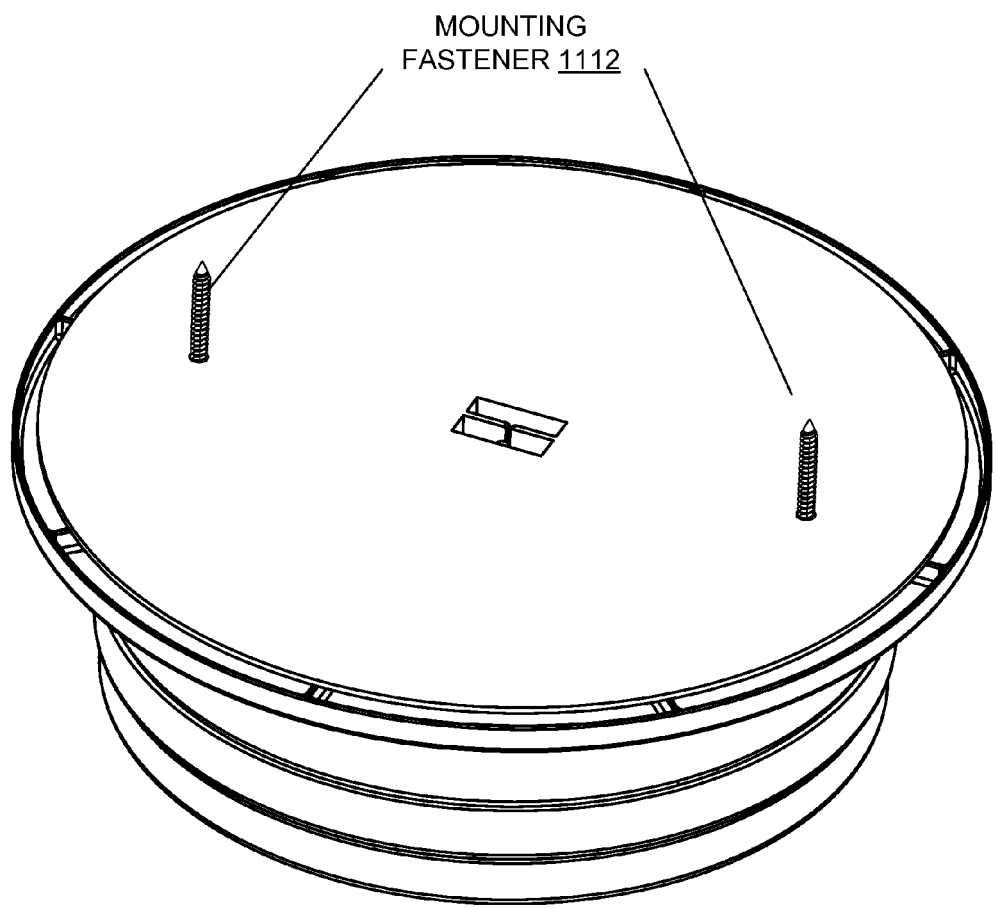

FIG. 13 is a top-view of an isometric block diagram of a retractable environmental detector system 1200 in a retracted position having an internal clockspring and a cable incorporated inside the environmental detector, according to an implementation. The retractable environmental detector system 1200 includes at least one mounting fastener 1112 to mount to a mounting surface (not shown), such as a ceiling, a roof or a wall.

Figure 14:
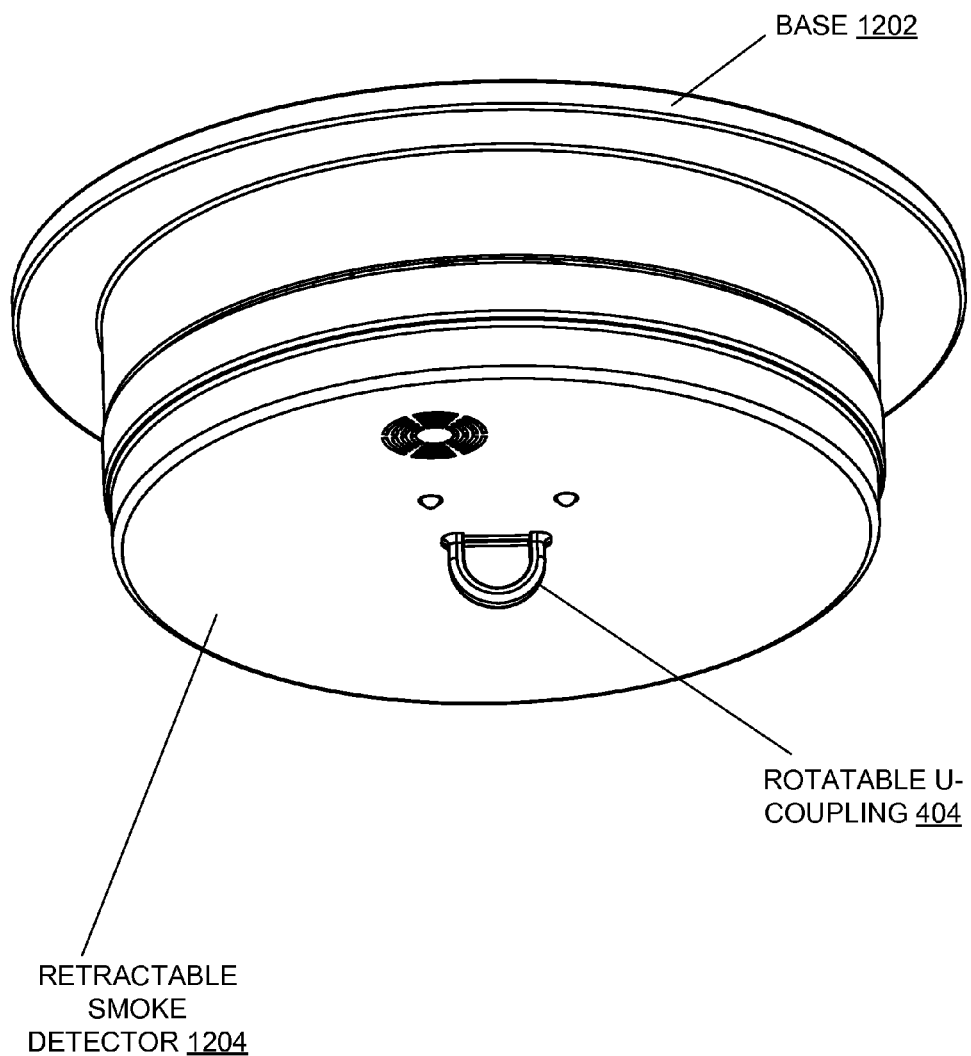

FIG. 14 is a bottom-view of an isometric block diagram of a retractable environmental detector system 1200 in a retracted position and having an internal clockspring and a cable incorporated inside the environmental detector and having a rotatable U-coupling 404 at the middle of the cover 1210 of the retractable environmental detector system, according to an implementation. The retractable environmental detector system 1200 includes at least one rotatable U-coupling 404 which can be grasped by an operator to either extend the retractable environmental detector 1204, as shown in FIG. 3, or to retract the retractable environmental detector 1204, such as shown in FIG. 14.

Figure 15:
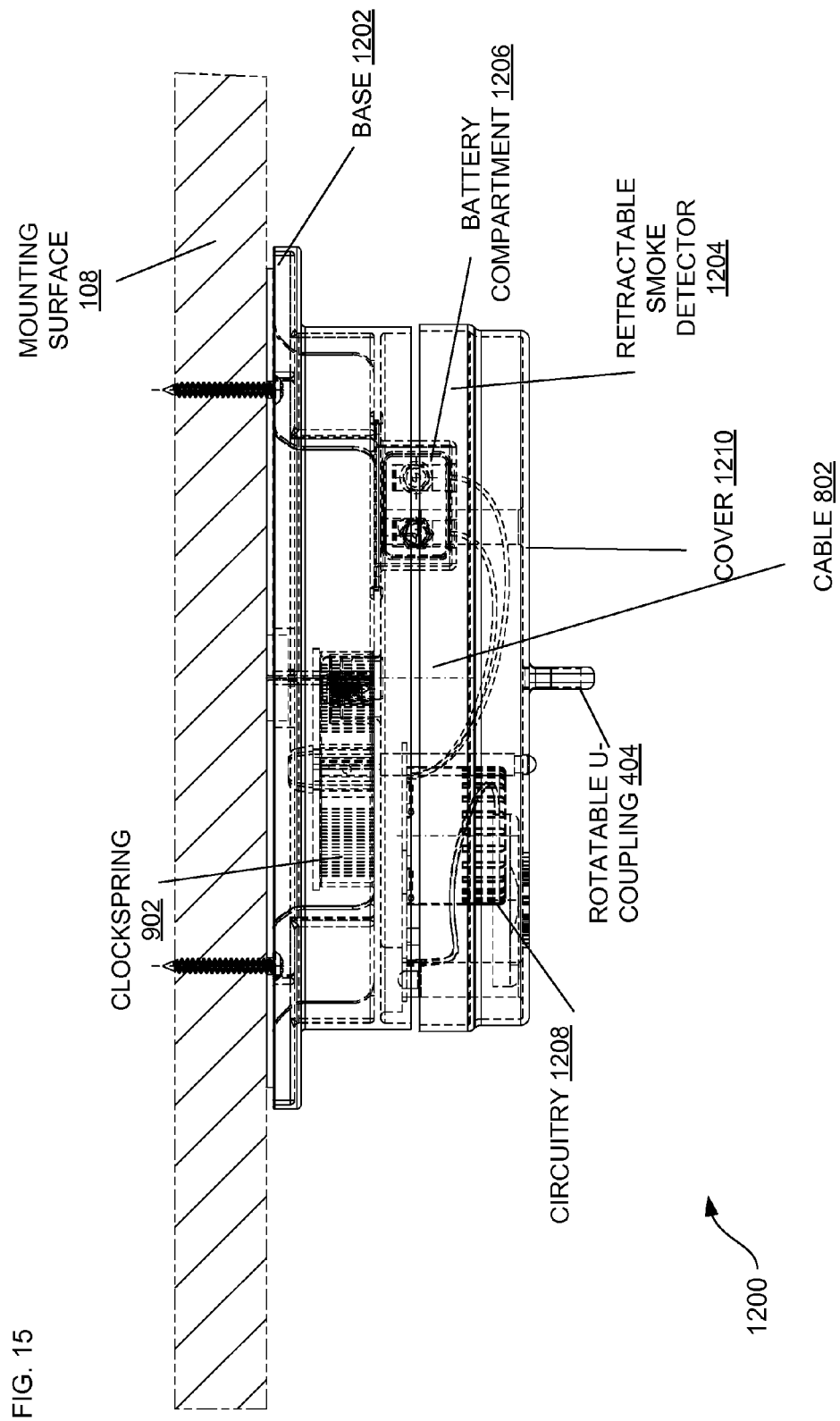

FIG. 15 is a side view block diagram of a retractable environmental detector assembly in a retracted position mounted on a ceiling having an internal clockspring and a cable incorporated inside the environmental detector and having a rotatable U-coupling 404 at the middle of the cover 1210 of the retractable environmental detector assembly, according to an implementation.

In FIG. 15, the retractable environmental detector system 1200 includes a base 1202. The base 1202 of the retractable environmental detector system 1200 is mountable to a mounting surface 108, such as a ceiling, a roof or a wall.

The retractable environmental detector system 1200 includes the cable 802 or other flexible connector such as a cable 802 or other flexible connector such as a string that is fixedly attached to the base 1202. The cable 802 is movably attached to a retractable environmental detector 1204 through the rotatable clockspring 902.

The retractable environmental detector 1204 includes the battery compartment 1206 and environmental detector circuitry 1208 that includes a sensor audible warning speaker and operational switches.

The retractable environmental detector also includes the cover 1210 and the cover 1210 includes a rotatable U-coupling 404 which can be grasped by an operator to either extend the retractable environmental detector 1204, as shown in FIG. 3, or to retract the retractable environmental detector 1204, such as shown in FIG. 15.

Figure 16:
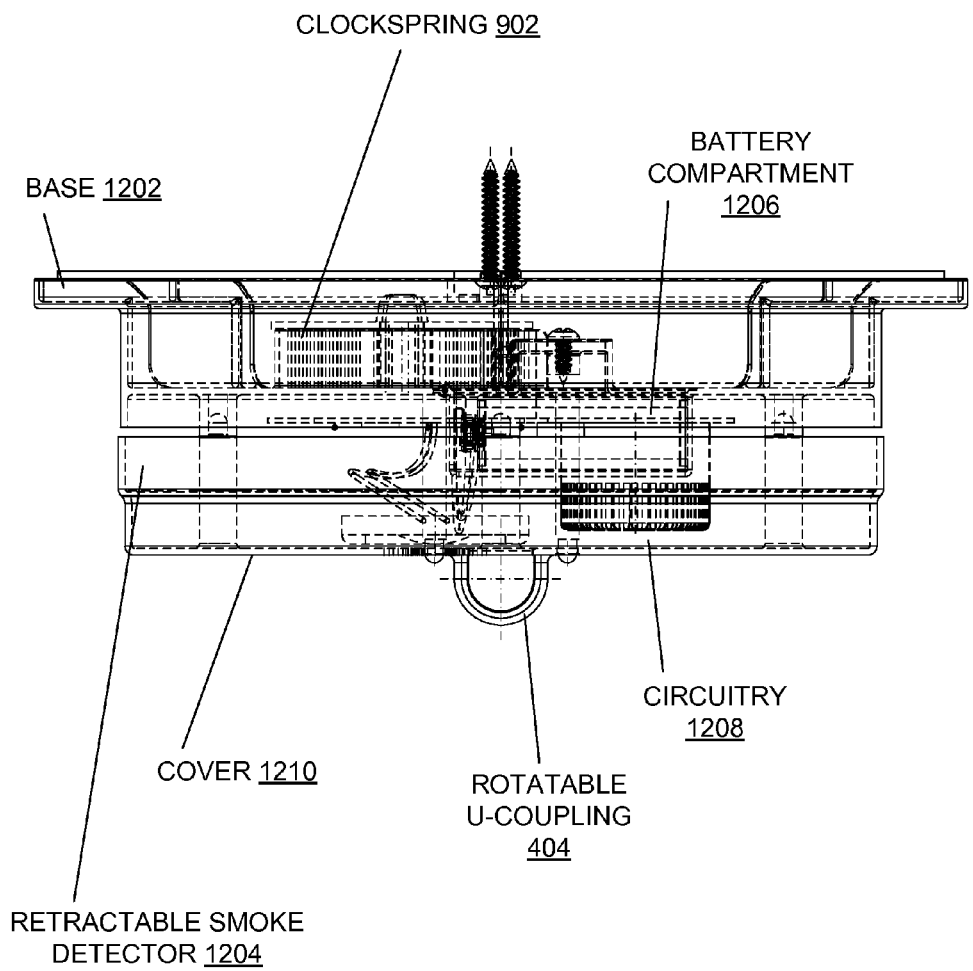

FIG. 16 is a side view block diagram of a retractable environmental detector assembly in a retracted position having an internal clockspring and a cable incorporated inside the environmental detector and having a rotatable U-coupling 404 at the middle of the cover 1210 of the retractable environmental detector assembly, according to an implementation.

In FIG. 16, the retractable environmental detector system 1200 includes a base 1202. The base 1202 of the retractable environmental detector system 1200 is mountable to a mounting surface 108, such as a ceiling, a roof or a wall.

The retractable environmental detector system 1200 includes the cable 802 or other flexible connector such as a cable 802 or other flexible connector such as a string that is fixedly attached to the base 1202. The cable 802 is movably attached to a retractable environmental detector 1204 through the rotatable clockspring 902.

The retractable environmental detector 1204 includes the battery compartment 1206 and environmental detector circuitry 1208 that includes a sensor audible warning speaker and operational switches.

The retractable environmental detector also includes the cover 1210 and the cover 1210 includes a rotatable U-coupling 404 which can be grasped by an operator to either extend the retractable environmental detector 1204, as shown in FIG. 3, or to retract the retractable environmental detector 1204, such as shown in FIG. 16.

Figure 17:
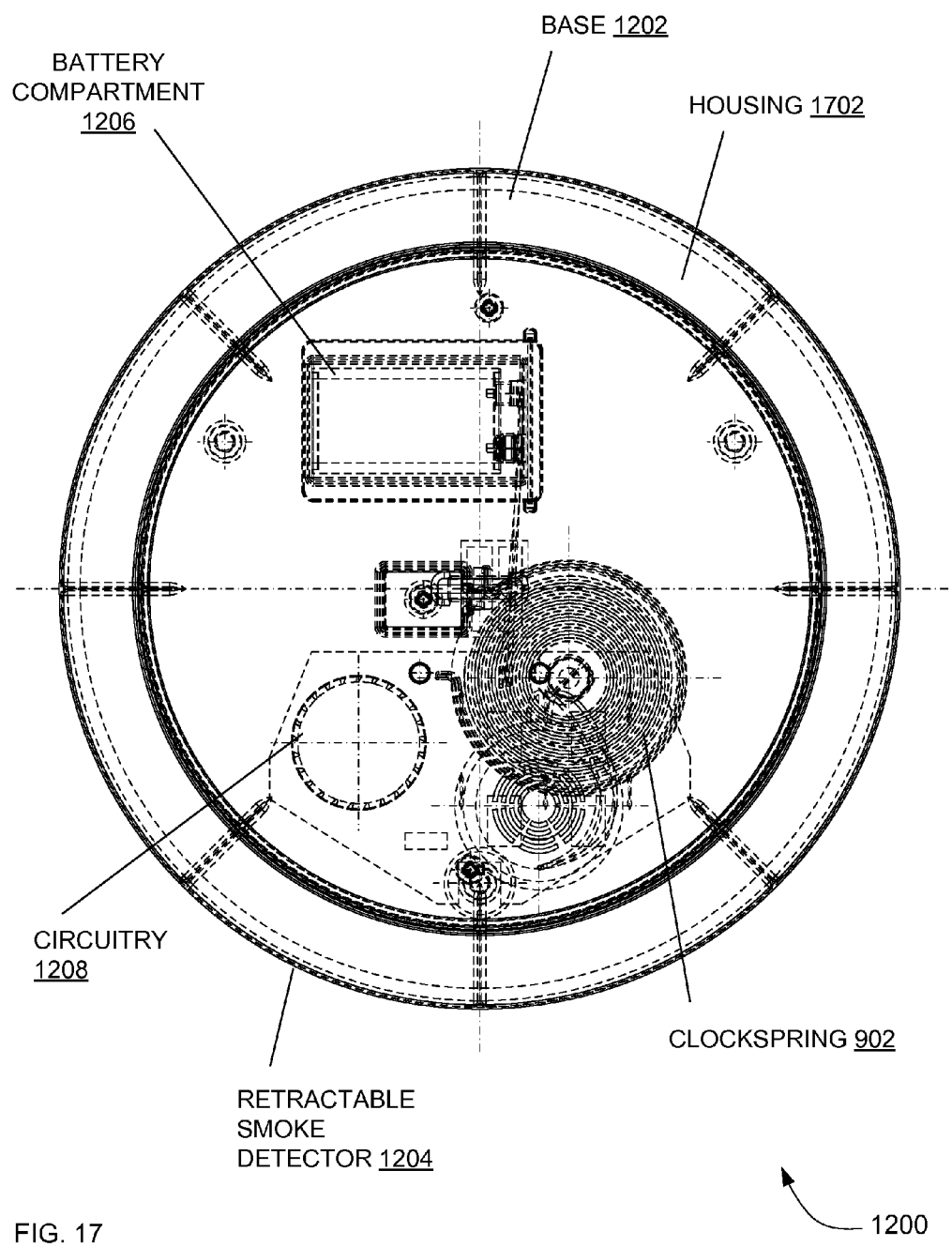

FIG. 17 is a bottom view block diagram of a retractable environmental detector assembly in a retracted position having an internal clockspring and a cable incorporated inside the environmental detector, according to an implementation.

In FIG. 17, the retractable environmental detector system 1200 includes a base 1202. The base 1202 of the retractable environmental detector system 1200 is mountable to a mounting surface, such as a ceiling, a roof or a wall.

The housing 1702 includes the clockspring 902.

The retractable environmental detector 1204 includes the battery compartment 1206 and environmental detector circuitry 1208 that includes a sensor audible warning speaker and operational switches.

Figure 18:
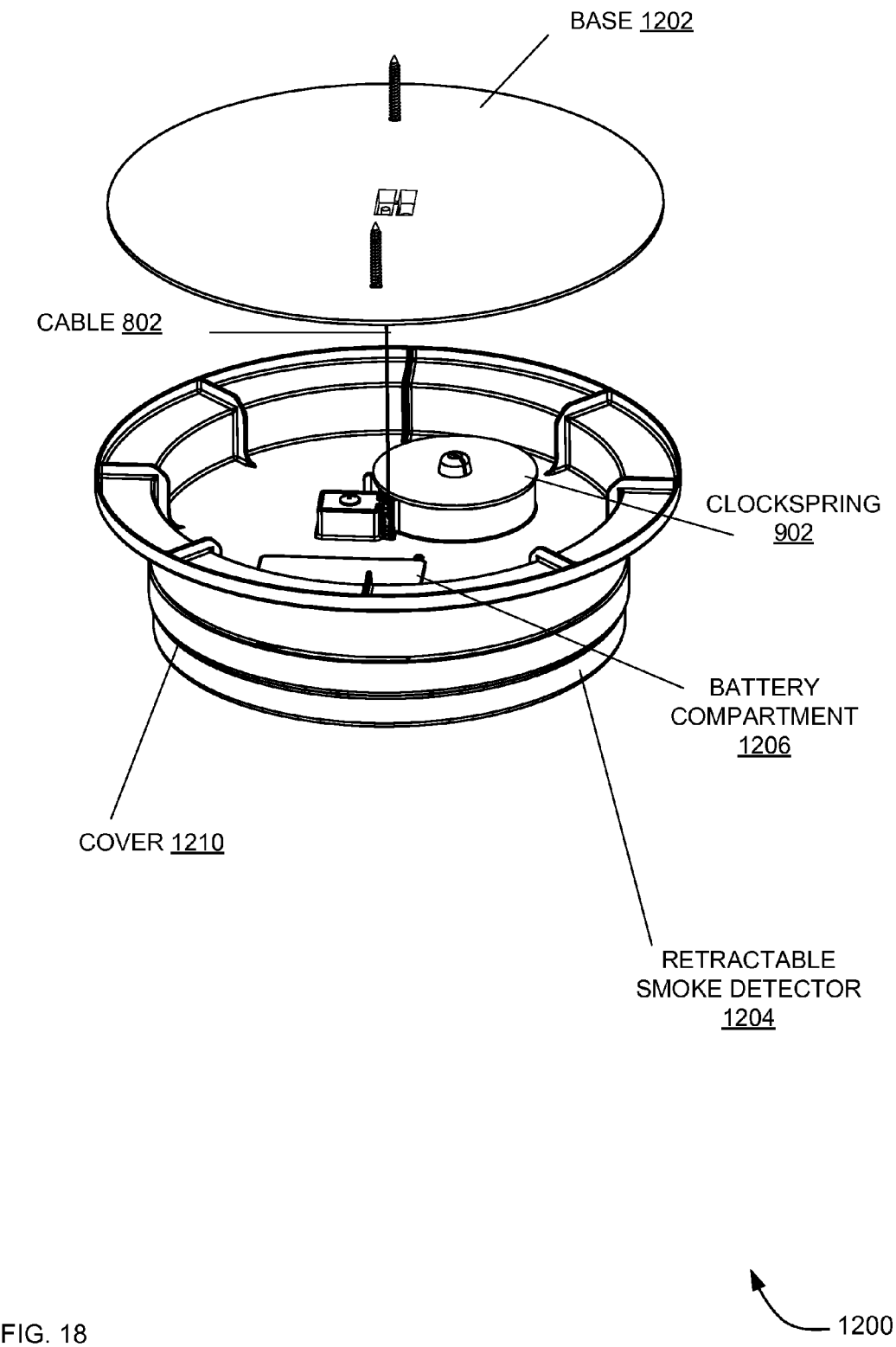

FIG. 18 is a top-view of an isometric block diagram of a retractable environmental detector system 1200 in an extended position having an internal clockspring and a cable incorporated inside the environmental detector, according to an implementation.

In FIG. 18, the retractable environmental detector system 1200 includes a base 1202. The base 1202 of the retractable environmental detector system 1200 is mountable to a mounting surface, such as a ceiling, a roof or a wall.

The retractable environmental detector system 1200 includes the cable 802 or other flexible connector such as a cable 802 or other flexible connector such as a string that is fixedly attached to the base 1202. The cable 802 is movably attached to a retractable environmental detector 1204 through the rotatable clockspring 902.

The retractable environmental detector 1204 includes the battery compartment 1206 and environmental detector circuitry 1208 that includes a sensor audible warning speaker and operational switches.

The retractable environmental detector also includes the cover 1210.

Figure 19:
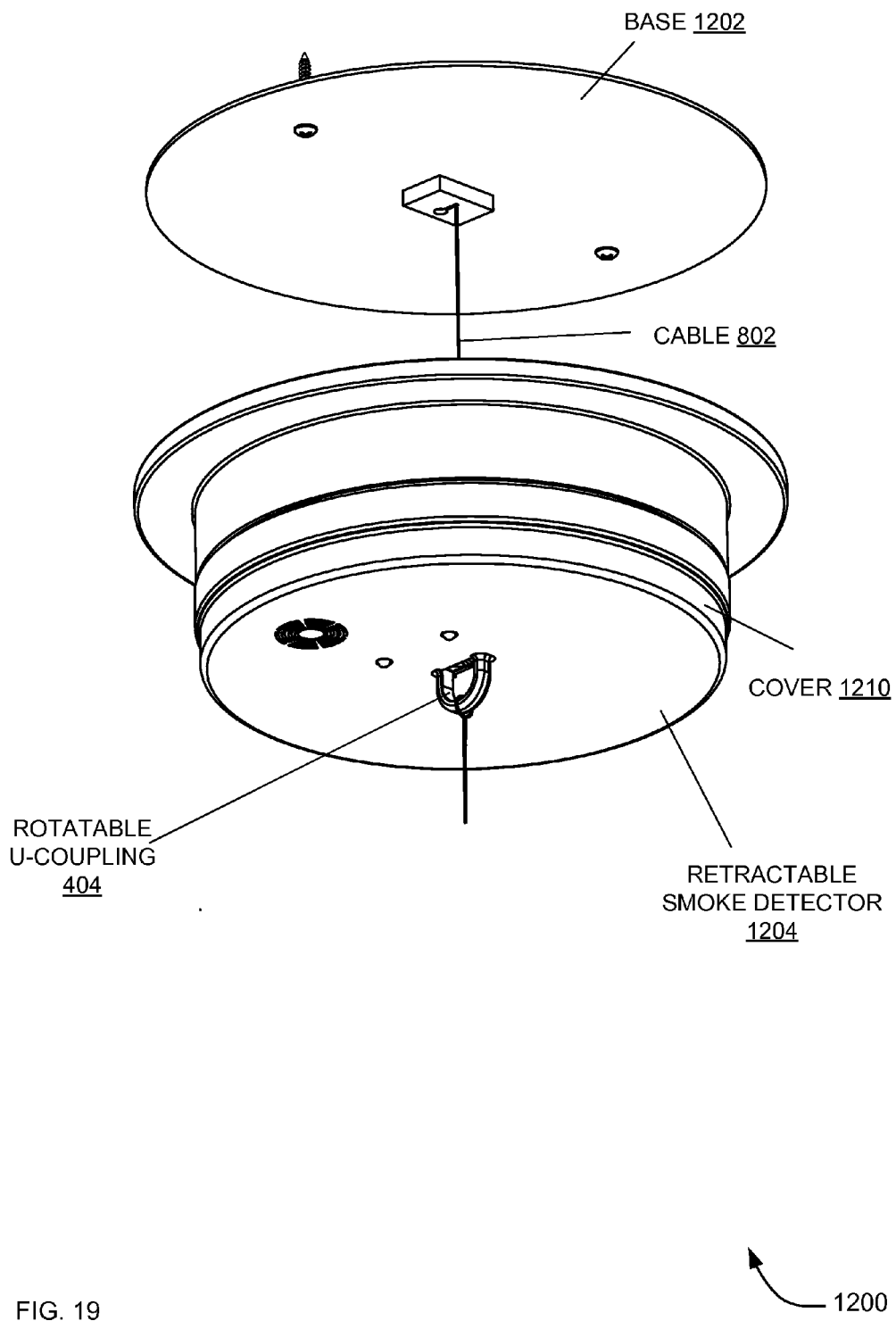

FIG. 19 is a bottom-view of an isometric block diagram of a retractable environmental detector system 1200 in an extended position having an internal clockspring and a cable incorporated inside the environmental detector, according to an implementation.

In FIG. 19, the retractable environmental detector system 1200 includes a base 1202. The base 1202 of the retractable environmental detector system 1200 is mountable to a mounting surface, such as a ceiling, a roof or a wall.

The retractable environmental detector system 1200 includes the cable 802 or other flexible connector such as a string that is fixedly attached to the base 1202. The cable 802 is movably attached to a retractable environmental detector 1204 through the rotatable clockspring (not shown in FIG. 19.)

The retractable environmental detector 1204 includes the battery compartment 1206 which is open at the top, the opening provides access to the battery compartment 1206 for service, maintenance and replacement a battery in the battery compartment 1206.

The retractable environmental detector also includes the cover 1210.

The retractable environmental detector system 1200 includes at least one rotatable U-coupling 404 which can be grasped by an operator to either extend the retractable environmental detector 1202, as shown in FIG. 19, or to retract the retractable environmental detector 1202, such as shown in FIG. 2.

Figure 20:
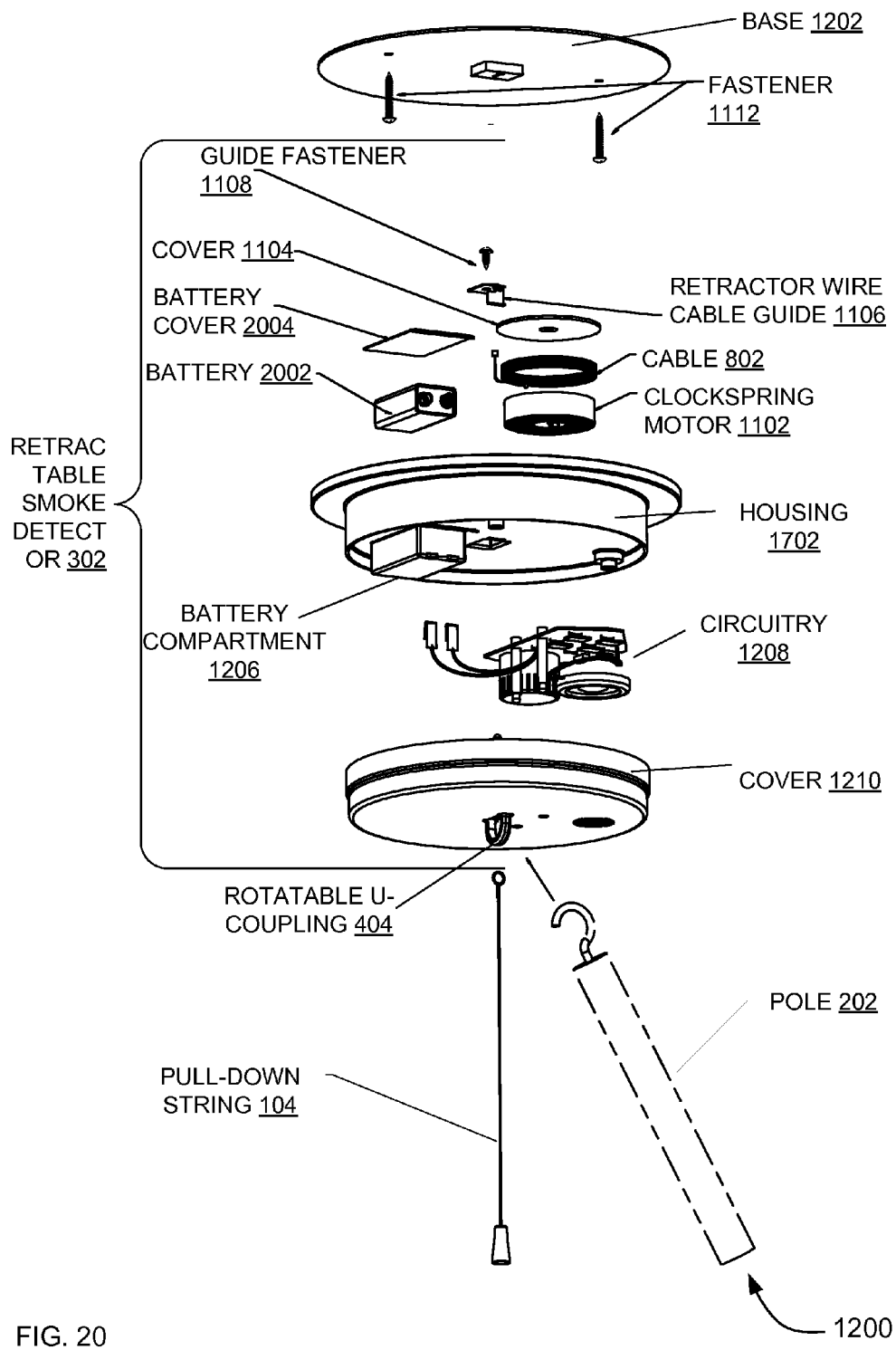

FIG. 20 is a bottom-view of an exploded isometric block diagram of a retractable environmental detector system 1200 having an internal clockspring and a cable incorporated inside the environmental detector, according to an implementation.

In FIG. 20, the retractable environmental detector system 1200 includes the base 1202. The base 1202 of the retractable environmental detector system 1200 is mountable to a mounting surface (not shown), such as a ceiling, a roof or a wall. The base 1202 also includes mounting fasteners 1112.

The retractable environmental detector system 1200 includes the cable 802 or other flexible connector such as a string that is movably attached to the housing top 1002 (not shown in FIG. 20) of the retractable environmental detector 302. The cable 802 is fixedly attached to the base 1202 through the rotatable clockspring 902 (not labeled). The rotatable clock spring 902 (not labeled) includes a clock spring motor 1102 that is operably coupled to the retractor cable 802 (not shown in FIG. 20), a clock spring cover 1104, a retractor wire cable guide 1106 and a guide fastener 1108; all of which are inside a housing 1702 of the retractable environmental detector 302.

The retractable environmental detector system 1200 includes a cover 1210 and the cover 1210 includes a rotatable U-coupling 404 which can be grasped by an operator to either extend the retractable environmental detector 1202, as shown in FIG. 3, or to retract the retractable environmental detector 1202, such as shown in FIG. 1-2.

The retractable environmental detector system 1200 includes a pull-down string 104 which can be grasped by an operator to either extend the retractable environmental detector system 1200, as shown in FIG. 20, or to retract the retractable environmental detector system 1200. Other implementations of the retractable environmental detector system 1200, such as shown in FIG. 2, do not include the pull-down string 104 that includes a pole 202 and a hook.

FIG. 21-29 illustrate a retractable environmental detector system having a clockspring incorporated into a retractor.

Figure 21:
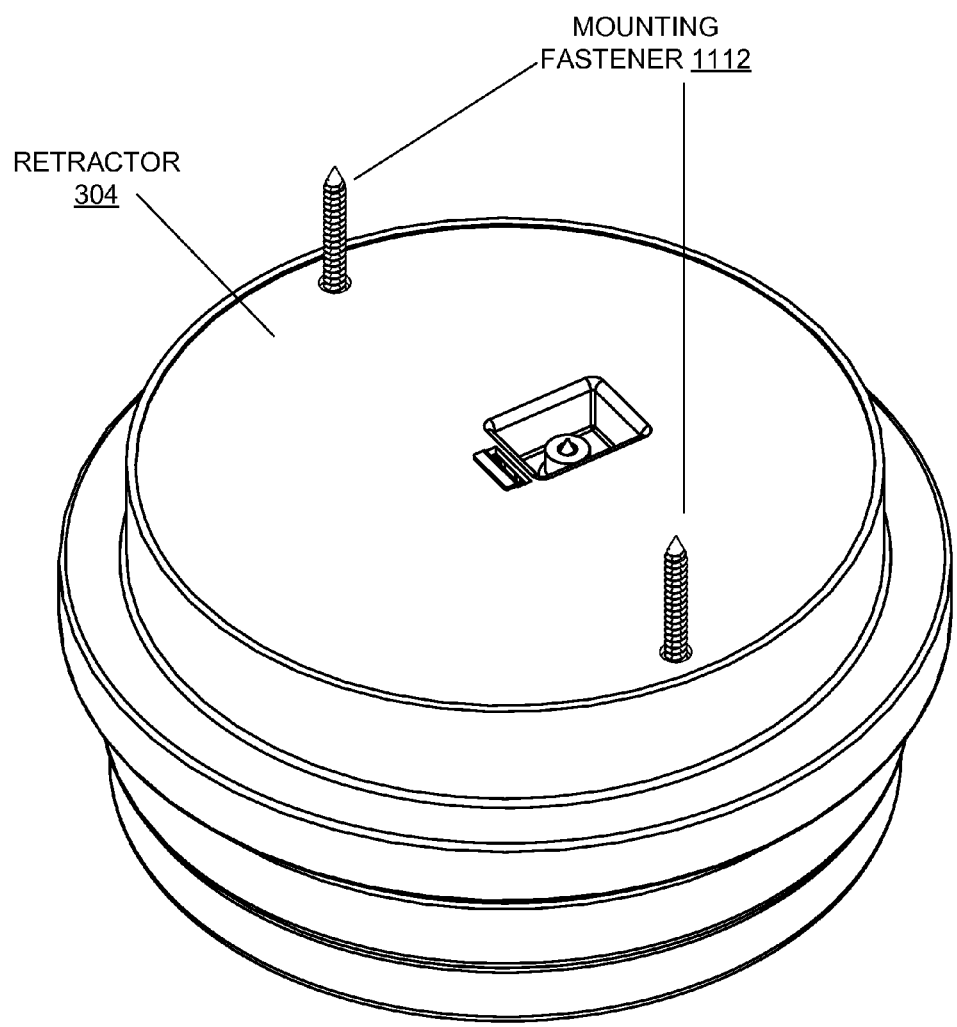
FIG. 21-29 illustrate a retractable environmental detector system having a clockspring incorporated into a base.

FIG. 21 is a top-view of an isometric block diagram of a retractable environmental detector system 2100 in a retracted position having a clockspring incorporated into a retractor of the retractable environmental detector system, according to an implementation. FIG. 21 is a view of the retractor housing 1110. The retractable environmental detector system 2100 includes mounting fasteners 1112 that protrude through a retractor 304 of the retractable environmental detector system 2100.

Figure 22:
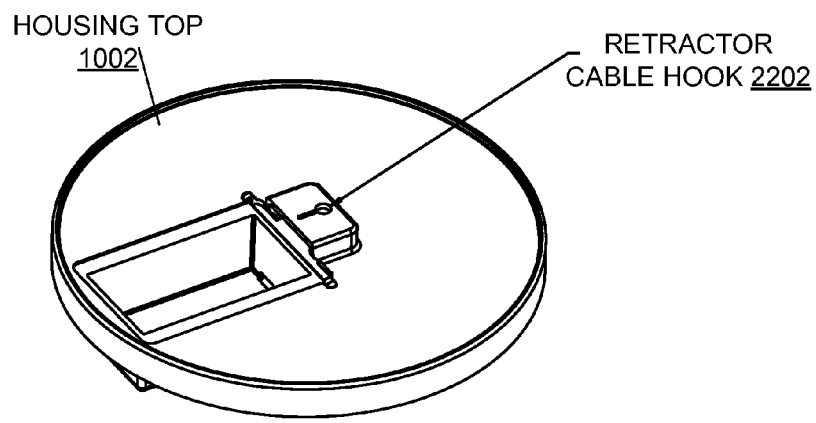

FIG. 22 is a top-view of an isometric of a housing top of a retractable environmental detector assembly, according to an implementation. FIG. 22 is a view of the housing top 1002 component only. The housing top 1002 of the retractable environmental detector includes a retractor cable hook 2202 that fixedly attaches to a cable 802 or other flexible connector such as a string (not shown).

Figure 23:
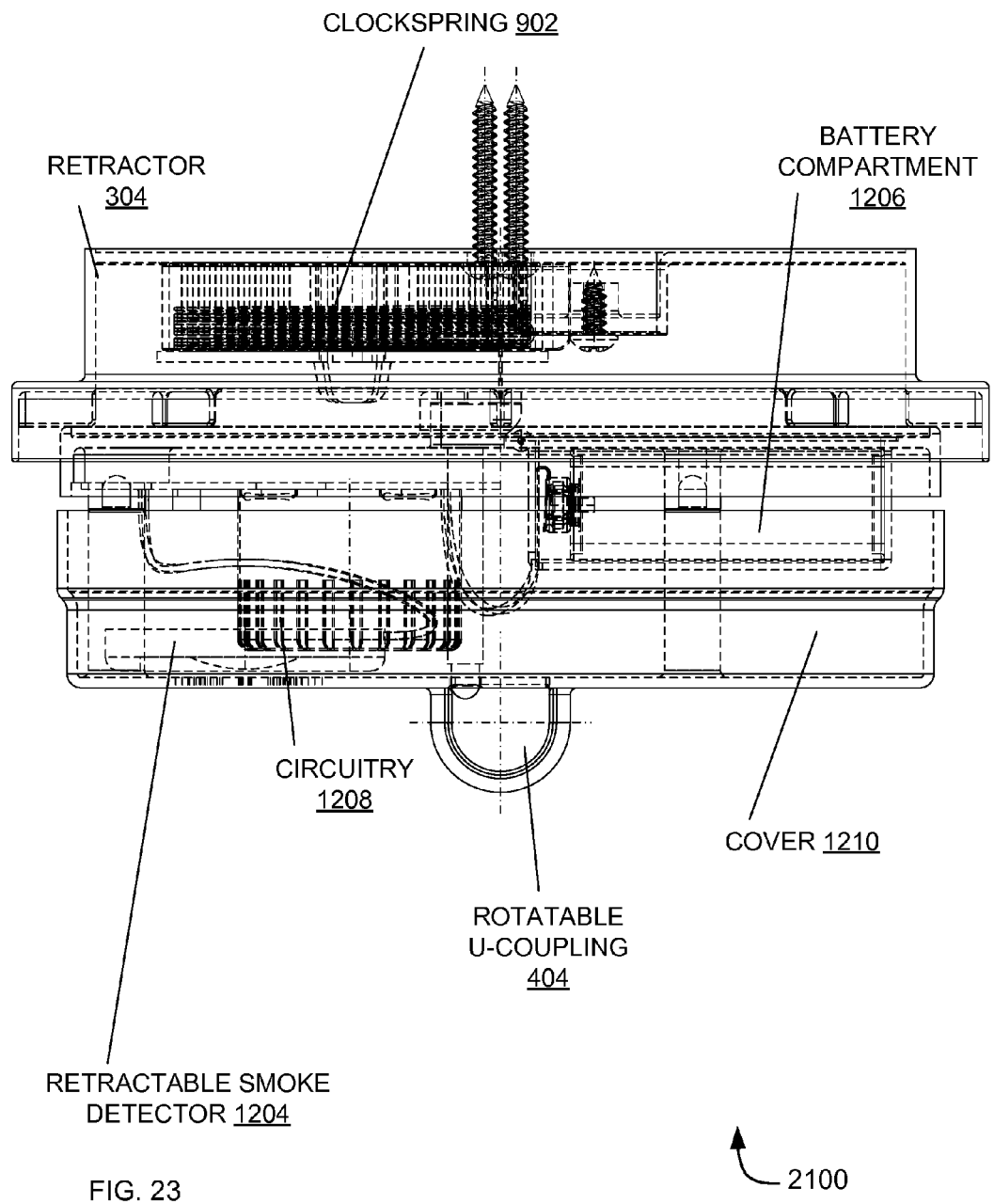

FIG. 23 is a side view block diagram of a retractable environmental detector system 2100 in a retracted position having a clockspring incorporated into a retractor and having a rotatable U-coupling 404 at the middle of the cover 1210 of the retractable environmental detector system 2100, according to an implementation.

In FIG. 23, the retractable environmental detector system 2100 includes a retractor 304. The retractor 304 of the retractable environmental detector system 2100 is mountable to a mounting surface, such as a ceiling, a roof or a wall.

The retractable environmental detector system 2100 includes the cable 802 or other flexible connector such as a string that is fixedly attached to the retractable smoke detector 1204. The cable 802 is movably attached to the retractor 304 through the rotatable clockspring 902.

The retractable smoke detector 1204 includes the battery compartment 1206 and the environmental detector circuitry 1208 that includes a sensor audible warning speaker and operational switches.

Figure 25:
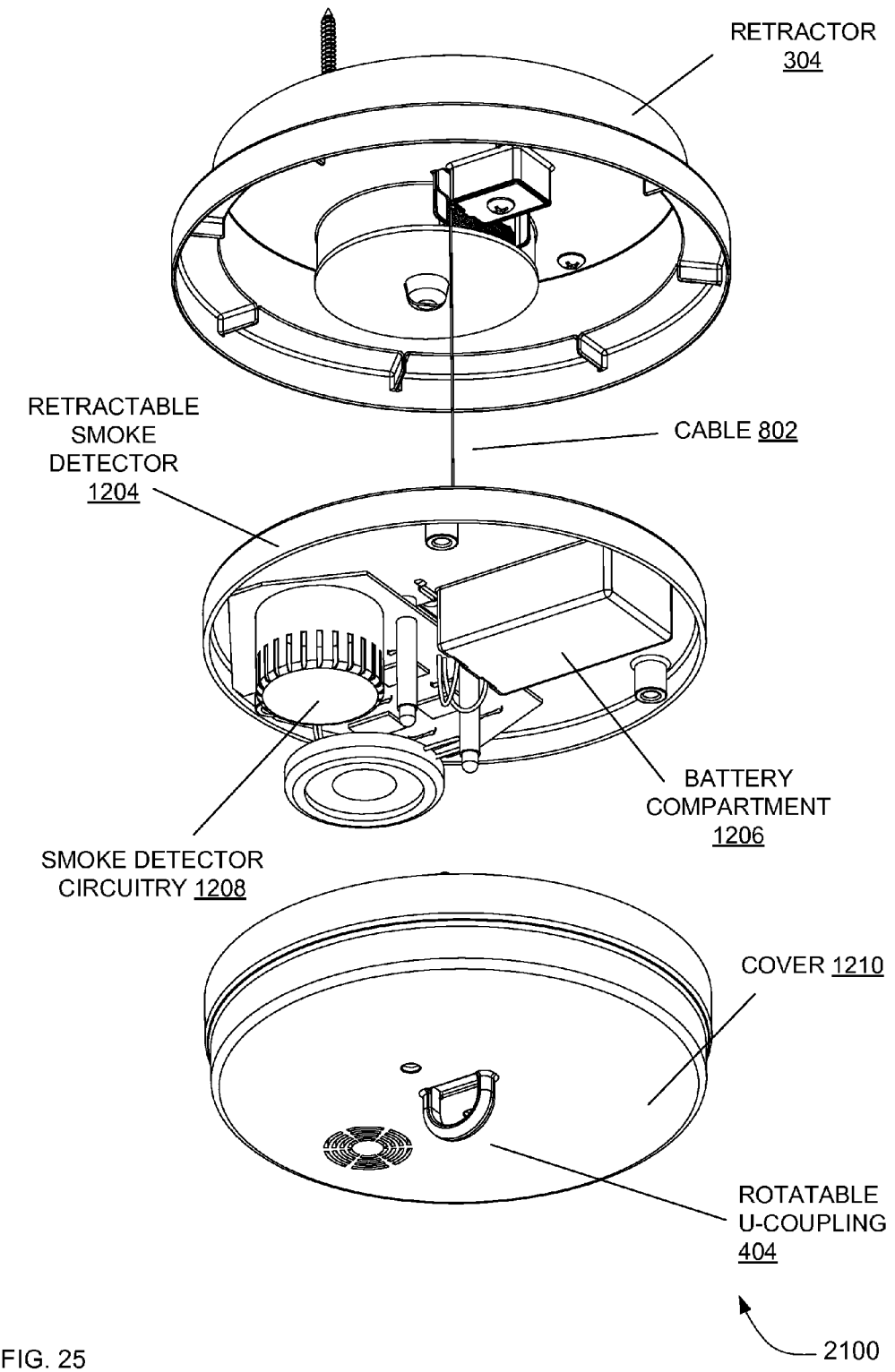
Figure 26:
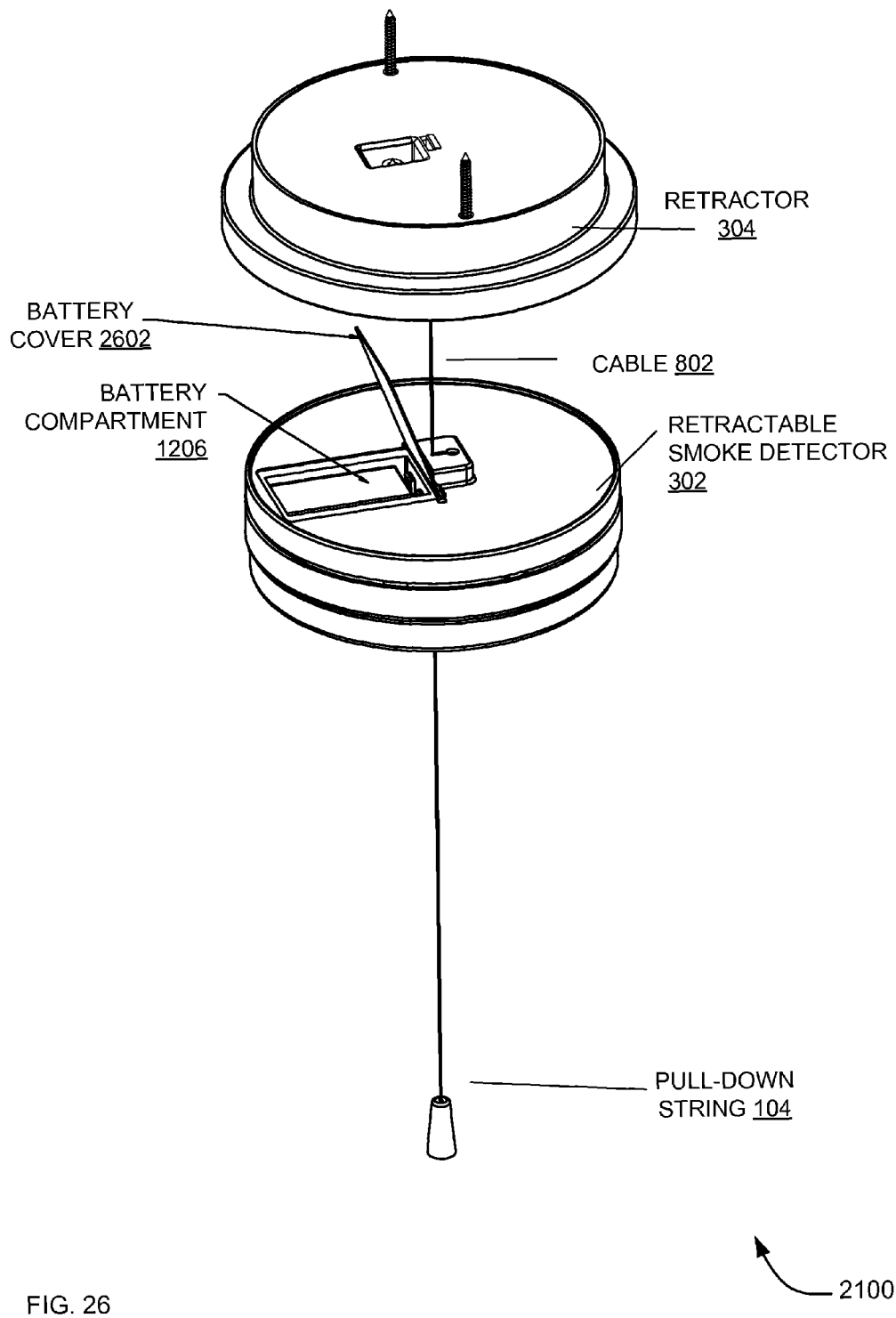
Figure 27:
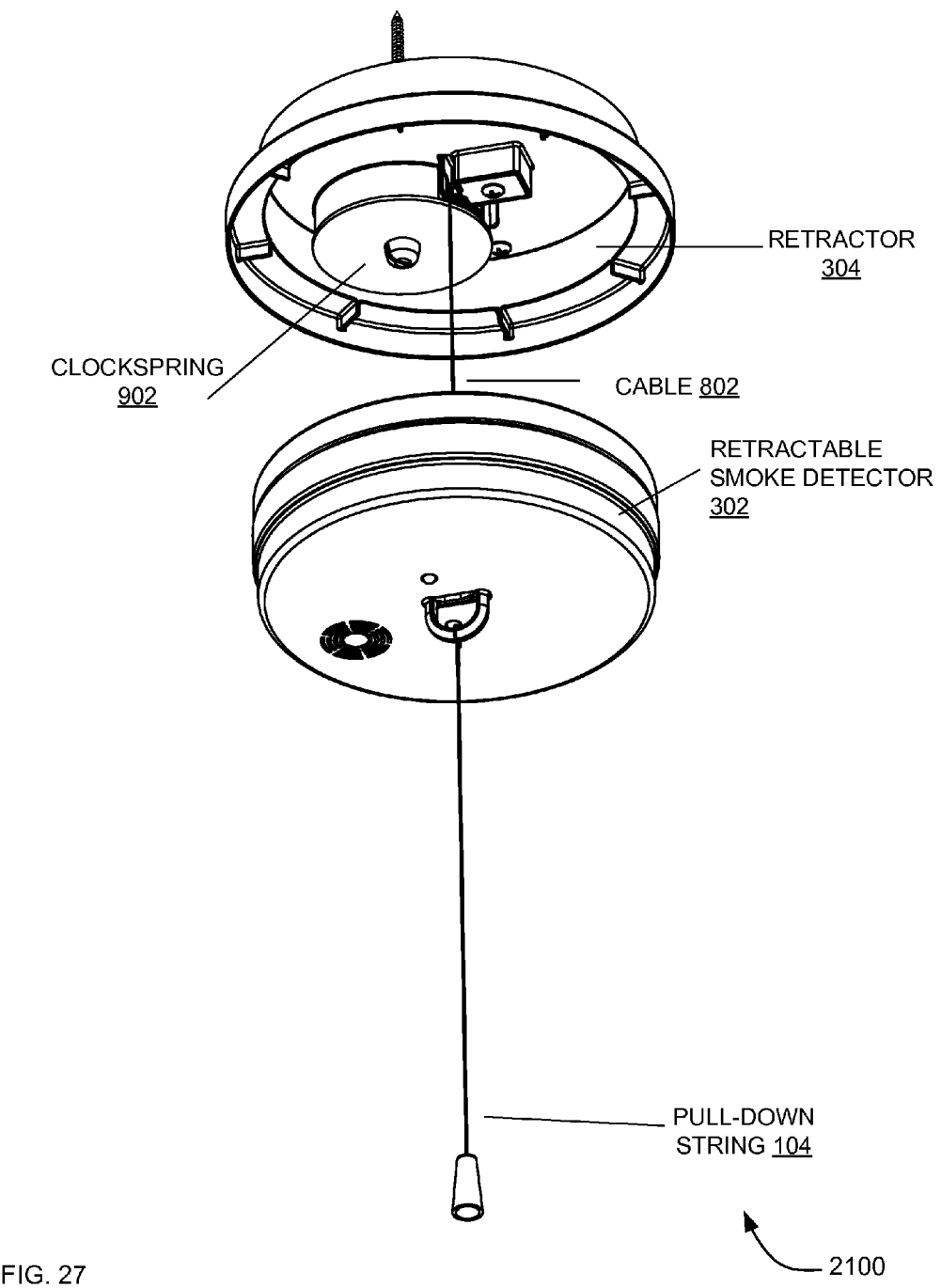

The retractable smoke detector 1204 also includes the cover 1210 and the cover 1210 includes a rotatable U-coupling 404 which can be grasped by an operator to either extend the retractable smoke detector 1204, as shown in FIG. 3, or to retract the retractable smoke detector 1204, such as shown in FIG. 25-27.

Figure 24:
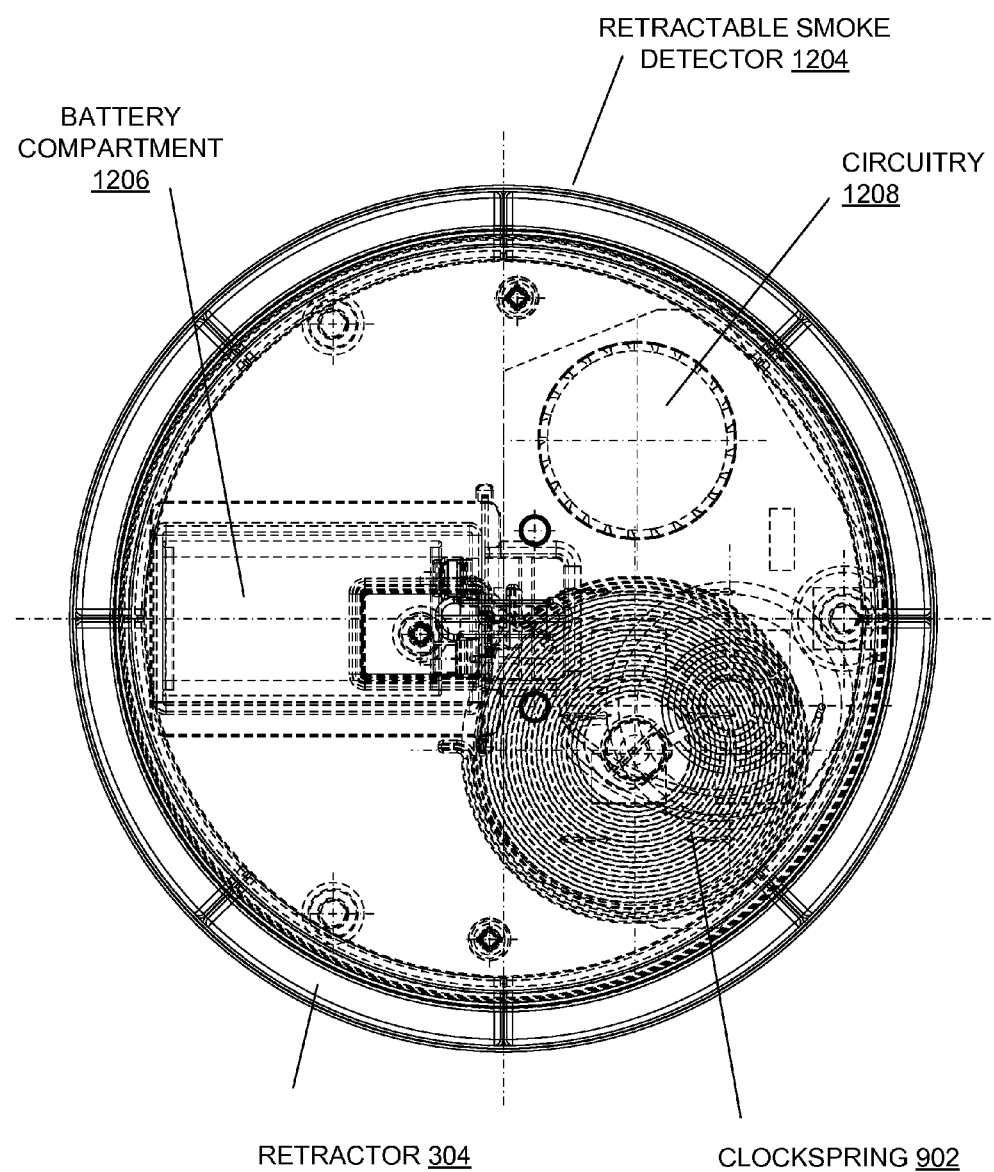

FIG. 24 is a bottom view block diagram of a retractable environmental detector system 2100 in a retracted position having a clockspring incorporated into a retractor of the environmental detector, according to an implementation.

In FIG. 24, the retractable environmental detector system 2100 includes a retractor 304. The retractor 304 of the retractable environmental detector system 2100 is mountable to a mounting surface, such as a ceiling, a roof or a wall.

The retractor 304 includes the clockspring 902.

The retractable environmental detector 2100 includes the battery compartment 1206 and environmental detector circuitry 1208 that includes a sensor audible warning speaker and operational switches.

FIG. 25 is a bottom-view of an exploded isometric block diagram of a retractable environmental detector assembly having a clockspring incorporated into a retractor of the retractable environmental detector system, according to an implementation.

In FIG. 25, the retractable environmental detector system 2100 includes a retractor 304. The retractor 304 of the retractable environmental detector system 2100 is mountable to a mounting surface (not shown), such as a ceiling, a roof or a wall.

The retractable environmental detector system 2100 includes the cable 802 or other flexible connector such as a string that is moveably attached to the retractor 304 through the rotatable clockspring 902. The cable 802 is fixedly attached to the retractable environmental detector 302.

The retractable environmental detector 302 includes a battery compartment 1206 and environmental detector circuitry 1208 that includes a sensor audible warning speaker and operational switches.

The retractable environmental detector also includes a cover 1210 and the cover 1210 includes a rotatable U-coupling 404 which can be grasped by an operator to either extend the retractable environmental detector 1202, as shown in FIG. 3, or to retract the retractable environmental detector 1202, such as shown in FIG. 1-2.

FIG. 26 is a top-view of an isometric block diagram of a retractable environmental detector assembly in an extended position having a clockspring incorporated into a retractor of the retractable environmental detector assembly, according to an implementation.

In FIG. 26, the retractable environmental detector assembly 2100 includes the retractable environmental detector 302 and the retractor 304. The retractable environmental detector system 2100 in FIG. 26 is shown in an extended position in which the retractable environmental detector 302 and the retractor 304 are not substantially in contact to each other. The retractable environmental detector system 2100 includes a pull-down string 104 which can be grasped by an operator to either extend the retractable environmental detector system 2100, as shown in FIG. 26, or to retract the retractable environmental detector system 2100. The retractor 304 of the retractable environmental detector system 2100 is mountable to a mounting surface (not shown), such as a ceiling, a roof or a wall. Other implementations of the retractable environmental detector system 2100 do not include the pull-down string 104, such as shown in FIG. 2.

The retractable environmental detector system 2100 includes a cable 802 or other flexible connector such as a string that is fixedly attached to the top of the retractable environmental detector 302 and that is movably attached to the retractor 304. The retractable environmental detector 302 also includes a battery compartment 1206 with a battery cover 2602.

FIG. 27 is a bottom-view of an isometric block diagram of a retractable environmental detector system 2100 in an extended position having a clockspring incorporated into a retractor of the retractable environmental detector system 2100, according to an implementation.

In FIG. 27, the retractable environmental detector system 2100 includes the retractable environmental detector 302 and the retractor 304. The retractable environmental detector system 2100 in FIG. 27 is shown in an extended position in which the retractable environmental detector 302 and the retractor 304 are not substantially in contact to each other. The retractable environmental detector system 2100 includes a pull-down string 104 which can be grasped by an operator to either extend the retractable environmental detector system 2100, as shown in FIG. 27, or to retract the retractable environmental detector system 2100. The retractor 304 of the retractable environmental detector system 2100 is mountable to a mounting surface (not shown), such as a ceiling, a roof or a wall. Other implementations of the retractable environmental detector system 2100 do not include the pull-down string 104, such as shown in FIG. 2. The retractable environmental detector system 2100 includes the cable 802 or other flexible connector such as a string that is fixedly attached to the top of the retractable environmental detector 302. The cable 802 is movably attached to the retractor 304 through a rotatable clockspring 902.

Figure 28:
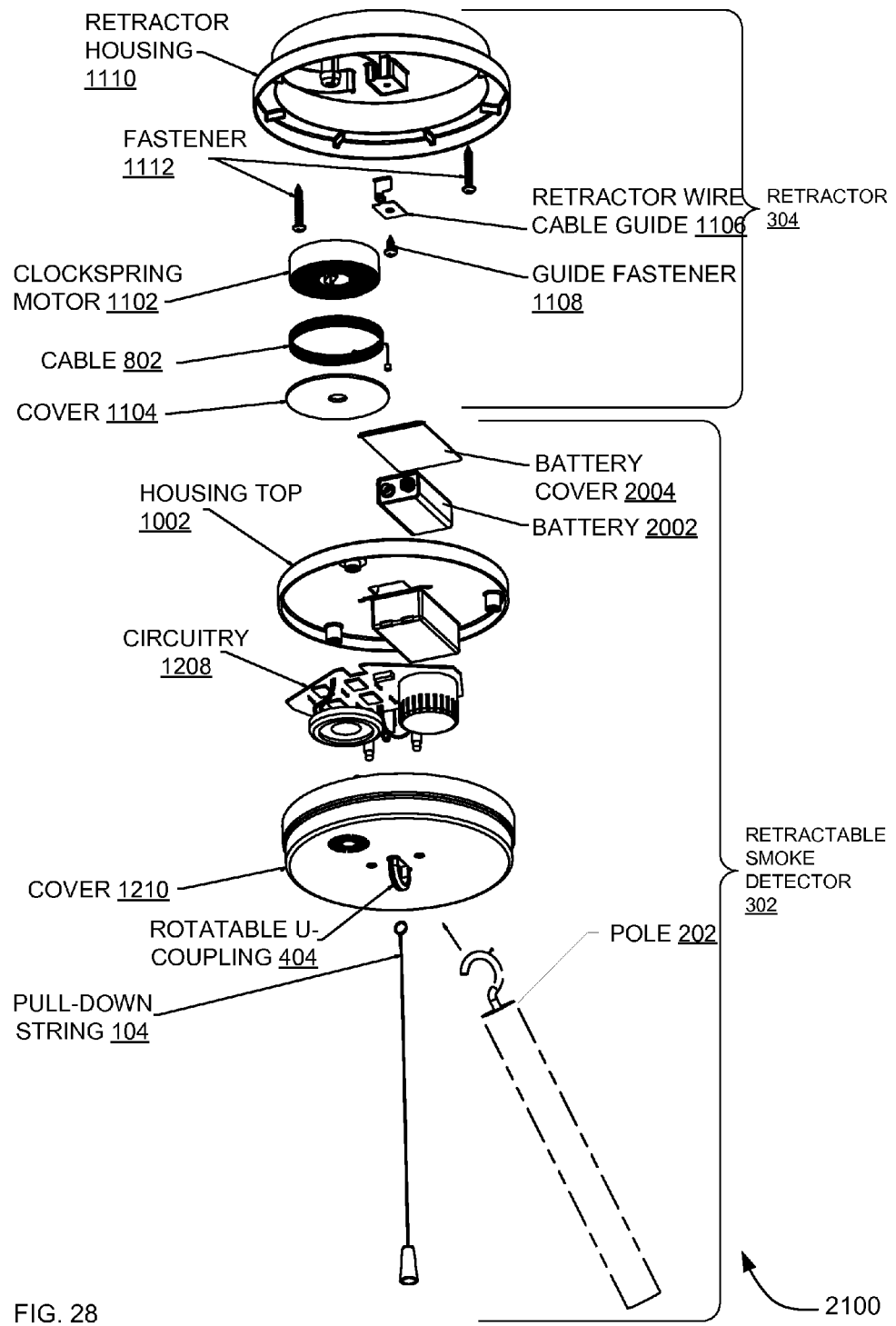

FIG. 28 is a bottom-view of an exploded isometric block diagram of a retractable environmental detector system 2100 having a clockspring incorporated into a retractor of the retractable environmental detector system 2100, according to an implementation.

The retractable environmental detector system 2100 includes the cable 802 or other flexible connector such as a string that is fixedly attached to the housing top 1002 of the retractable environmental detector 302. The cable 802 is movably attached to the retractor 304 through the rotatable clockspring 902. The rotatable clock spring 902 includes a clock spring motor 1102 that is operably coupled to the retractor cable 802, a clock spring cover 1104, a retractor wire cable guide 1106 and a guide fastener 1108; all of which are inside a housing 1110 of the retractor 304. The retractor 304 also includes mounting fasteners 1112.

Figure 29:
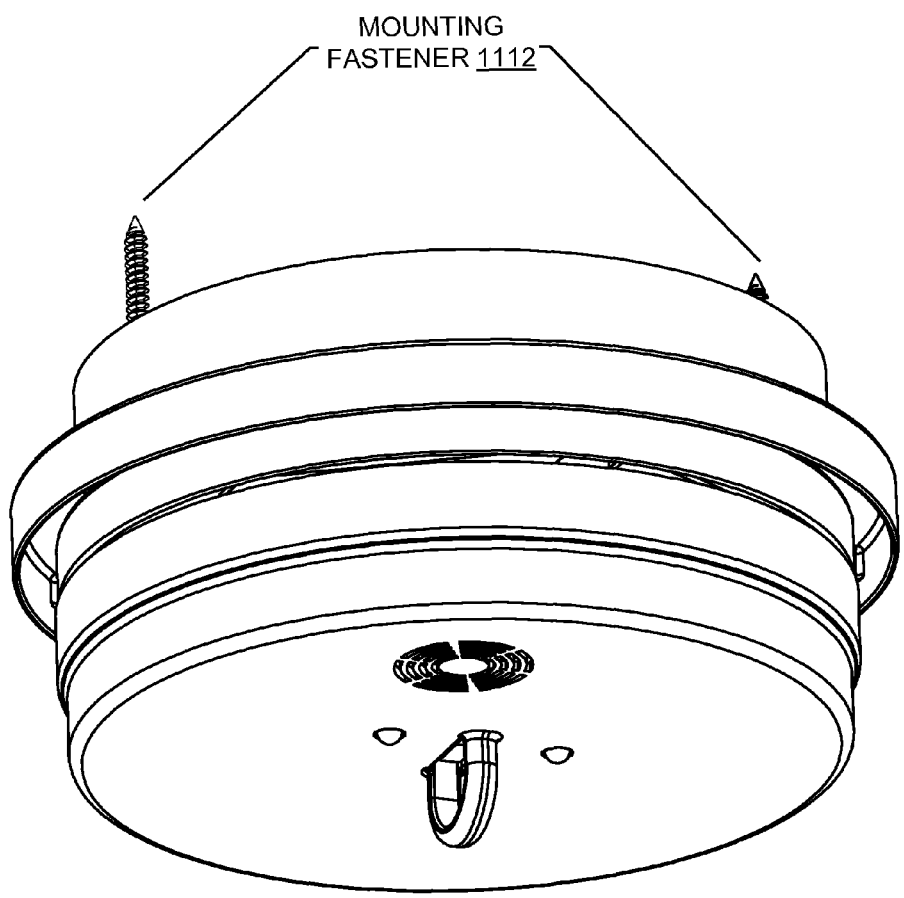

FIG. 29 is an isometric bottom view of an exploded block diagram of a retractable environmental detector system 2100 having a clockspring incorporated into a retractor of the retractable environmental detector system 2100, according to an implementation.

The retractable environmental detector system 2100 includes at least one mounting fastener 1112 to mount to a mounting surface (not shown), such as a ceiling, a roof or a wall.

FIG. 30-39 illustrate a retractable environmental detector system 3000 having an electric motor and cable inside the environmental detector to retract and extend the environmental detector.

Figure 30:
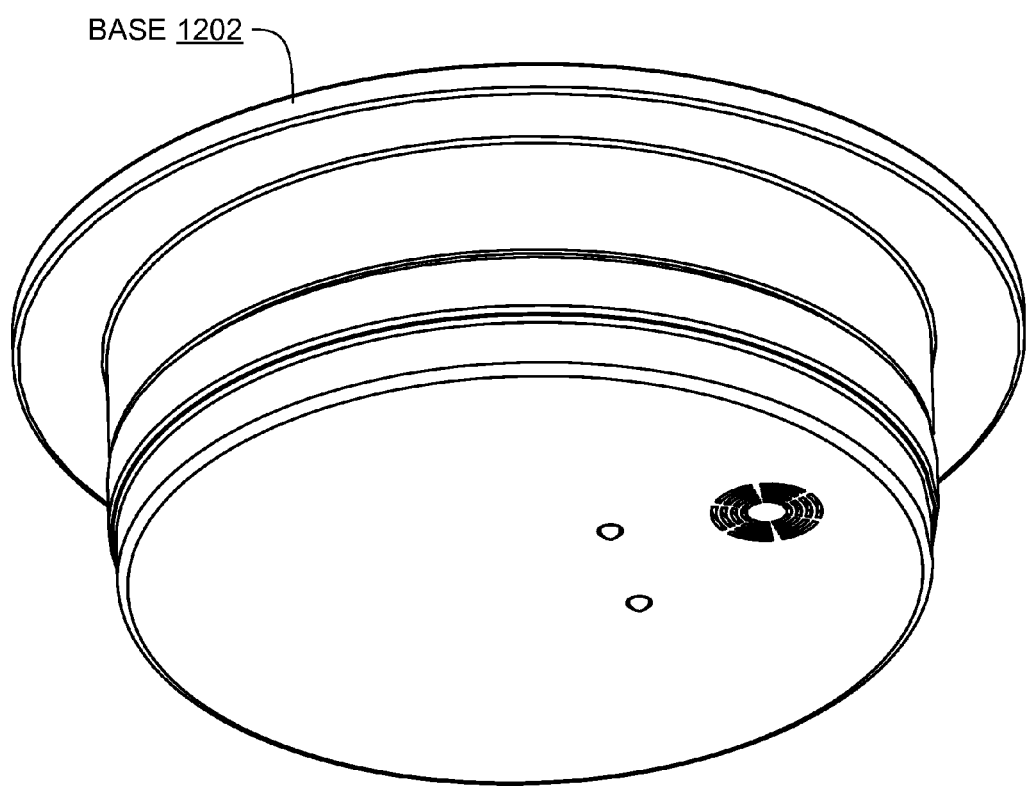
FIG. 30-39 illustrate a retractable environmental detector assembly having an electric motor and cable inside the environmental detector to retract and extend the environmental detector.

FIG. 30 is a bottom-view of an isometric block diagram of a retractable environmental detector system 3000 having an electric motor and cable inside the environmental detector to retract and extend the environmental detector, according to an implementation.

In FIG. 30, the retractable environmental detector system 3000 includes a base 1202. The base 1202 of the retractable environmental detector system 3000 is mountable to a mounting surface 108, such as a ceiling, a roof or a wall.

Figure 31:
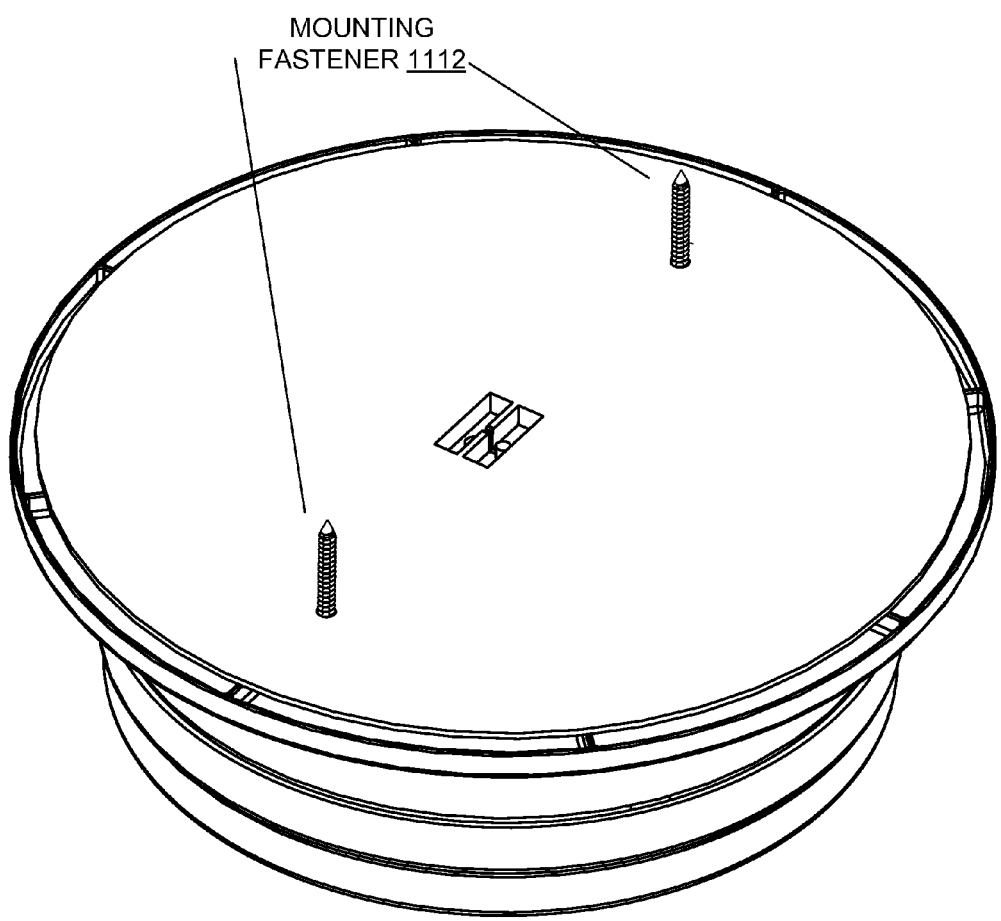

FIG. 31 is a top-view of an isometric block diagram of a retractable environmental detector system 3000 in a retracted position having an electric motor and cable inside the environmental detector to retract and extend the environmental detector, according to an implementation.

The retractable environmental detector assembly 3000 includes at least one mounting fastener 1112 to mount to a mounting surface (not shown), such as a ceiling, a roof or a wall.

Figure 32:
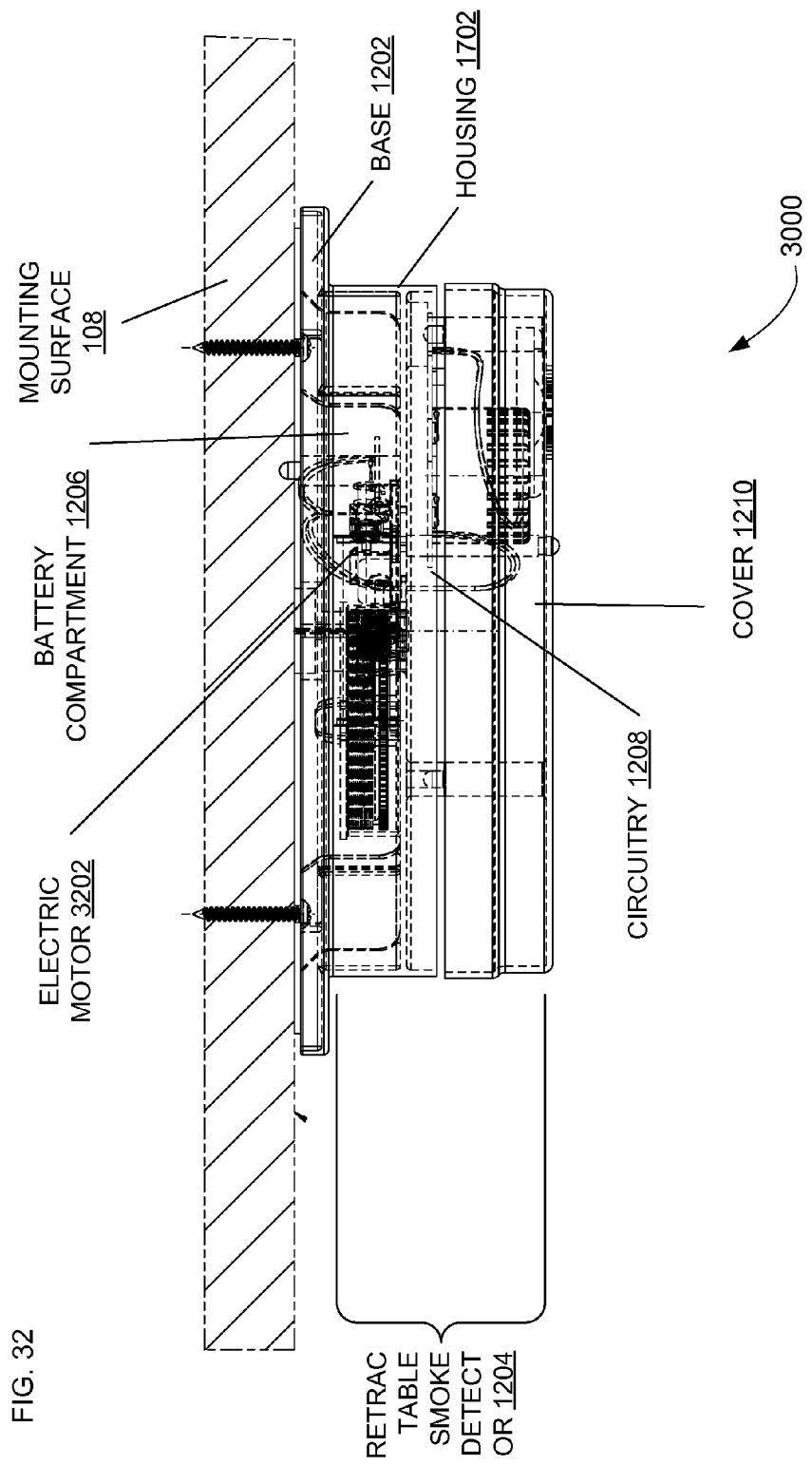

FIG. 32 is a side view block diagram of a retractable environmental detector system 3000 in a retracted position mounted on a ceiling having an electric motor and cable inside the environmental detector to retract and extend the environmental detector, according to an implementation.

In FIG. 32, the retractable environmental detector system 3000 includes a base 1202. The base 1202 of the retractable environmental detector system 3000 is mountable to a mounting surface 108, such as a ceiling, a roof or a wall.

The retractable environmental detector system 3000 includes the cable 802 or other flexible connector such as a string (not shown in FIG. 32) that is fixedly attached to the base 1202. The cable 802 is movably attached to a retractable environmental detector 1204 through the electric motor 3202 with worm gear. Electric motors are one type of movement actuators.

The retractable environmental detector 1204 includes the battery compartment 1206 and environmental detector circuitry 1208 that includes a sensor audible warning speaker and operational switches.

The retractable environmental detector also includes the cover 1210 (not shown in FIG. 39) and the housing 1702.

Figure 33:
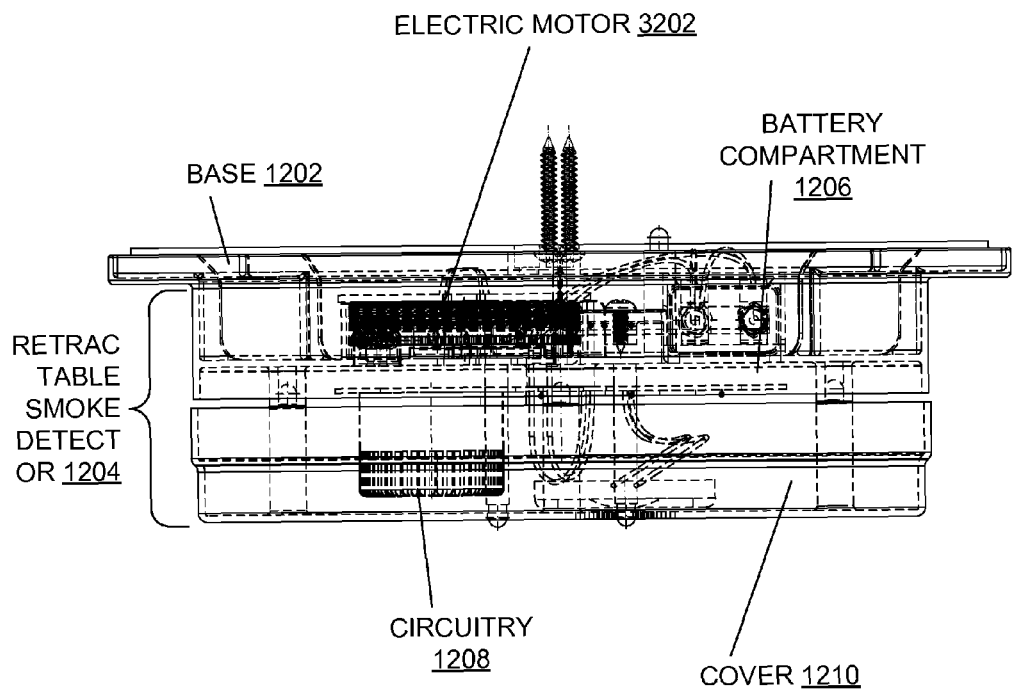

FIG. 33 is a side view block diagram of a retractable environmental detector assembly in a retracted position having an electric motor and cable inside the environmental detector to retract and extend the environmental detector, according to an implementation.

In FIG. 33, the retractable environmental detector assembly 3000 includes a base 1202. The base 1202 of the retractable environmental detector system 3000 is mountable to a mounting surface 108 (not shown in FIG. 33), such as a ceiling, a roof or a wall.

The retractable environmental detector system 3000 includes the cable 802 or other flexible connector such as a string (not shown in FIG. 33) that is fixedly attached to the base 1202. The cable 802 is movably attached to a retractable environmental detector 1204 through the electric motor with worm gear 3202.

The retractable environmental detector 1204 includes the battery compartment 1206 and environmental detector circuitry 1208 that includes a sensor audible warning speaker and operational switches.

The retractable environmental detector also includes the cover 1210.

Figure 34:
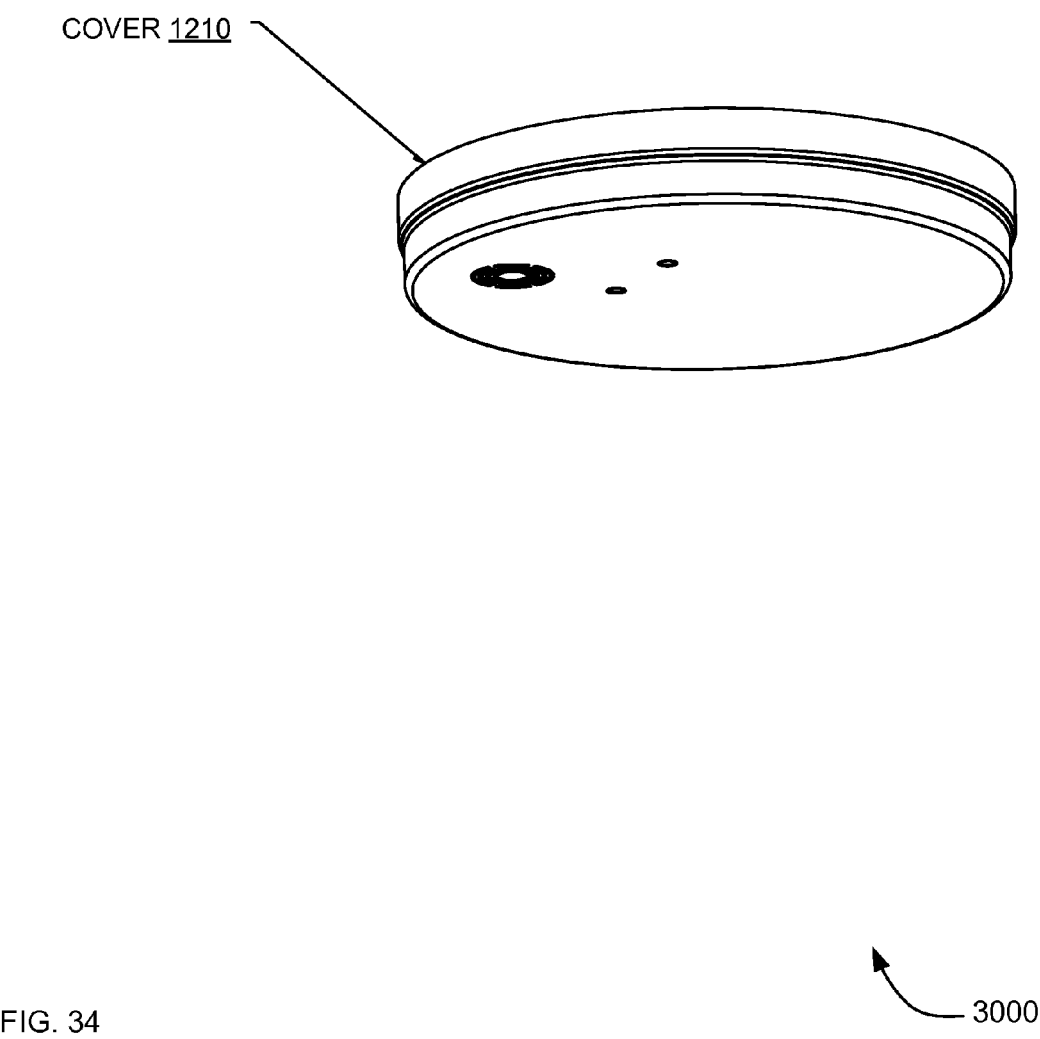

FIG. 34 is a bottom-view of an isometric block diagram of a cover of a retractable environmental detector system having an electric motor and cable inside the environmental detector to retract and extend the environmental detector, according to an implementation. The retractable environmental detector includes a cover 1210.

Figure 35:
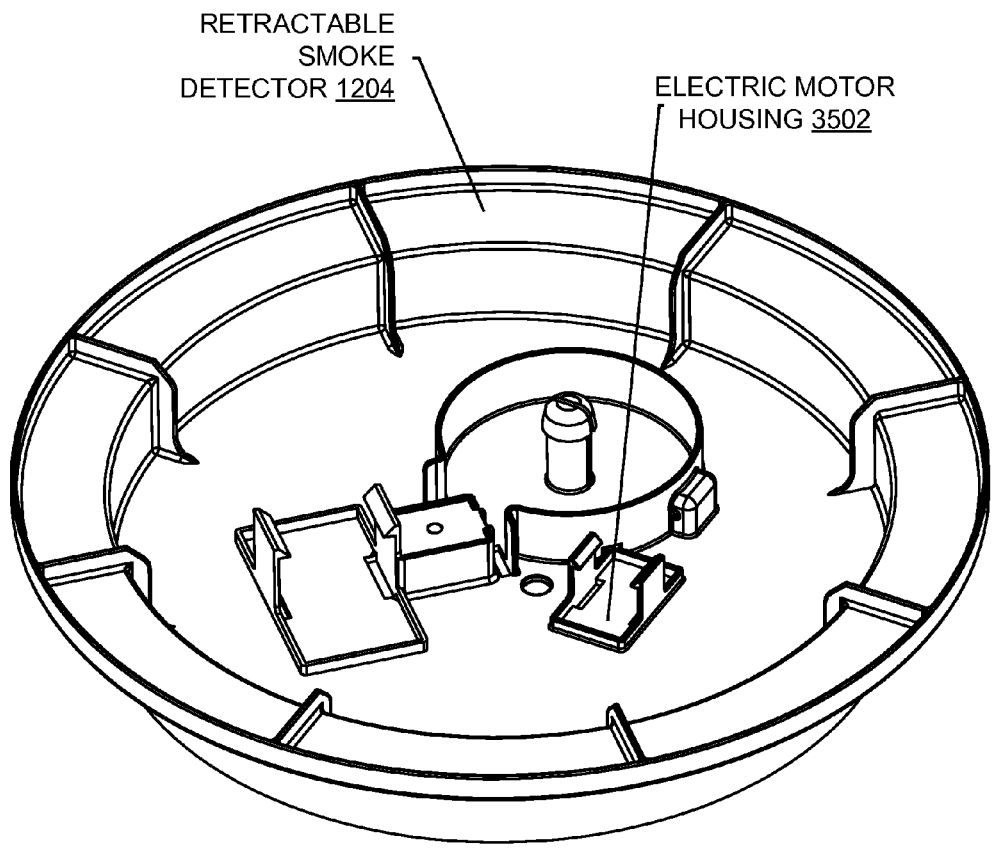

FIG. 35 is a top-view of an isometric block diagram of a base for a retractable environmental detector system 3000 having an electric motor and cable inside the environmental detector to retract and extend the environmental detector, according to an implementation.

The retractable environmental detector system 3000 includes a retractable environmental detector 1204. The retractable environmental detector 1204 includes an electric motor with worm gear and cable wire ring gear hub housing 3502.

Figure 36:
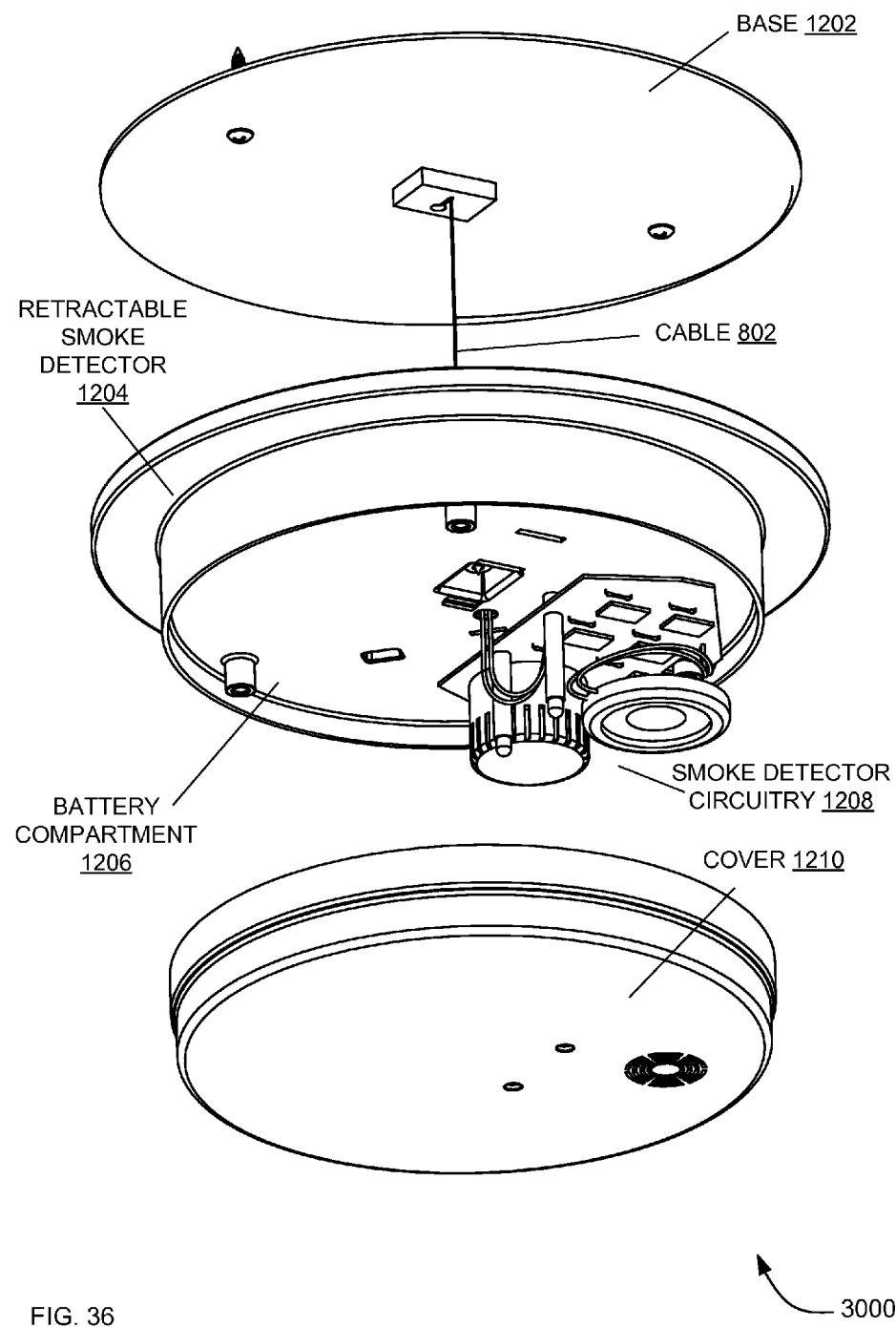

FIG. 36 is a bottom-view of an exploded isometric block diagram of a retractable environmental detector system 3000 in an extended position detector having an electric motor and cable inside the environmental detector to retract and extend the environmental detector, according to an implementation.

The retractable environmental detector system 3000 includes the cable 802 or other flexible connector such as a string that is fixedly attached to the base 1202. The cable 802 is movably attached to a retractable environmental detector 1204 through the cable wire ring gear hub 3904 (not shown in FIG. 36).

The retractable environmental detector 1204 includes a battery compartment 1206 and environmental detector circuitry 1208 that includes a sensor audible warning speaker and operational switches.

The retractable environmental detector also includes a cover 1210.

Figure 37:
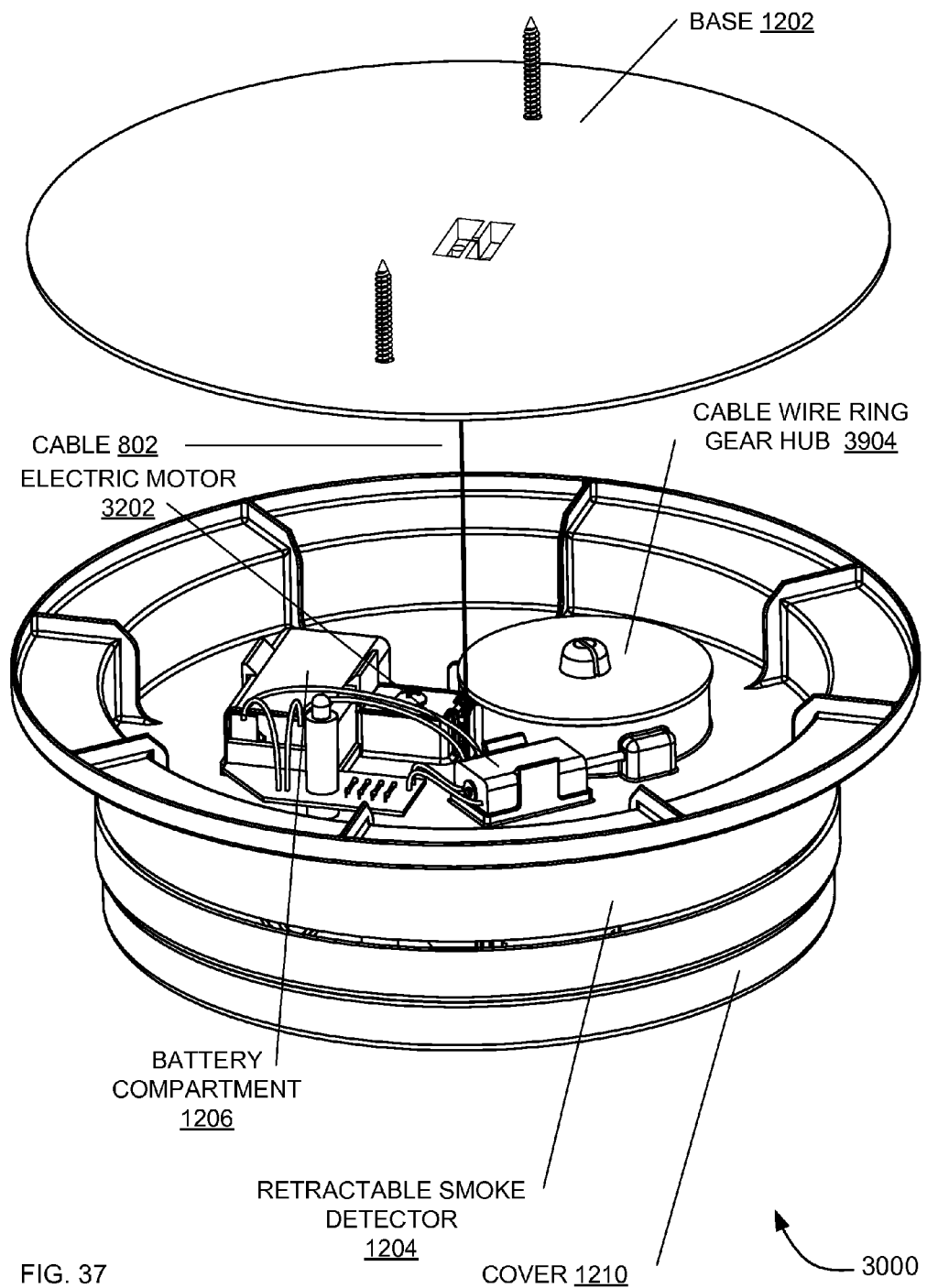

FIG. 37 is a top-view of an isometric block diagram of a retractable environmental detector system 3000 in an extended position having an electric motor and cable inside the environmental detector to retract and extend the environmental detector, according to an implementation.

The retractable environmental detector system 3000 includes the cable 802 or other flexible connector such as a string that is fixedly attached to the base 1202. The cable 802 is movably attached to a retractable environmental detector 1204 through the electric motor 3202.

The retractable environmental detector 1204 includes a battery compartment 1206 and environmental detector circuitry 1208 that includes a sensor audible warning speaker and operational switches.

The retractable environmental detector also includes a cover 1210.

Figure 38:
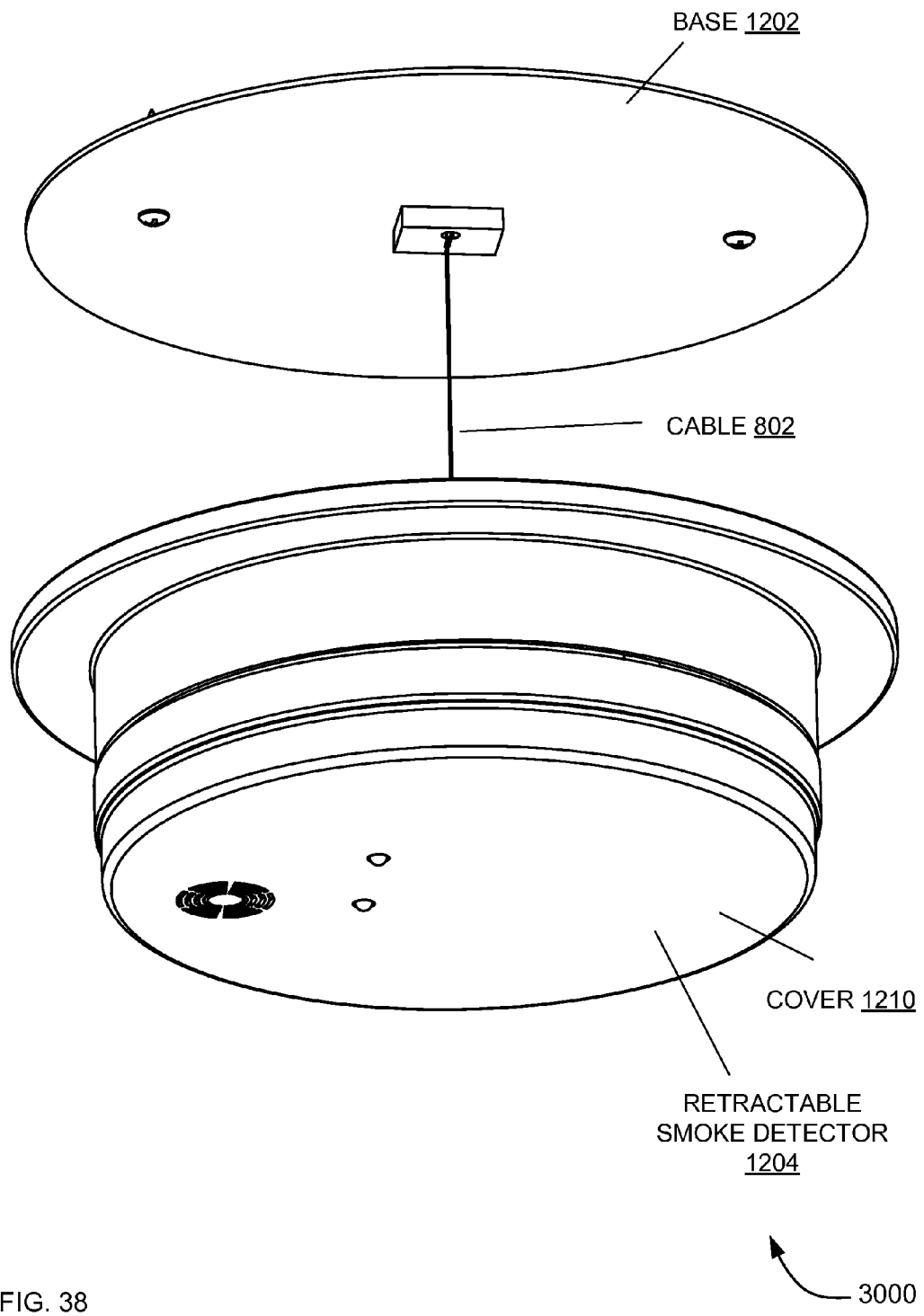

FIG. 38 is a bottom-view of an isometric block diagram of a retractable environmental detector system 3000 in an extended position having an electric motor and cable inside the environmental detector to retract and extend the environmental detector, according to an implementation.

In FIG. 38, the retractable environmental detector system 3000 includes a base 1202. The base 1202 of the retractable environmental detector system 3000 is mountable to a mounting surface, such as a ceiling, a roof or a wall.

The retractable environmental detector system 3000 includes the cable 802 or other flexible connector such as a string that is fixedly attached to the base 1202. The cable 802 is movably attached to a retractable environmental detector 1204 through the rotatable ring gear hub 3904 (not shown in FIG. 38).

The retractable environmental detector 1204 includes the cover 1210.

Figure 39:
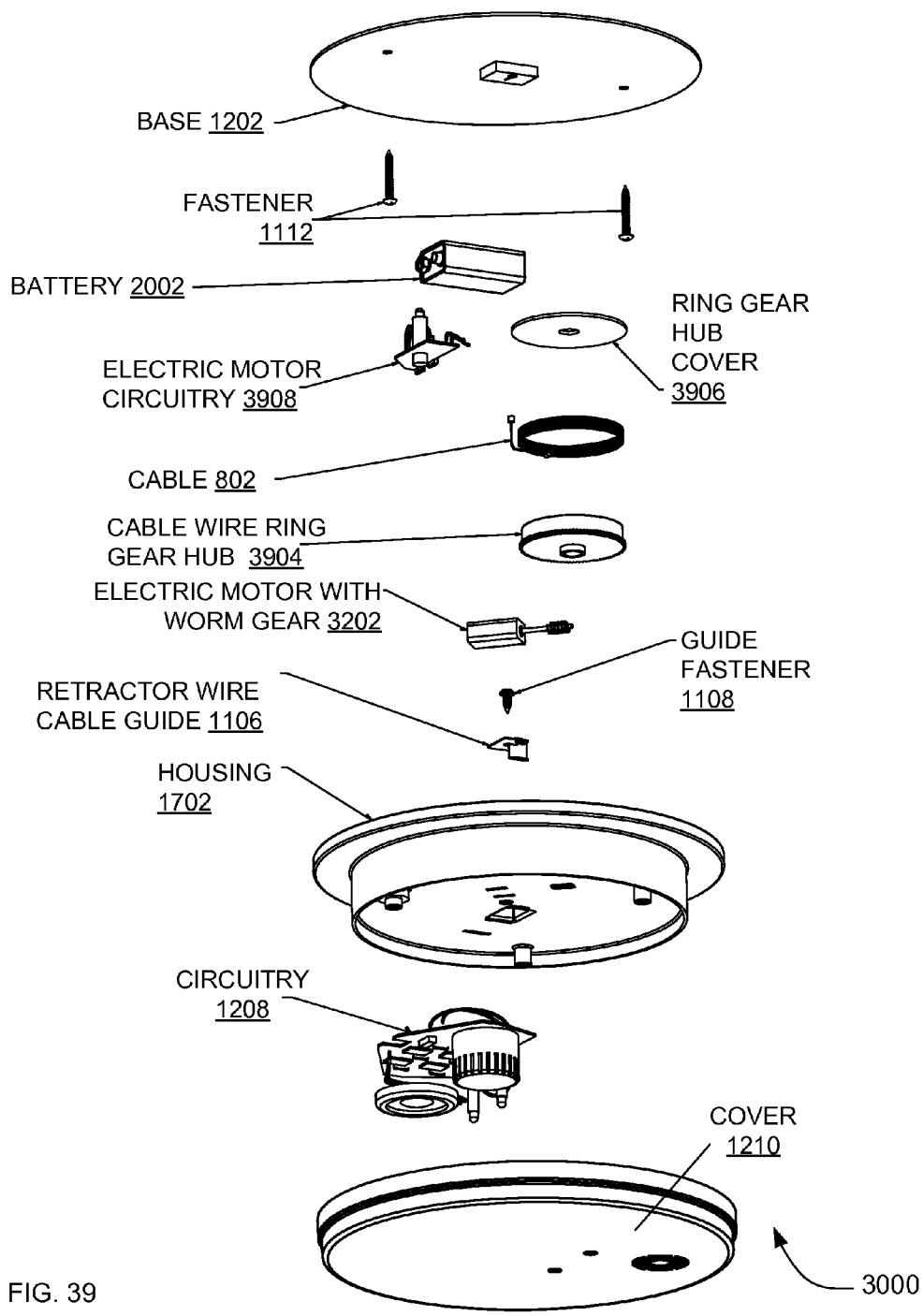

FIG. 39 is a bottom-view of an exploded isometric exploded block diagram of a retractable environmental detector system having an electric motor and cable inside the environmental detector to retract and extend the environmental detector, according to an implementation.

In FIG. 39, the retractable environmental detector assembly 3000 includes the base 1202. The base 1202 of the retractable environmental detector system 3000 is mountable to a mounting surface (not shown), such as a ceiling, a roof or a wall. The base 1202 also includes mounting fasteners 1112.

The retractable environmental detector system 3000 includes the cable 802 or other flexible connector such as a string that is movably attached to the housing 1702 (as shown in FIG. 39) of the retractable environmental detector 302. The cable 802 is fixedly attached to the base 1202 around the cable wire ring gear hub 3904 driven by the electric motor 3202. The electric motor 3202 is operably coupled to the retractor cable 802 through a cable wire ring gear hub 3904, a ring gear hub cover 3906, a retractor wire cable guide 1106 and a guide fastener 1108; all of which are inside a housing 1702 of the retractable environmental detector 302.

The retractable environmental detector 302 includes an electric motor with worm gear 3202 and an electric motor circuitry with retractor switch and control 3908. In some implementations, the electric motor circuitry with retractor switch and control 3908 is combined with the circuitry 1208. The retractable environmental detector system 3000 also includes include a cover 1210.

FIG. 40-47 illustrate a retractable environmental detector system 4000 having an electric motor inside the retractor.

Figure 40:
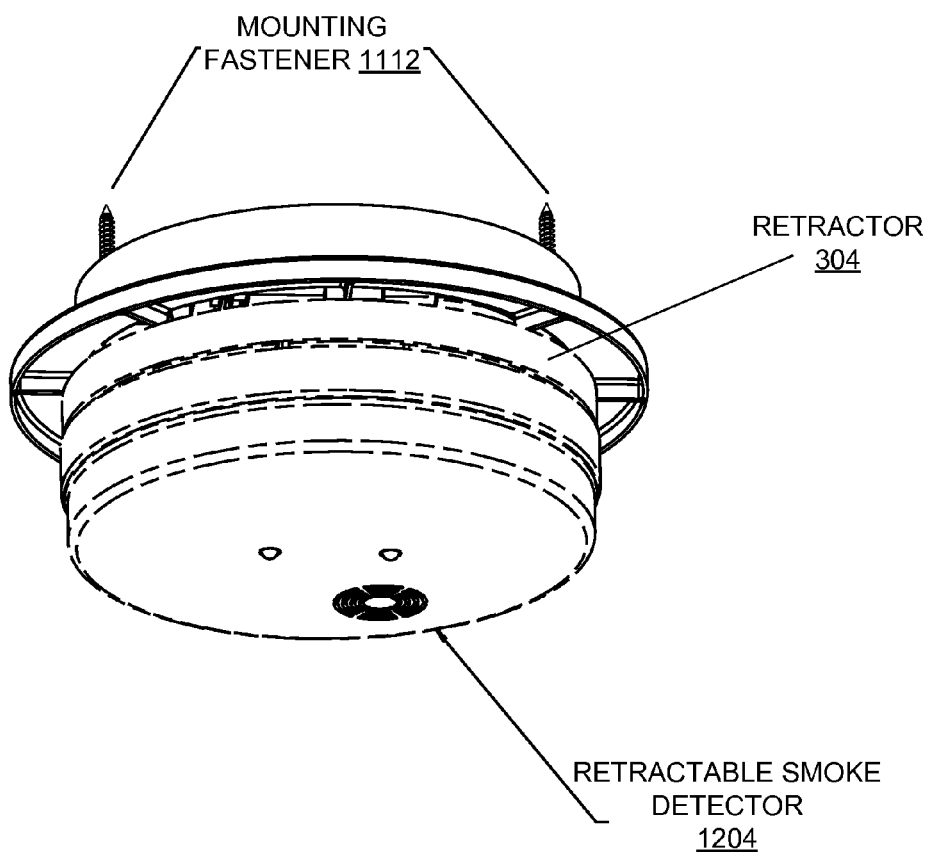
FIG. 40-47 illustrate a retractable environmental detector assembly having an electric motor inside the retractor attached to the ceiling.

FIG. 40 is a bottom-view of an isometric block diagram of a retractable environmental detector system 4000 having an electric motor and cable inside the retractor to retract and extend the environmental detector, according to an implementation.

The retractable environmental detector system 4000 includes the retractor 304 having an electric motor (not shown in FIG. 40) and the retractor 304 also includes mounting fasteners 1112. The retractable environmental detector system 4000 includes the retractable environmental detector 1204.

Figure 41:
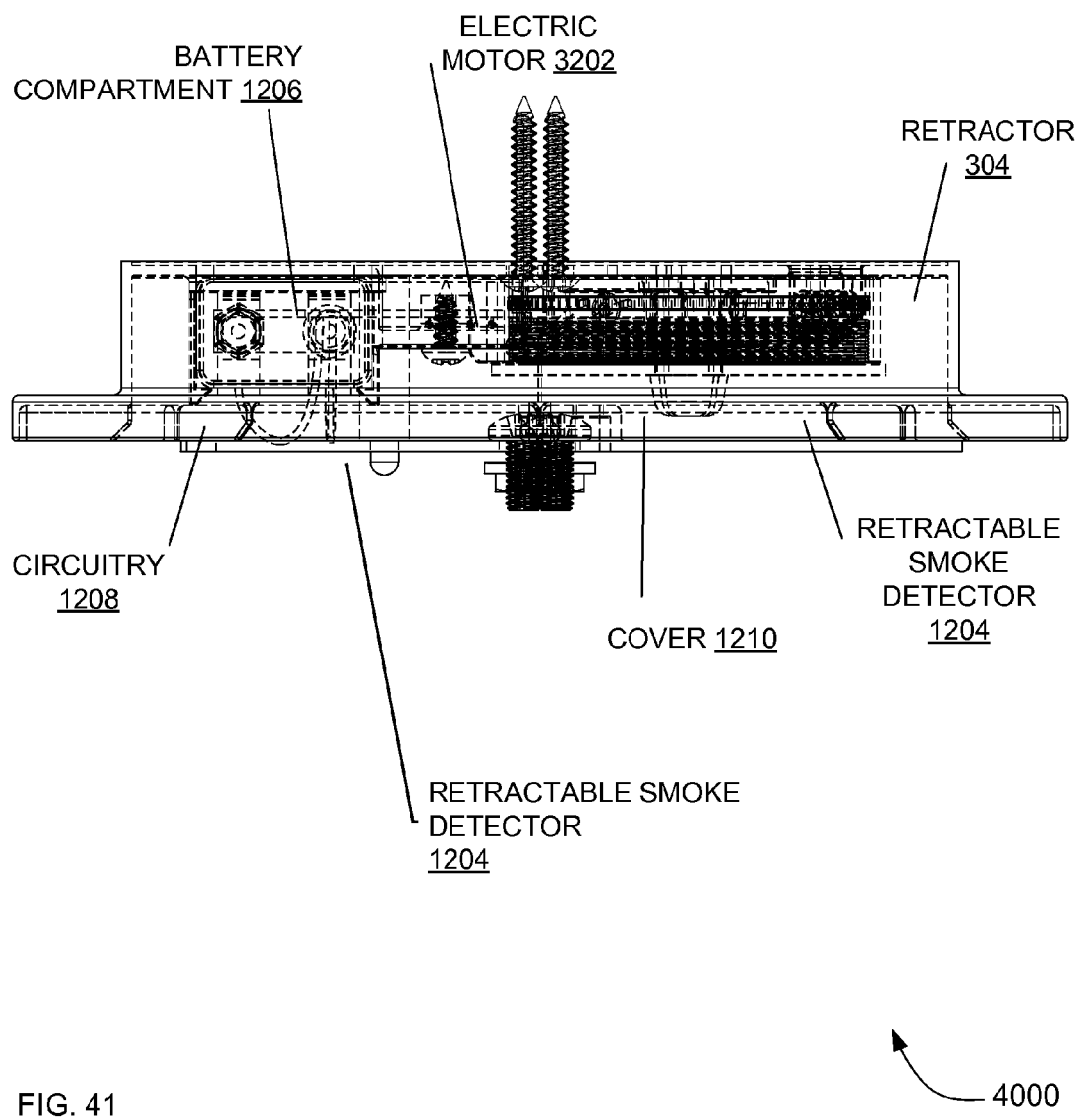

FIG. 41 is a side view block diagram of a retractable environmental detector system 4000 in a retracted position having an electric motor and cable inside the retractor to retract and extend the environmental detector, according to an implementation.

In FIG. 41, the retractable environmental detector system 4000 includes a retractor 304. The retractor 304 of the retractable environmental detector system 4000 is mountable to a mounting surface 108, such as a ceiling, a roof or a wall.

The retractable environmental detector system 4000 includes the cable 802 or other flexible connector such as a string (not shown in FIG. 41) that is moveably attached to the retractor 304. The cable 802 is fixedly attached to a retractable environmental detector 1204 through the electric motor 3202.

The retractor 304 includes the battery compartment 1206. The retractable environmental detector 1204 includes the environmental detector circuitry 1208 that includes a sensor audible warning speaker and operational switches.

Figure 42:
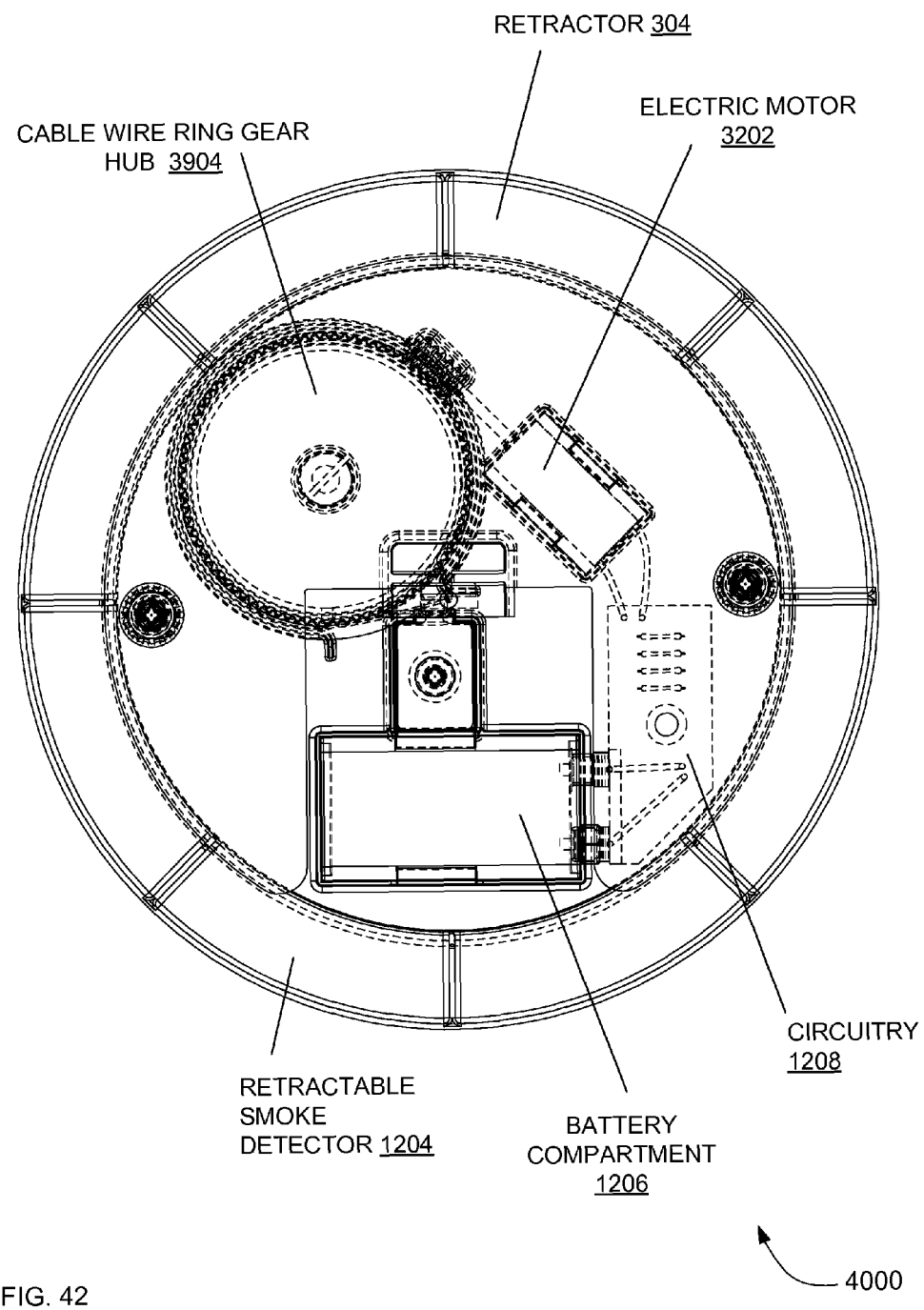

FIG. 42 is a bottom view block diagram of a retractable environmental detector system 4000 in a retracted position having an electric motor and cable inside the retractor to retract and extend the environmental detector, according to an implementation.

In FIG. 42, the retractable environmental detector system 4000 includes a retractor 304. The retractor 304 of the retractable environmental detector system 4000 is mountable to a mounting surface 108 (not shown in FIG. 42), such as a ceiling, a roof or a wall.

The retractable environmental detector system 4000 includes the cable 802 or other flexible connector such as a string (not shown in FIG. 42) that is moveably attached to the retractor 304. The cable 802 is fixedly attached to a retractable environmental detector 1204 through the electric motor 3202.

The retractor 304 includes the battery compartment 1206. The retractable environmental detector 1204 includes the environmental detector circuitry 1208 that includes a sensor audible warning speaker and operational switches.

Figure 43:
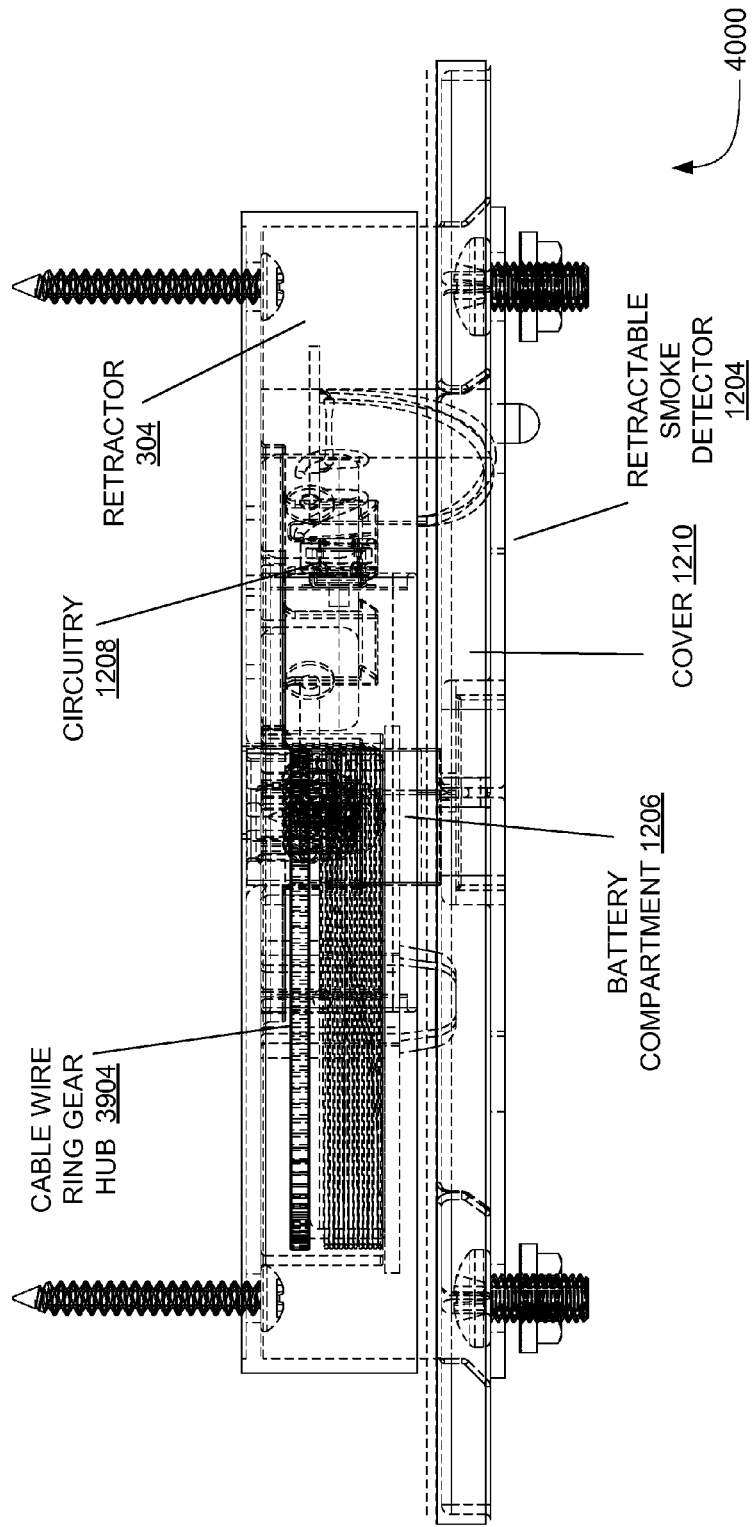

FIG. 43 is a side view block diagram of a retractable environmental detector system 4000 in a retracted position having an electric motor and cable inside the retractor to retract and extend the environmental detector, according to an implementation.

In FIG. 43, the retractable environmental detector system 4000 includes a retractor 304. The retractor 304 of the retractable environmental detector system 4000 is mountable to a mounting surface 108 (not shown in FIG. 43), such as a ceiling, a roof or a wall.

The retractable environmental detector system 4000 includes the cable 802 or other flexible connector such as a string (not shown in FIG. 42) that is moveably attached to the retractor 304. The cable 802 is fixedly attached to a retractable environmental detector 1204 through the electric motor 3202.

The retractor 304 includes the battery compartment 1206. The retractable environmental detector 1204 includes the environmental detector circuitry 1208 that includes a sensor audible warning speaker and operational switches.

Figure 44:
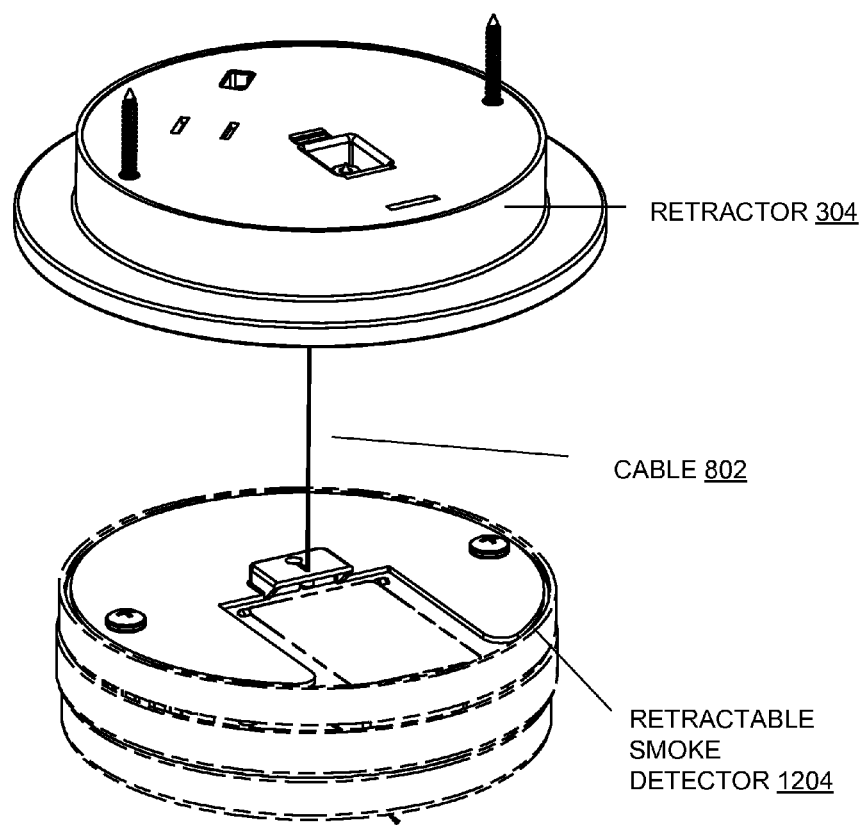

FIG. 44 is a top-view of an isometric block diagram of a retractable environmental detector system 4000 in an extended position having an electric motor and cable inside the retractor to retract and extend the environmental detector, according to an implementation.

In FIG. 44, the retractable environmental detector system 4000 includes the retractable environmental detector 1204 and the retractor 304. The retractable environmental detector system 4000 in FIG. 44 is shown in an extended position in which the retractable environmental detector 1204 and the retractor 304 are not substantially in contact to each other. The retractor 304 of the retractable environmental detector system 4000 is mountable to a mounting surface (not shown), such as a ceiling, a roof or a wall.

The retractable environmental detector system 4000 includes a cable 802 or other flexible connector such as a string that is fixedly attached to the top of the retractable environmental detector 302 and that is movably attached to the retractor 304.

Figure 45:
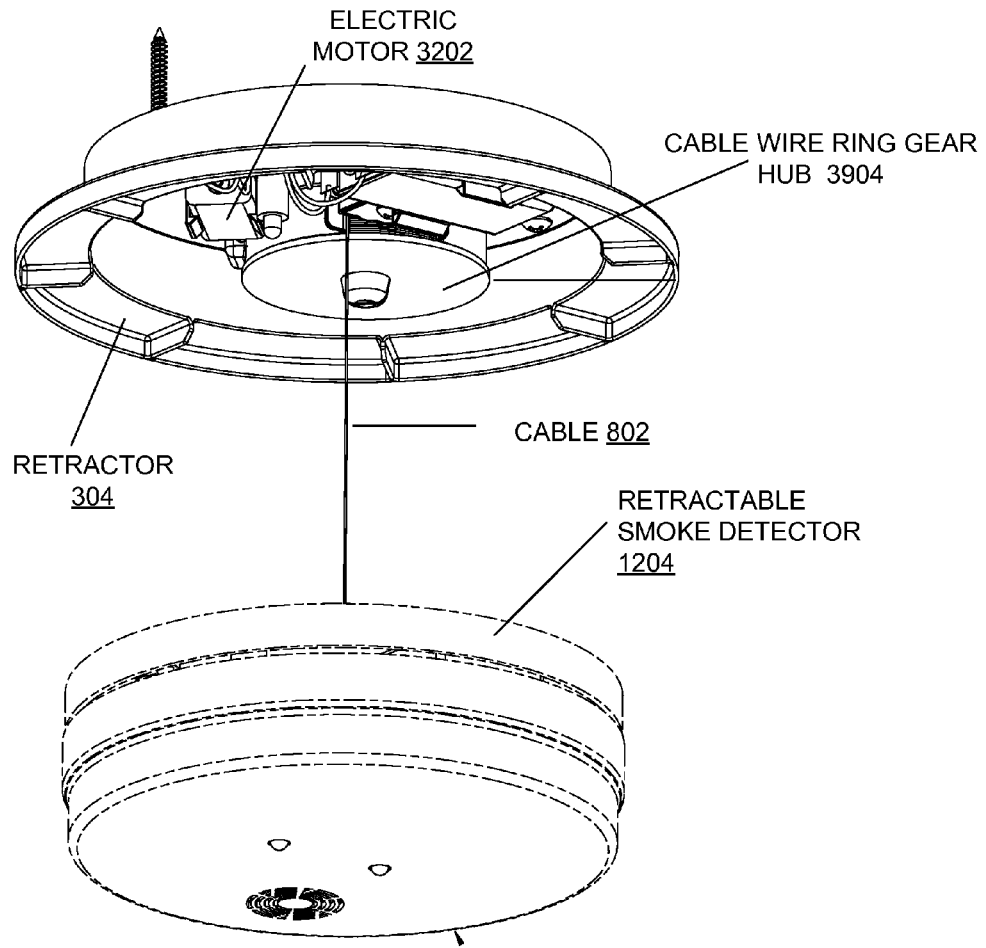

FIG. 45 is a bottom-view of an isometric block diagram of a retractable environmental detector system 4000 in an extended position having an electric motor and cable inside the retractor to retract and extend the environmental detector, according to an implementation.

In FIG. 45, the retractable environmental detector system 4000 includes the retractable environmental detector 1204 and the retractor 304. The retractable environmental detector system 4000 in FIG. 45 is shown in an extended position in which the retractable environmental detector 1204 and the retractor 304 are not substantially in contact to each other. The retractor 304 of the retractable environmental detector system 4000 is mountable to a mounting surface (not shown), such as a ceiling, a roof or a wall.

The retractable environmental detector system 4000 includes the cable 802 or other flexible connector such as a string that is fixedly attached to the top of the retractable environmental detector 1204. The cable 802 is movably attached to the retractor 304 electric motor 3202.

Figure 46:
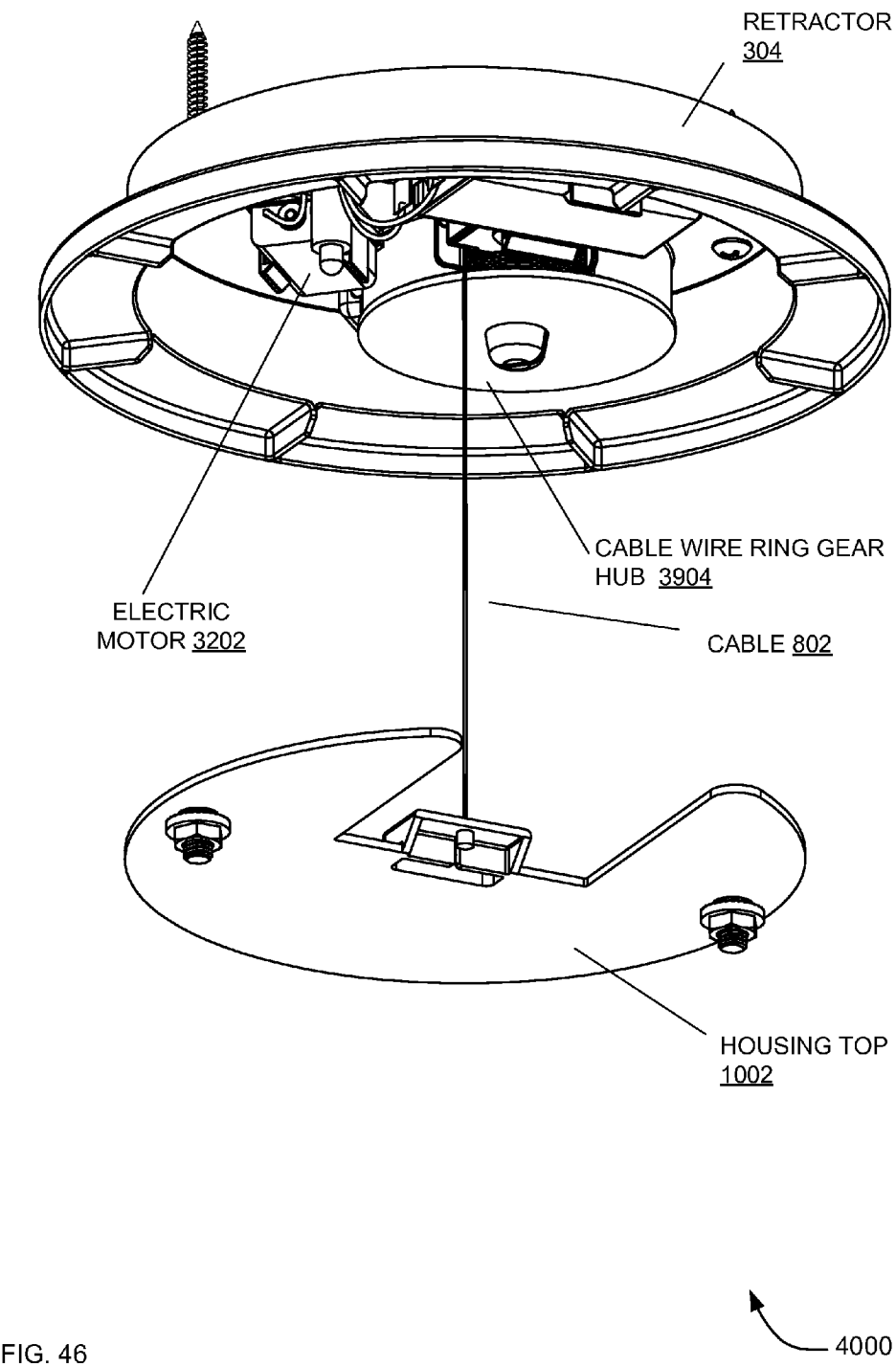

FIG. 46 is a bottom-view of an isometric block diagram of a retractor of a retractable environmental detector system 4000 in an extended position having an electric motor and cable inside the retractor to retract and extend the environmental detector, according to an implementation.

In FIG. 46, the retractable environmental detector system 4000 includes a housing top 1002 and the retractor 304. The retractable environmental detector system 4000 in FIG. 46 is shown in an extended position in which the housing top 1002 and the retractor 304 are not substantially in contact to each other. The retractable environmental detector system 4000 includes a pull-down string 104 which can be grasped by an operator to either extend the retractable environmental detector system 4000, as shown in FIG. 46, or to retract the retractable environmental detector system 4000. The retractor 304 of the retractable environmental detector system 4000 is mountable to a mounting surface (not shown), such as a ceiling, a roof or a wall.

The retractable environmental detector system 4000 includes the cable 802 or other flexible connector such as a string that is fixedly attached to the housing top 1002 of the retractable environmental detector 302. The cable 802 is movably attached to the retractor 304 through the electric motor with worm gear 3202.

Figure 47:
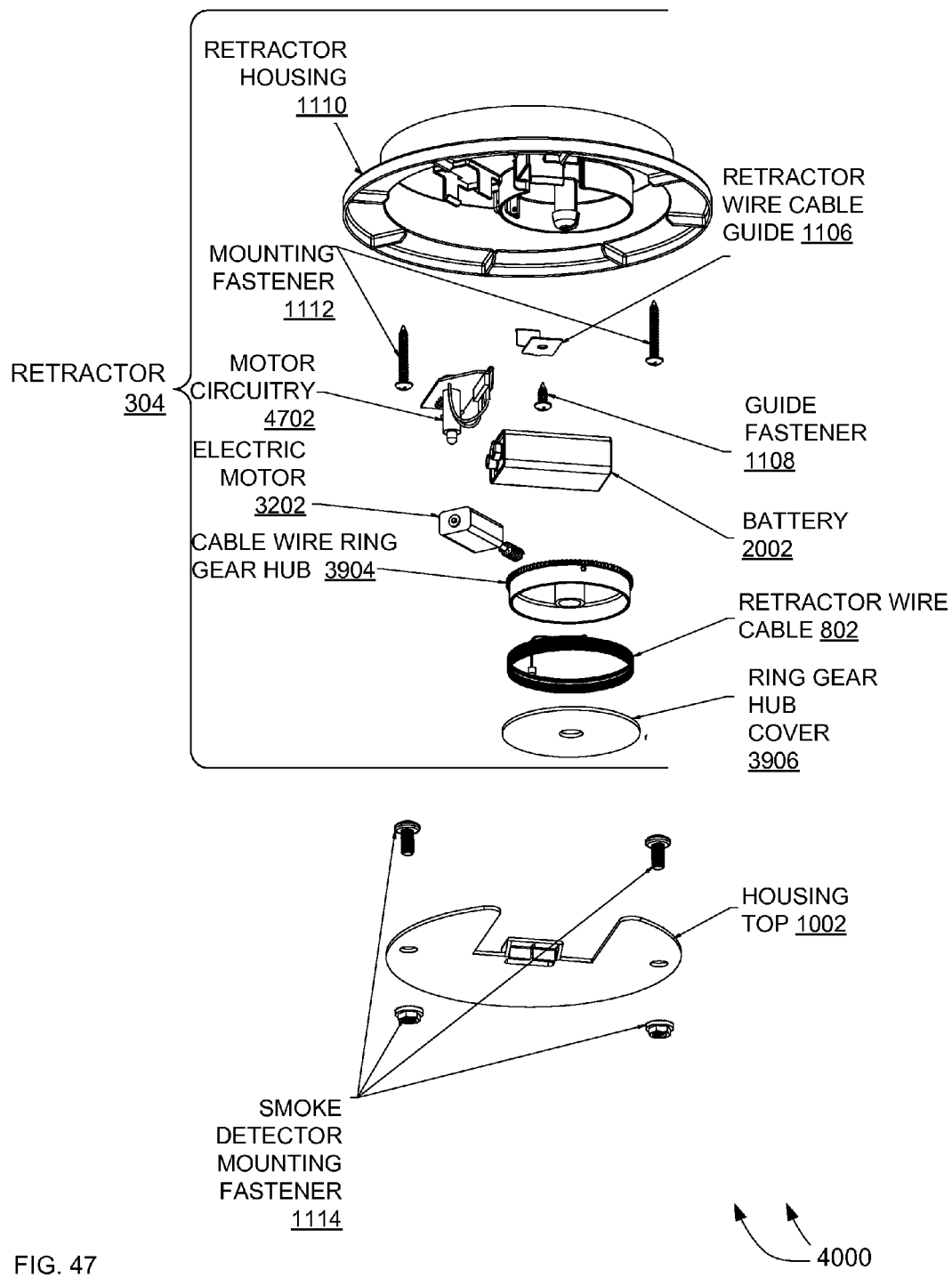

FIG. 47 is a bottom-view of an exploded isometric block diagram of a retractor of a retractable environmental detector system 4000 shown not extended having an electric motor and cable inside the retractor to retract and extend the environmental detector, according to an implementation.

In FIG. 47, the retractable environmental detector system 4000 includes the retractor 304. The retractor 304 of the retractable environmental detector system 4000 is mountable to a mounting surface (not shown), such as a ceiling, a roof or a wall, through mounting fasteners 1112.

The retractable environmental detector system 4000 includes the cable 802 or other flexible connector such as a string that is fixedly attached to the housing top 1002 of the retractable environmental detector 302. The cable 802 is movably attached to the retractor 304 through the electric motor with worm gear 3202.

The retractor 304 includes an electric motor circuitry 4702 with a retractor switch and control. The electric motor with worm gear 3202 is operably coupled to the retractor cable 802 through a cable wire ring gear hub 3904. The cable wire ring gear hub 3904 is operably coupled to the ring gear hub cover 3906, a retractor wire cable guide 1106 and a guide fastener 1108; all of which are inside a housing 1110 of the retractor 304. The battery 2002 provides electric power to both the electric motor with worm gear 3202 and the electric motor circuitry 4702.

FIG. 48-59 illustrate a retractable environmental detector system 4000 having remote motor wires implemented by the retractor electrical cable wire and also having a battery and motor inside the environmental detector housing. Unlike all the previous implementations which had a cable 802, the implementations shown in FIG. 48-59 is unique in including an electrical wire that also conducts electricity between the retractor and the environmental detector system 4000 and also acts as a supporting cable (so the supporting cable has to functions, support and conducts electricity), as it is shown as a retractor electrical wire 5202 correctly shown on FIG. 56. Remote being that the battery is in the environmental detector provides electricity remotely by the retractor electrical wire 5202 to the retractor that has the electrical motor. As an analogy, like a household vacuum cleaner, that has a wire which remotely provides power to the cleaning head motor. As shown on FIG. 57, the retractor electrical wire 5202 winds around the cable wire ring hub 3904 and connects to the housing top 1002, in such that the environmental detector simply hangs on the retractor electrical wire 5202. The electrical terminal contact ring brushes 5702 maintain an electrical contact circuit between the motor and the battery as the cable wire ring hub 3904 rotates.

Figure 48:
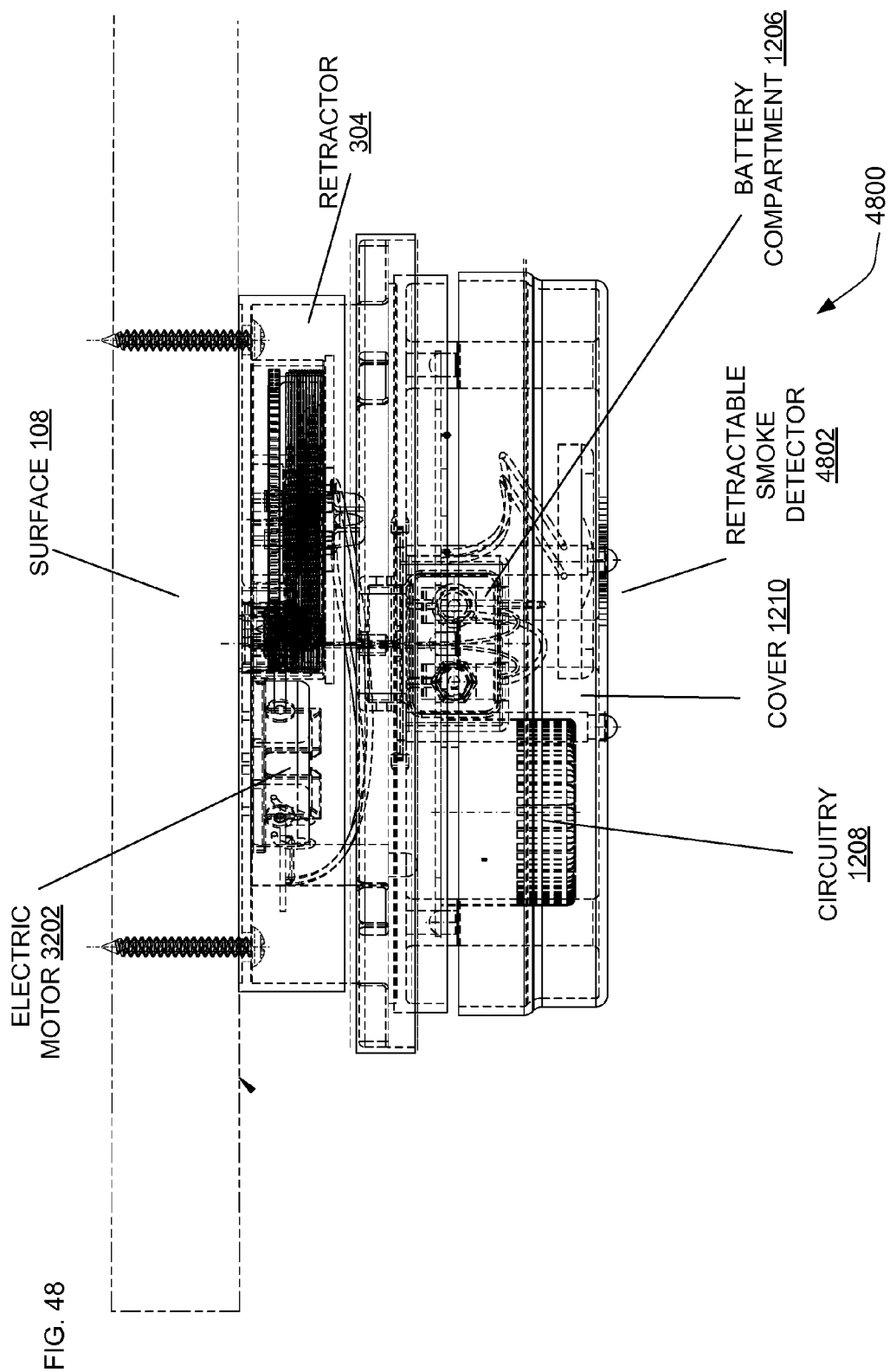
FIG. 48-59 illustrate a retractable environmental detector assembly having remote motor wires implemented by electrical cable wires and also having a battery and motor inside the environmental detector housing.

FIG. 48 is a side view block diagram of a retractable environmental detector system 4800 in a retracted position mounted on a ceiling having remote motor wires implemented by the retractor electrical wire and also having a battery and motor inside the environmental detector housing, according to an implementation.

In FIG. 48, the retractable environmental detector system 4800 includes a retractor 304. The retractor 304 of the retractable environmental detector system 4800 is mountable to a mounting surface 108, such as a ceiling, a roof or a wall.

The retractable environmental detector system 4800 includes the retractor electrical wire 5202 (not shown in FIG. 48) that is moveably attached to the retractor 304. The cable 802 is fixedly attached to a retractable environmental detector 4802 through the electric motor 3202.

The retractor 304 includes the battery compartment 1206. The retractable environmental detector 1204 includes the environmental detector circuitry 1208 that includes a sensor audible warning speaker and operational switches.

Figure 49:
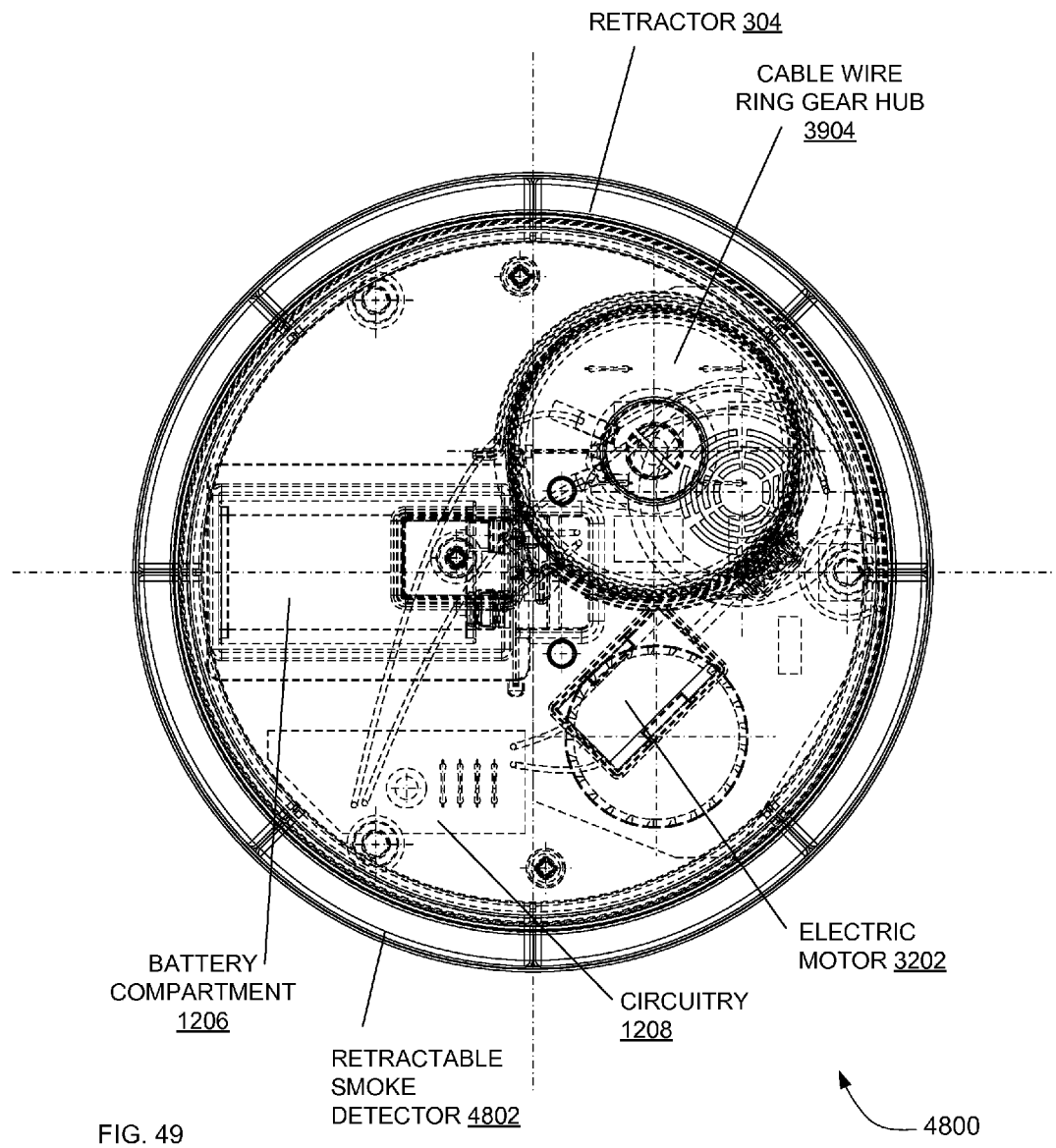

FIG. 49 is a bottom view block diagram of a retractable environmental detector system 4800 in a retracted position having remote motor wires implemented by retractor electrical wire and also having a battery and motor inside the environmental detector housing, according to an implementation.

In FIG. 49, the retractable environmental detector system 4800 includes a retractor 304. The retractor 304 of the retractable environmental detector system 4800 is mountable to a mounting surface 108 (not shown in FIG. 49), such as a ceiling, a roof or a wall.

The retractable environmental detector system 4800 includes the retractor electrical wire 5202 (shown wrapped around the cable wire ring gear hub 3904) that is moveably attached to the retractor 304. The retractor electrical wire 5202 is fixedly attached to a retractable environmental detector 4802 through the cable wire ring gear hub 3904.

The retractor 304 includes the battery compartment 1206. The retractable environmental detector 1204 includes the environmental detector circuitry 1208 that includes a sensor audible warning speaker and operational switches.

Figure 50:
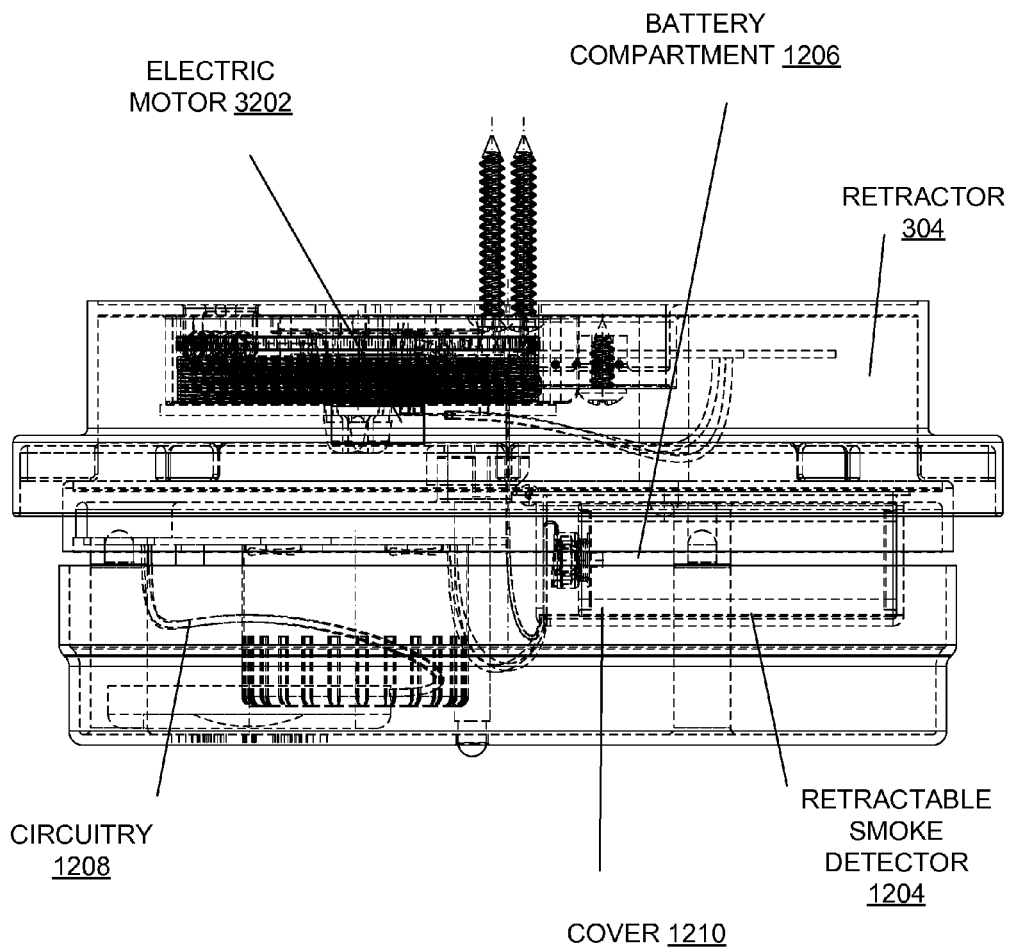

FIG. 50 is a side view block diagram of a retractable environmental detector system in a retracted position having remote motor wires implemented by retractor electrical wire and also having a battery and motor inside the environmental detector housing, according to an implementation.

In FIG. 50, the retractable environmental detector system 4800 includes a retractor 304. The retractor 304 of the retractable environmental detector system 4800 is mountable to a mounting surface 108, such as a ceiling, a roof or a wall.

The retractable environmental detector system 4800 includes the retractor electrical wire 5202, shown wrapped around the cable wire ring gear hub 3904, that is moveably attached to the retractor 304. The retractor electrical wire 5202 is fixedly attached to a retractable environmental detector 1204 through the cable wire ring gear hub 3904.

The retractor 304 includes the battery compartment 1206. The retractable environmental detector 1204 includes the environmental detector circuitry 1208 that includes a sensor audible warning speaker and operational switches.

Figure 51:
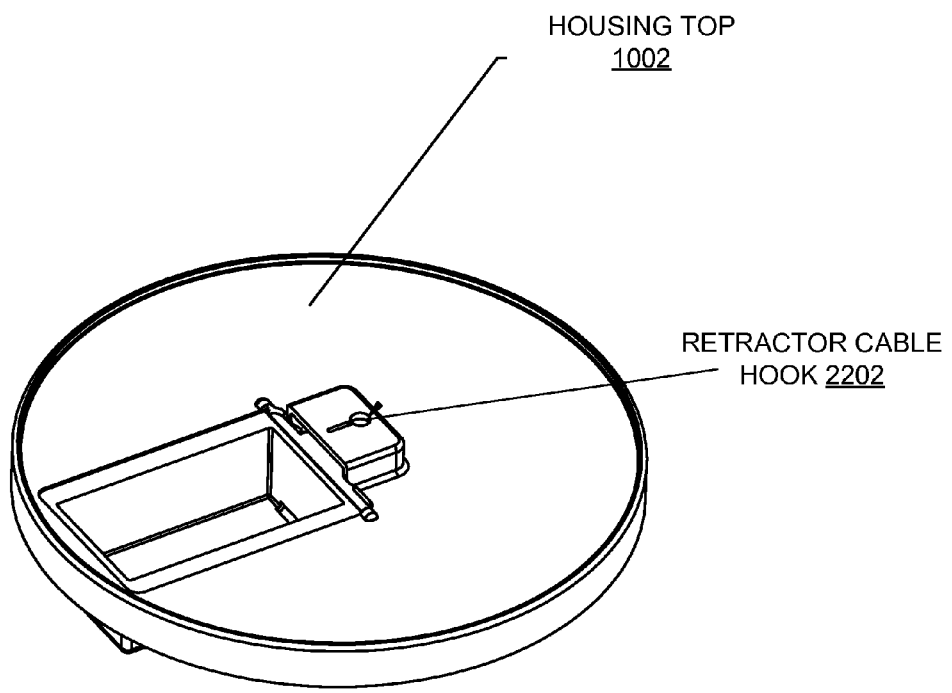

FIG. 51 is a top-view of an isometric block diagram of a base of a retractable environmental detector system 4800 in an extended position having remote motor wires implemented by retractor electrical wire and also having a battery and motor inside the environmental detector housing, according to an implementation. The housing top 1002 of the retractable environmental detector includes a retractor cable hook 2202 that fixedly attaches to a retractor electrical wire 5202 (not shown).

Figure 52:
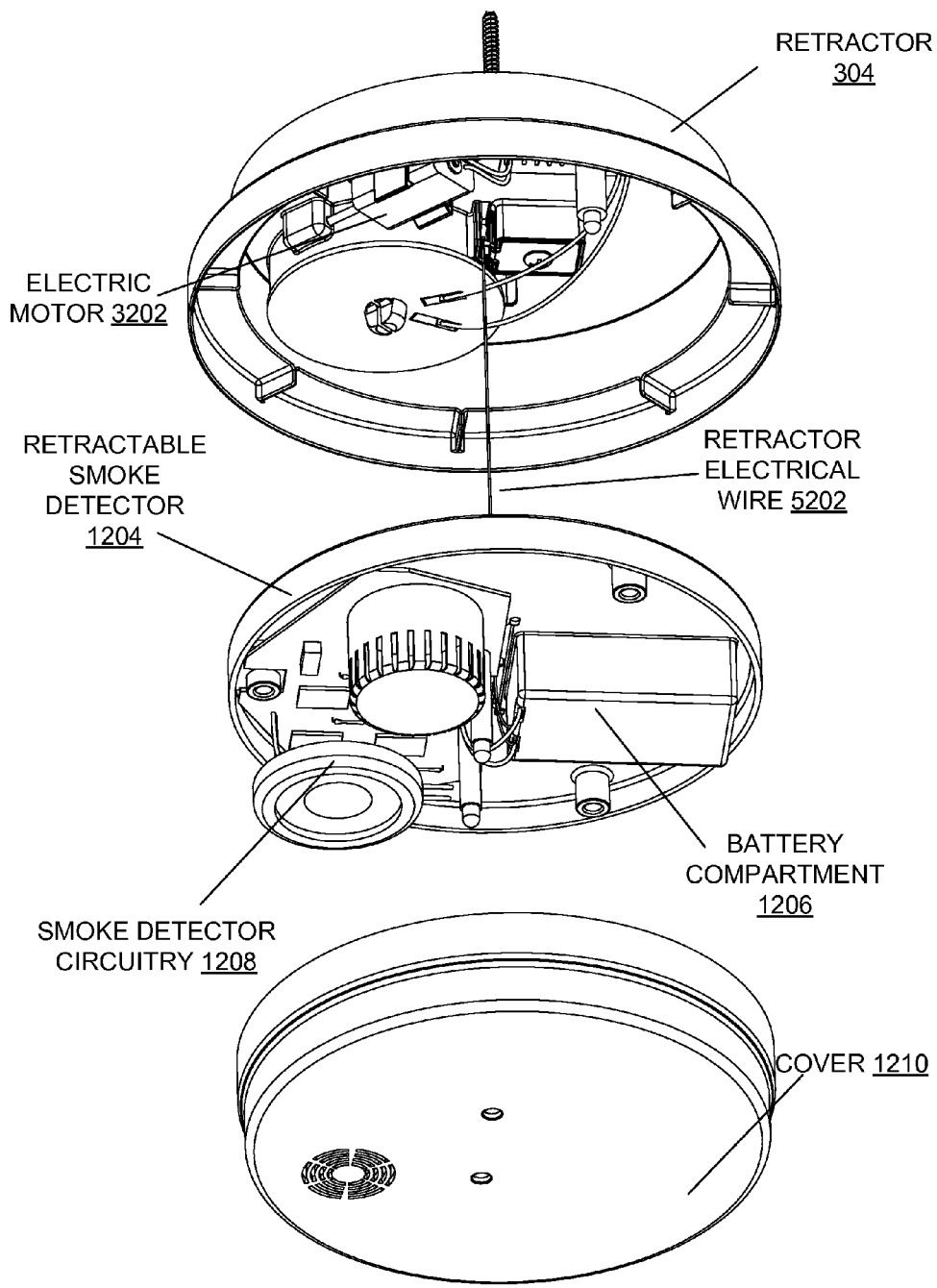

FIG. 52 is a bottom-view of an exploded isometric block diagram of a retractable environmental detector system 4800 in an extended position having remote motor wires implemented by retractor electrical wire and also having a battery and motor inside the environmental detector housing with the cover of the environmental detector removed, according to an implementation.

In FIG. 52, the retractable environmental detector system 4800 includes a retractor 304. The retractor 304 of the retractable environmental detector system 4800 is mountable to a mounting surface (not shown), such as a ceiling, a roof or a wall.

The retractable environmental detector system 4800 includes the retractor electrical wire 5202 that is moveably attached to the retractor 304 through the rotatable clock-spring 902. The retractor electrical wire 5202 is fixedly attached to the retractable environmental detector 302.

The retractable environmental detector 302 includes a battery compartment 1206 and environmental detector circuitry 1208 that includes a sensor audible warning speaker and operational switches.

The retractable environmental detector also includes a cover 1210.

Figure 53:
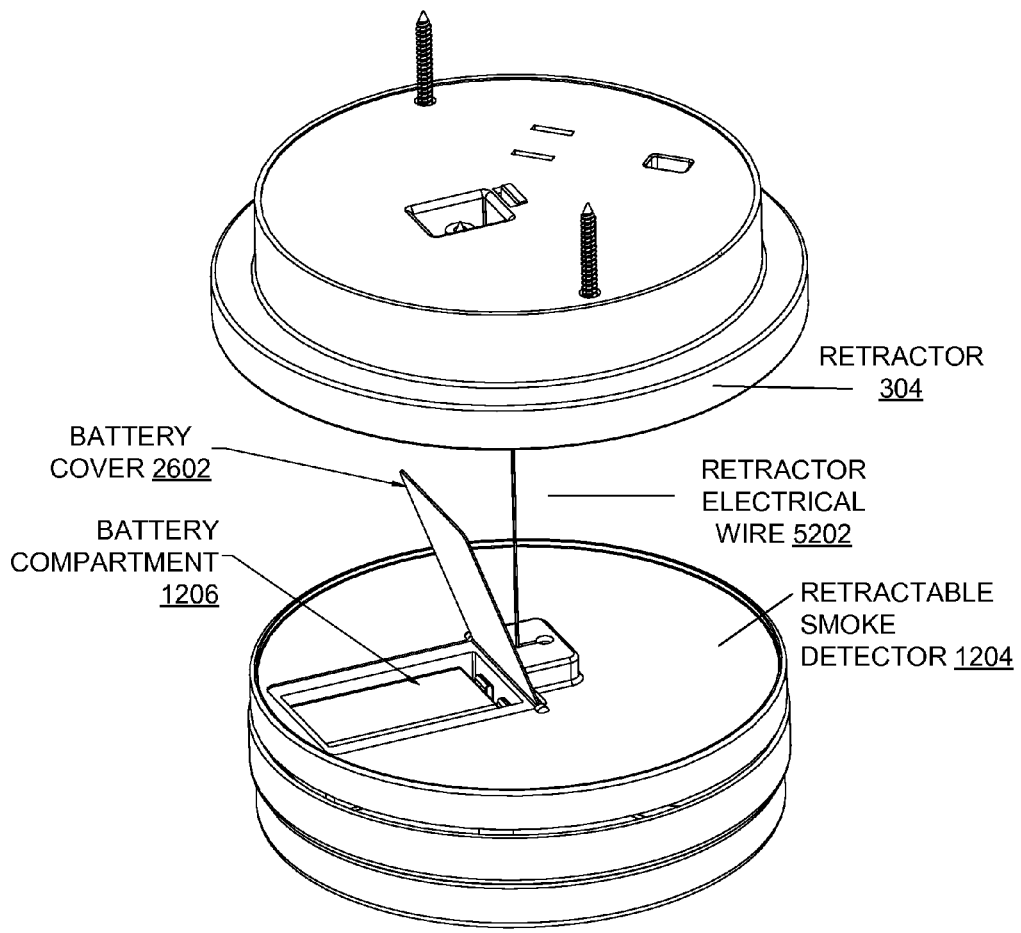

FIG. 53 is a top-view of an isometric block diagram of a retractable environmental detector system 4800 in an extended position having remote motor wires implemented by retractor electrical wire and also having a battery and motor inside the environmental detector housing, according to an implementation.

In FIG. 53, the retractable environmental detector system 4800 includes the retractable environmental detector 1204 and the retractor 304. The retractable environmental detector system 4800 in FIG. 53 is shown in an extended position in which the retractable environmental detector 1204 and the retractor 304 are not substantially in contact to each other. [no manual pull down string for this implementation] The retractor 304 of the retractable environmental detector system 4800 is mountable to a mounting surface (not shown), such as a ceiling, a roof or a wall. The retractable environmental detector system 4800 in FIG. 53 has no manual pull down string for this implementation.

The retractable environmental detector system 4800 includes the retractor electrical wire 5202 that is fixedly attached to the top of the retractable environmental detector 1204 and that is movably attached to the retractor 304. The retractable environmental detector 1204 also includes a battery compartment 1206 with a battery cover 2602.

Figure 54:
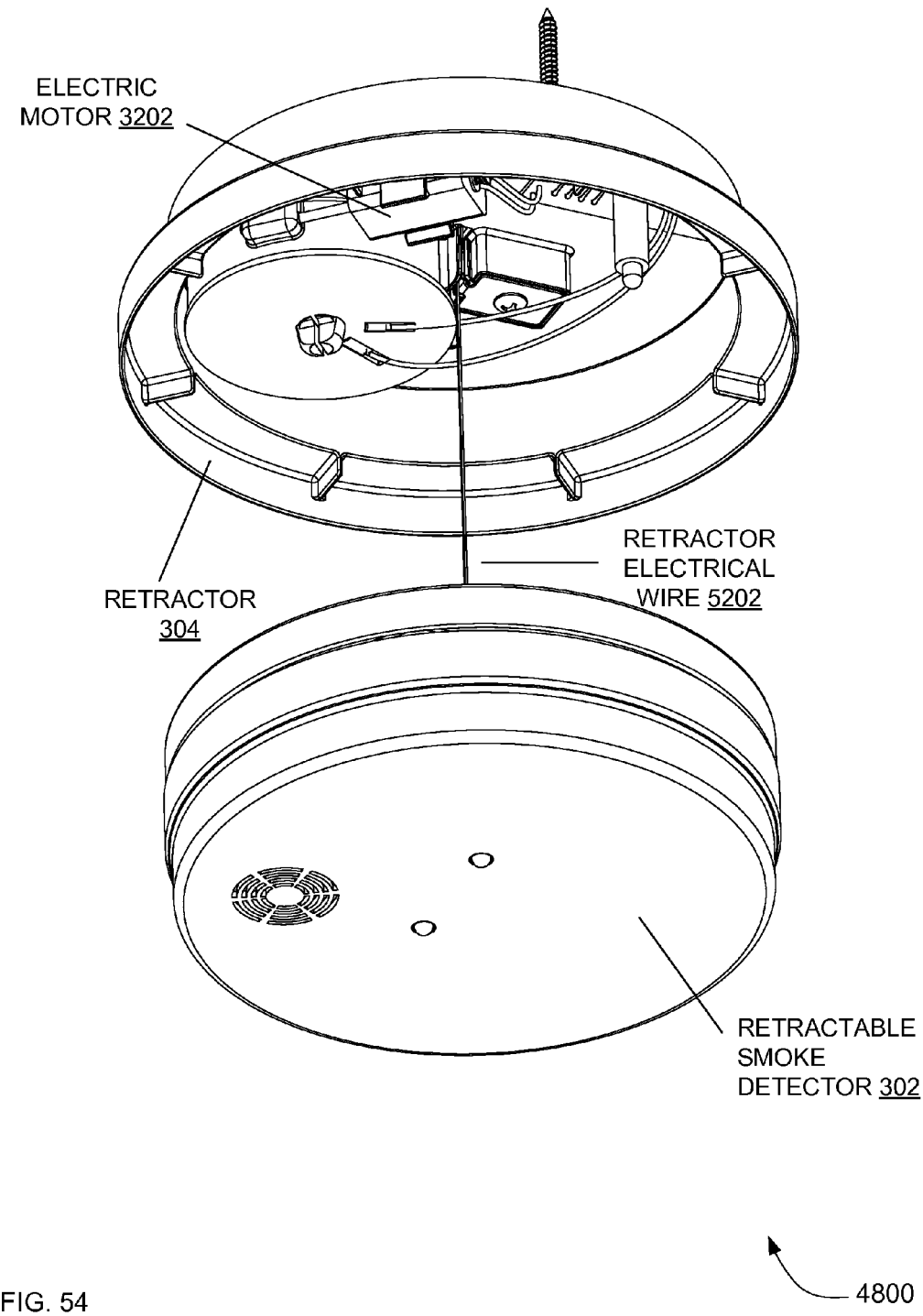

FIG. 54 is a bottom-view of an isometric block diagram of a retractable environmental detector system 4800 in an extended position having remote motor wires implemented by retractor electrical wire and also having a battery and motor inside the environmental detector housing, according to an implementation.

In FIG. 54, the retractable environmental detector system 4800 includes the retractable environmental detector 302 and the retractor 304. The retractable environmental detector system 4800 in FIG. 54 is shown in an extended position in which the retractable environmental detector 302 and the retractor 304 are not substantially in contact to each other. The retractor 304 of the retractable environmental detector system 4800 is mountable to a mounting surface (not shown), such as a ceiling, a roof or a wall. The retractable environmental detector system 4800 includes the retractor electrical wire 5202 that is fixedly attached to the top of the retractable environmental detector 302. The retractor electrical wire 5202 is movably attached to the retractor 304 through the cable wire ring gear hub 3904.

Figure 55:
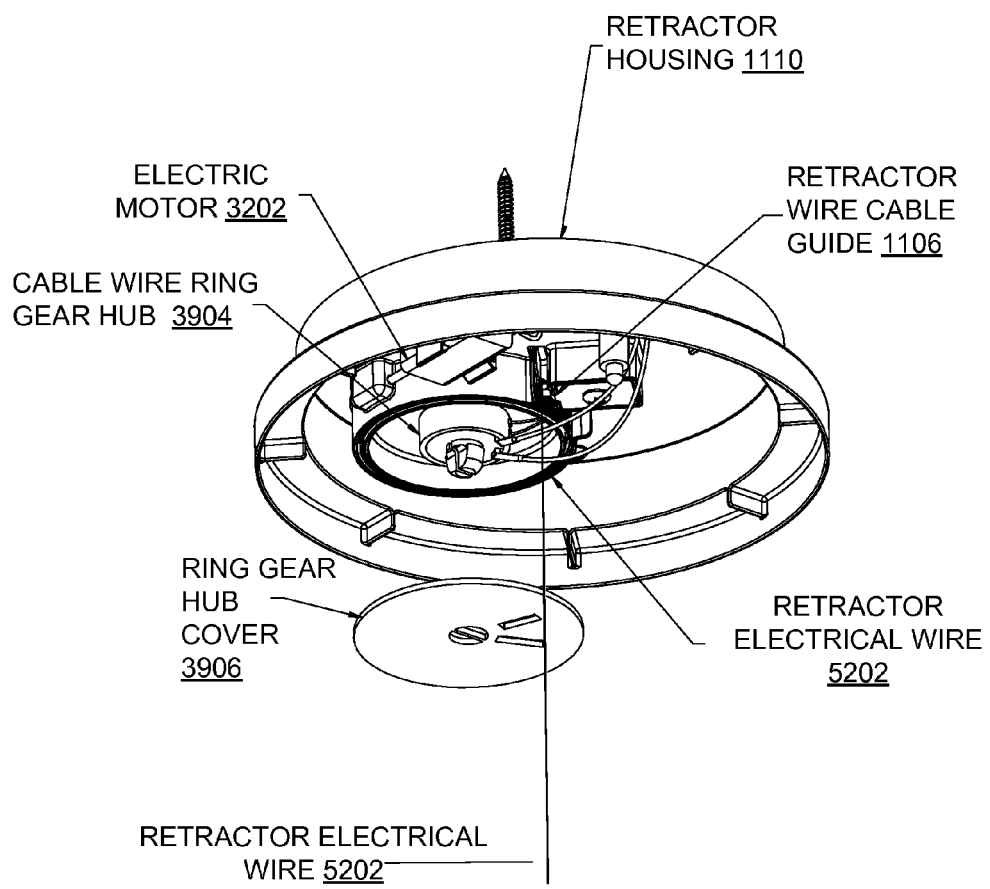

FIG. 55 is a bottom-view of an exploded isometric block diagram of a retractable environmental detector system 4800 in an extended position having remote motor wires implemented by retractor electrical wire and also having a battery and motor inside the environmental detector housing with ring gear hub cover 3906 removed, according to an implementation.

The retractor of FIG. 55 includes a retractor housing 1110, operably coupled to the electric motor 3202, the cable wire ring gear hub 3904, the retractor wire cable guide 1106, the retractor electrical wire 5202 and the ring gear cover 3906.

Figure 56:
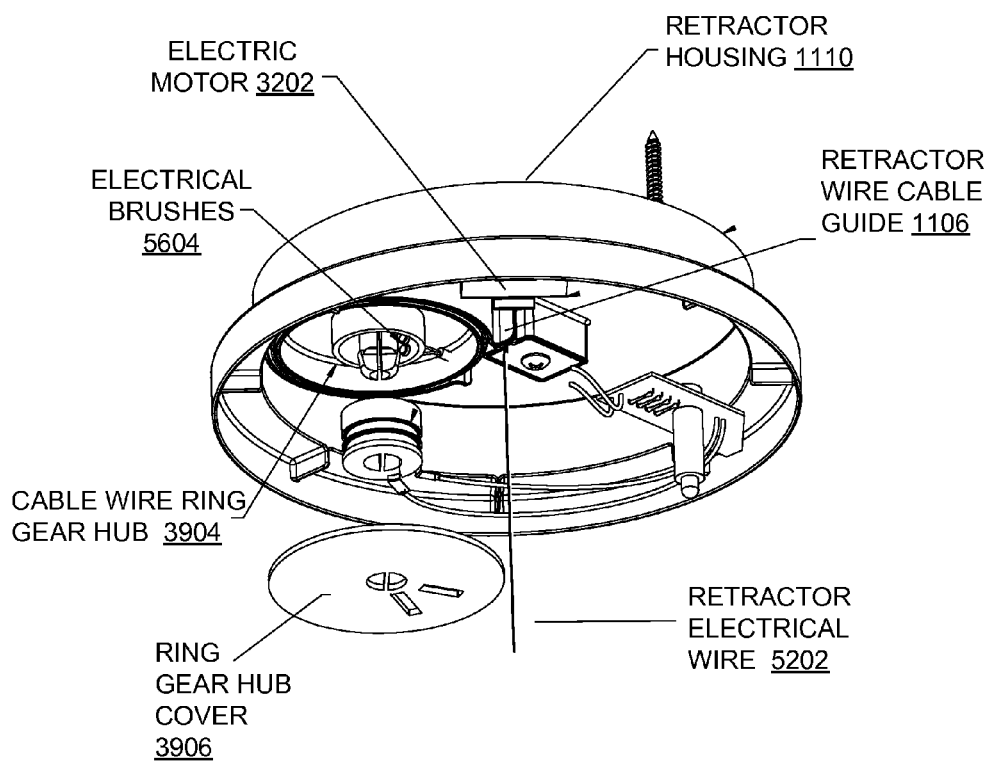

FIG. 56 is a bottom-view of an exploded isometric block diagram of a retractable environmental detector system 4800 in an extended position having remote motor wires implemented by retractor electrical wire and also having a battery and motor inside the environmental detector housing with ring gear hub cover 3906 and wire bushing terminal removed, according to an implementation.

The retractor of FIG. 55 includes a retractor housing 1110, operably coupled to the electric motor 3202, the cable wire ring gear hub 3904, the retractor electrical wire 5202, electrically conductive brushes 5604 on the ring gear hub and the ring gear cover 3906. The retractor electrical wire 5202 provides mechanical support for a retractable environmental detector (not shown in FIG. 56) but provides electric power to the retractable environmental detector. The retractor electrical wire 5202 provides electric power from the retractor to the retractable environmental detector when the retractable environmental detector is extended and when the retractable environmental detector is retracted.

Figure 57:
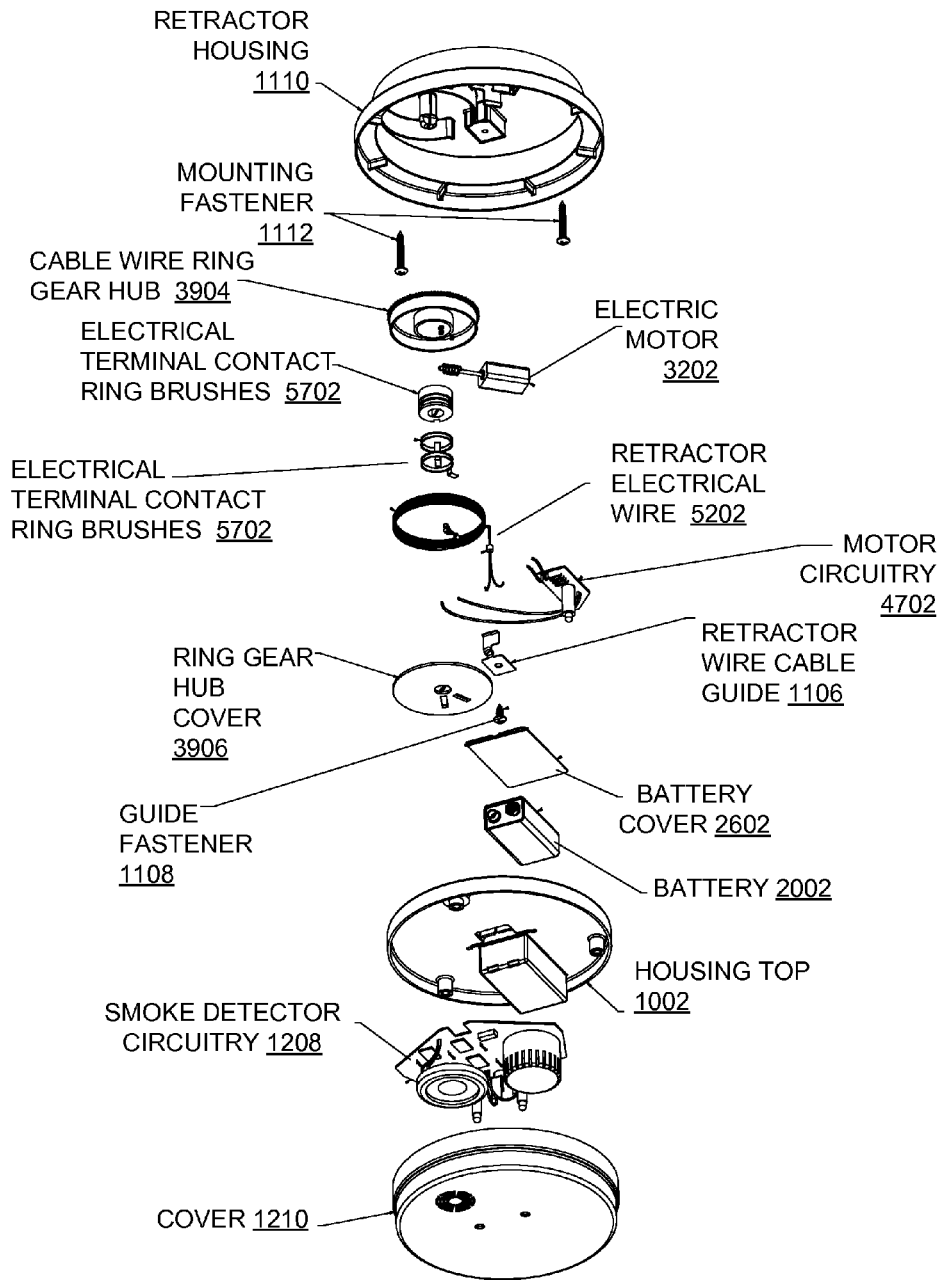

FIG. 57 is a bottom-view of an exploded isometric block diagram of a retractable environmental detector system 4800 having remote motor wires implemented by retractor electrical wire and also having a battery and motor inside the environmental detector housing, according to an implementation.

In FIG. 57, the retractable environmental detector system 4800 includes the retractor 304. The retractor 304 of the retractable environmental detector system 4800 is mountable to a mounting surface (not shown), such as a ceiling, a roof or a wall, through mounting fasteners 1112.

The retractable environmental detector system 4800 includes the retractor electrical wire 5202 that is fixedly attached to the housing top 1002 of the retractable environmental detector 302. The retractor electrical wire 5202 is movably attached to the retractor 304 through the cable wire ring gear hub 3904.

The retractor 304 includes an electric motor circuitry 4702 with a retractor switch and control. The electric motor 3202 is operably coupled to the retractor electrical wire 5202 through a cable wire ring gear hub 3904. The cable wire ring gear hub 3904 is operably coupled to the ring gear hub cover 3906, a retractor wire cable guide 1106, and a guide fastener 1108, and electrical brushes 5604 that includes electrical terminal contact ring brushes 5702 and electrical terminal contact rings 5704; all of which are inside a housing 1110 of the retractor 304.

The retractable environmental detector 302 includes the environmental detector circuitry 1208 that includes a sensor audible warning speaker and operational switches. The retractable environmental detector 302 also includes the battery 2002, the battery cover 2602 a battery compartment 1206 and a cover 1210. The battery 2002 provides electric power environmental detector circuitry 1208 when power is not received from the retractor electrical wire 5202.

Figure 58:
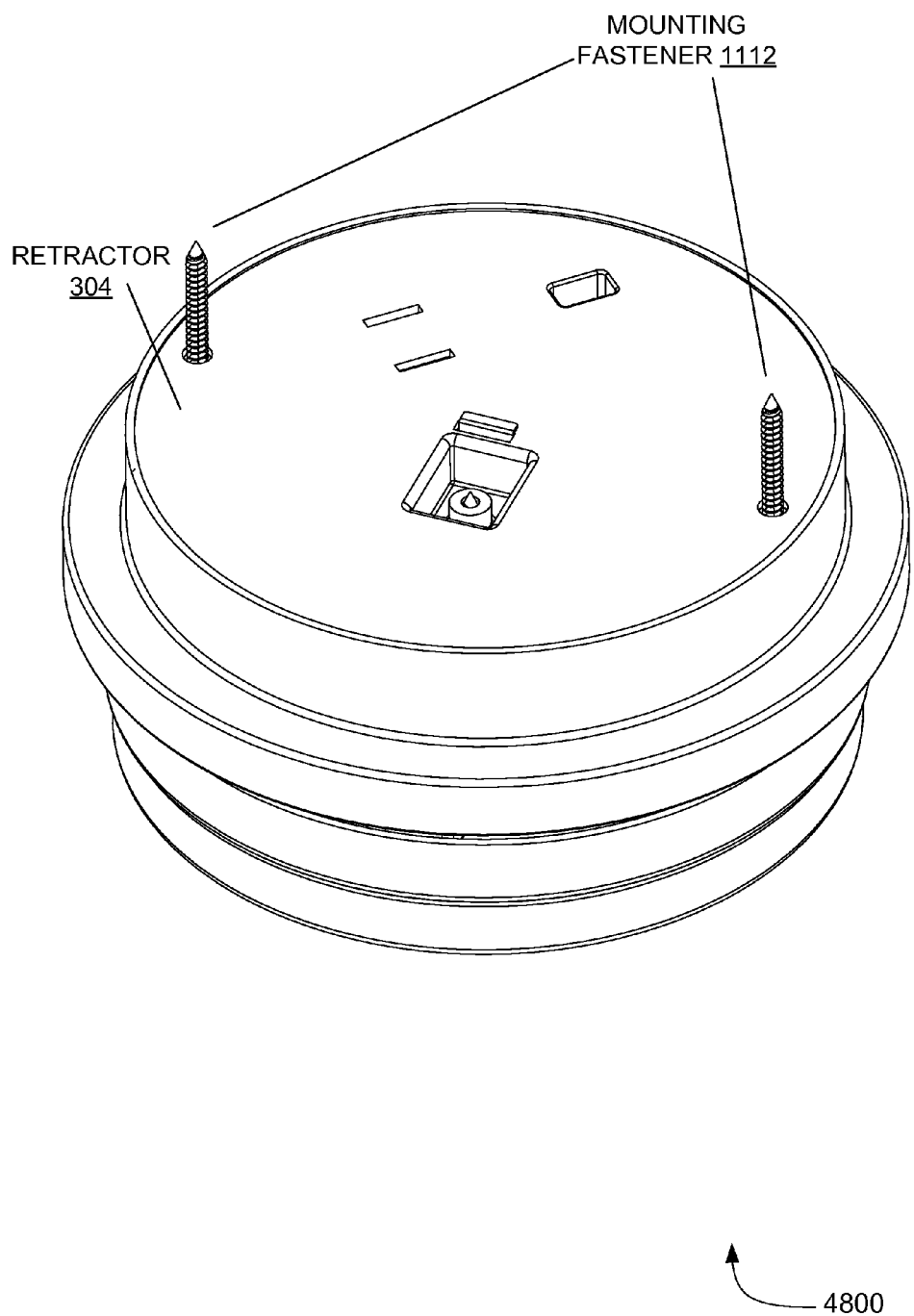

FIG. 58 is a top view of an isometric block diagram of a retractable environmental detector system 4800 in a retracted position having remote motor wires implemented by electrical cable wires and also having a battery and motor inside the environmental detector housing, according to an implementation. The retractable environmental detector system 4800 includes mounting fasteners 1112 that protrude through a retractor 304 of the retractable environmental detector system 4800.

Figure 59:
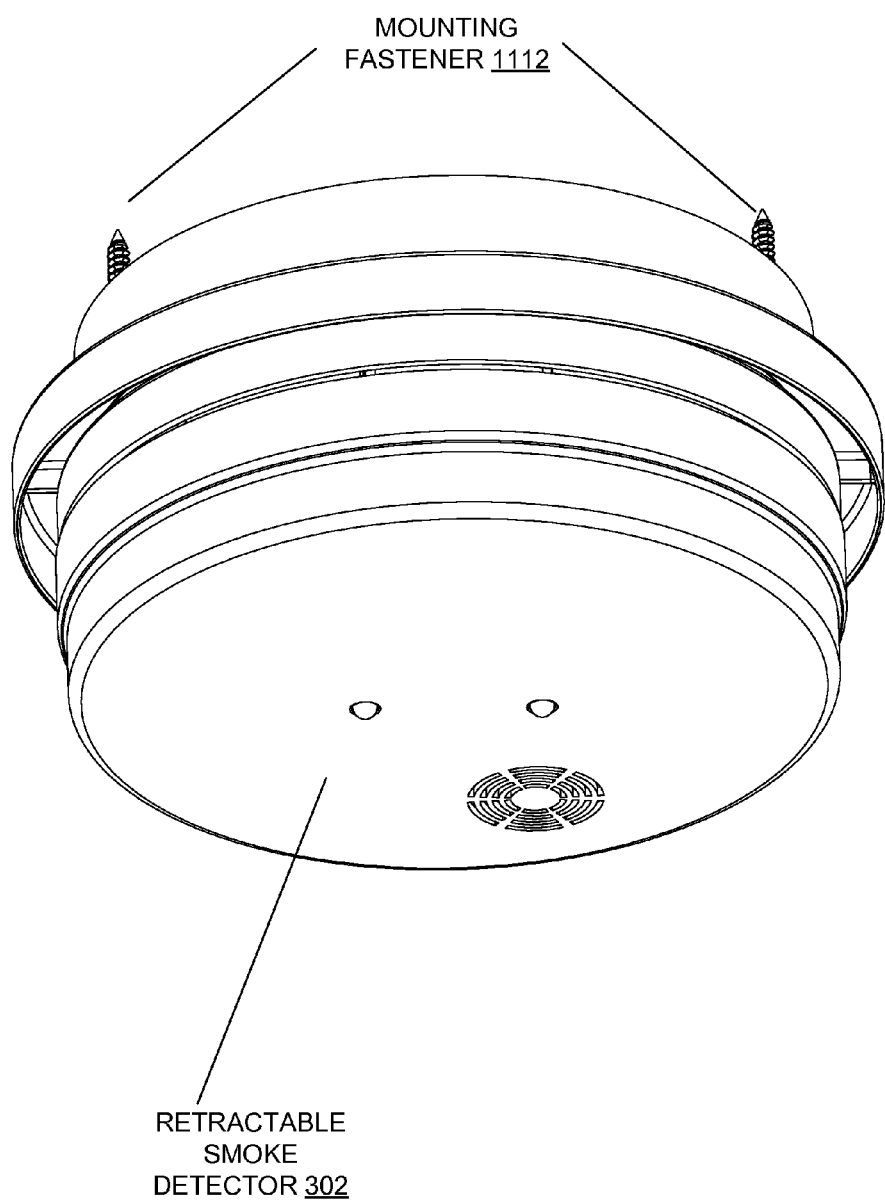
Figure 60:
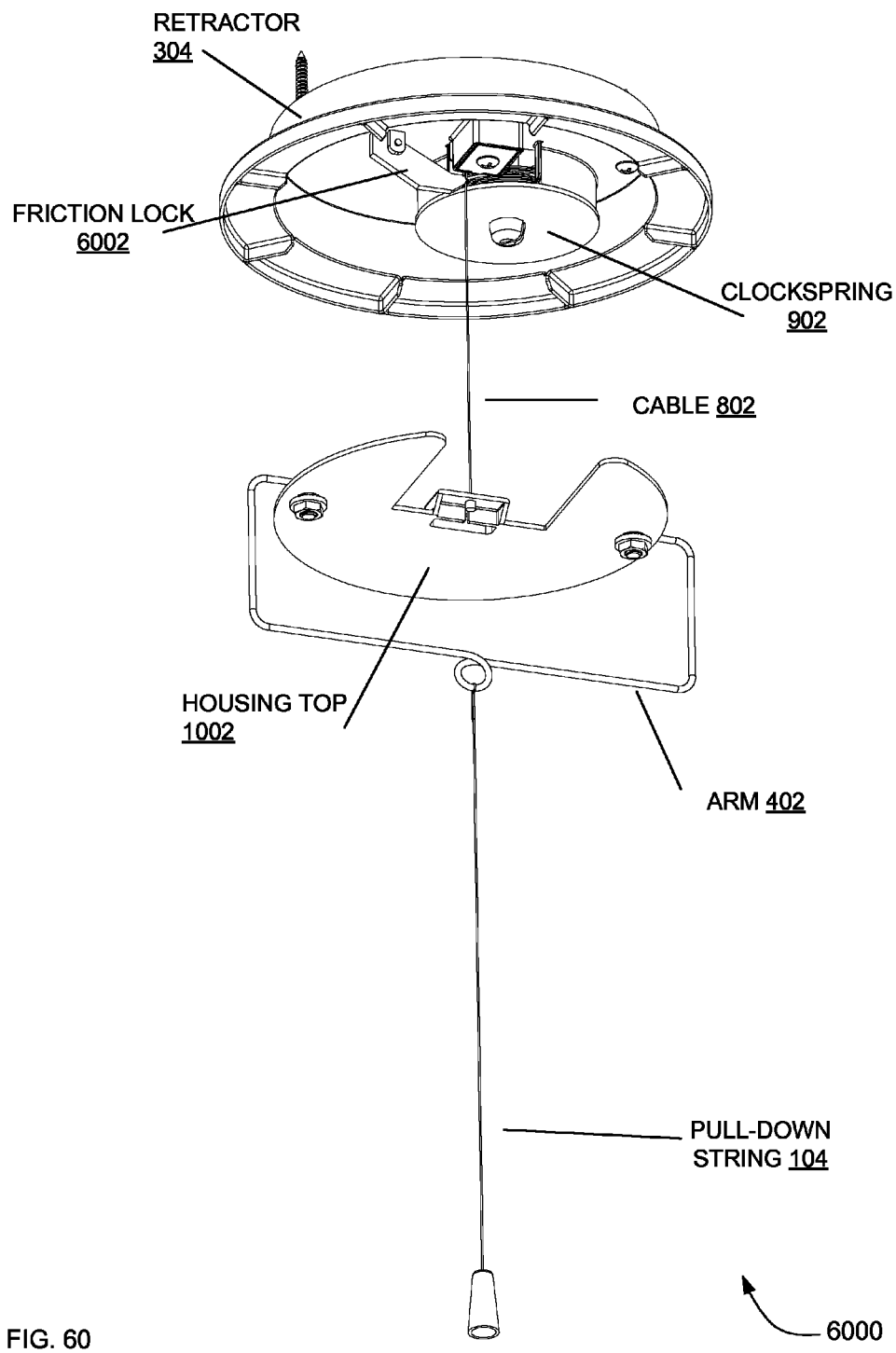
FIG. 60-63 illustrate a retractable environmental detector assembly having a lock.

FIG. 59 is a bottom-view of an isometric block diagram of a retractable environmental detector system 4800 in a retracted position having remote motor wires implemented by electrical cable wires and also having a battery and motor inside the environmental detector housing, according to an implementation. The retractable environmental detector system 4800 includes the retractable environmental detector 302 and at least one mounting fastener 1112 to mount to a mounting surface (not shown in FIG. 59), such as a ceiling, a roof or a wall.

Figure 61:
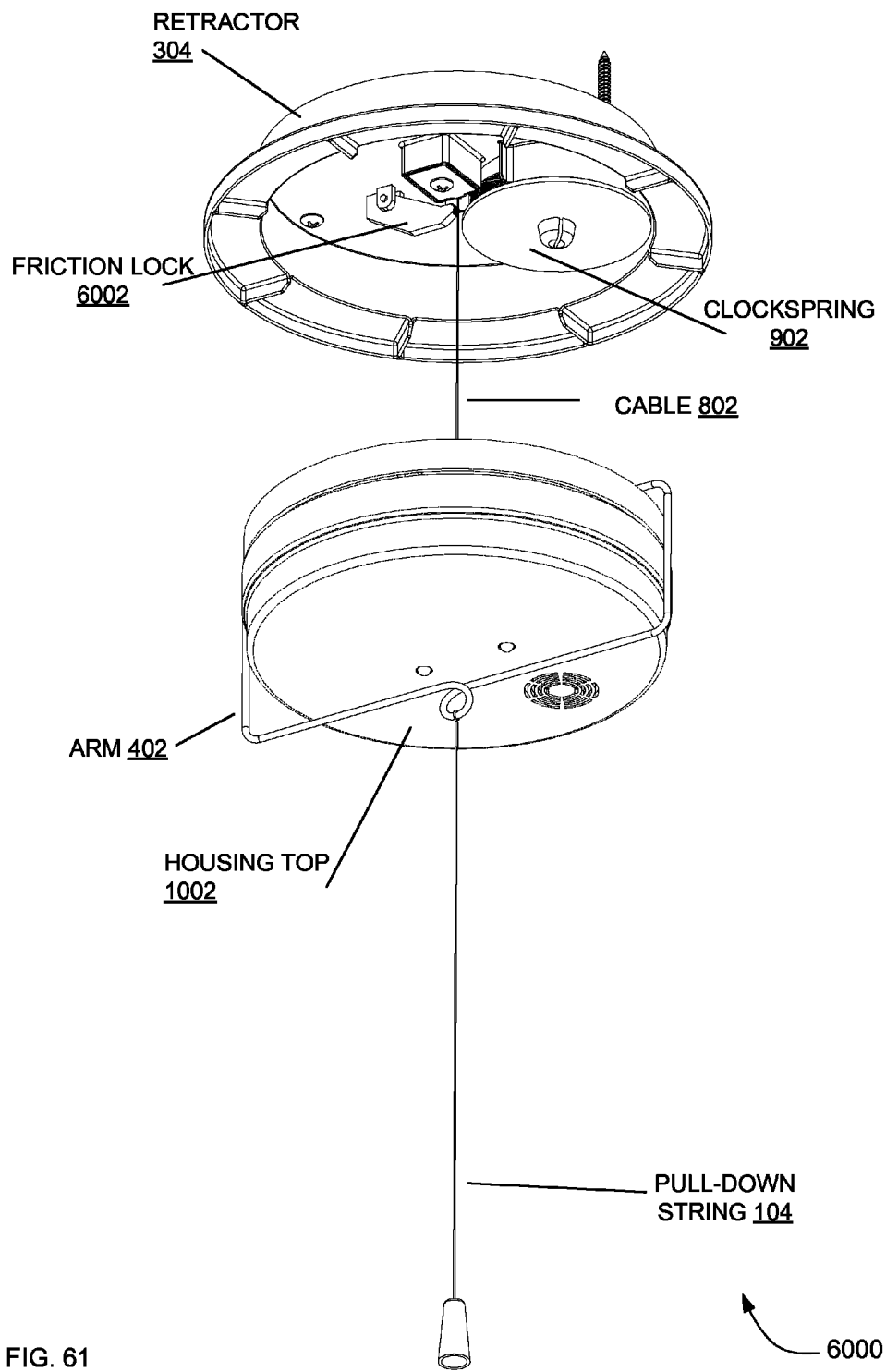
Figure 62:
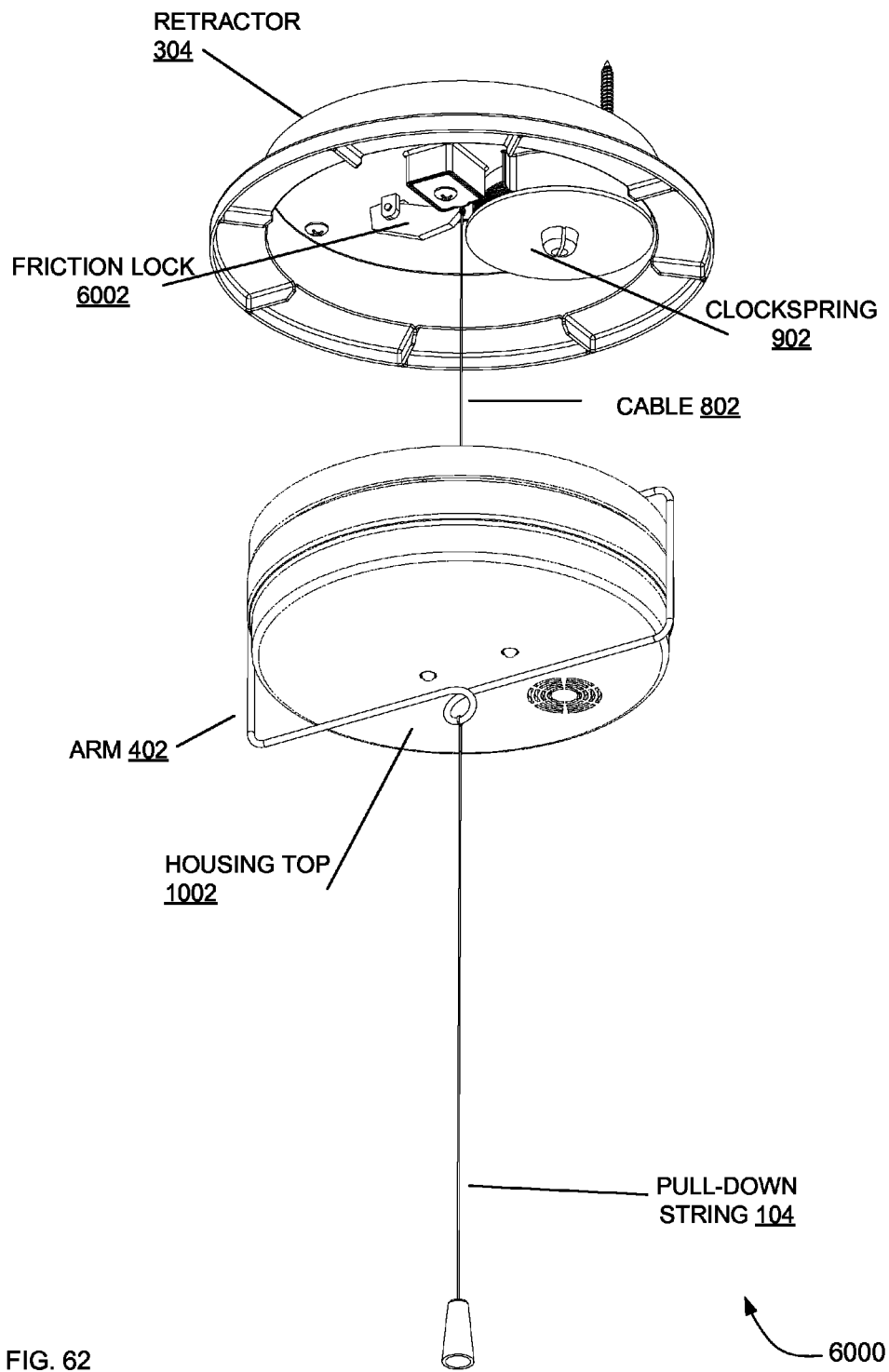
Figure 63:
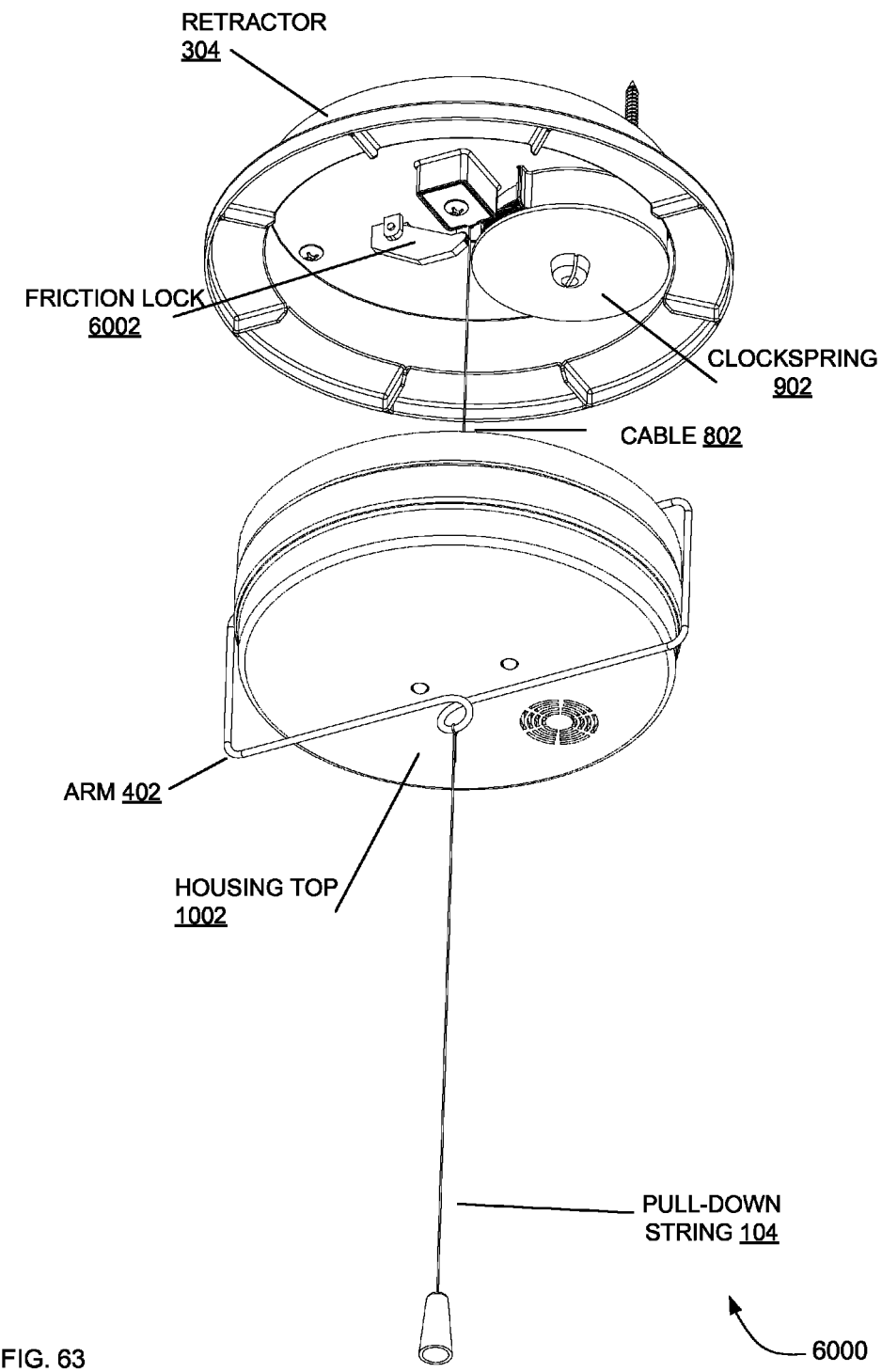

FIGS. 60-63 illustrate a retractable environmental detector system 6000 having a lock. FIGS. 60-63 include a ratchet lock 6002, or other friction lock, in the retractor 304. In some implementations, the ratchet lock 6002 is a cam ratchet lock. In some implementations, the ratchet lock 6002 is a roller friction lock. The retractor 304 also includes clockspring 902 operably coupled to the ratchet lock 6002. The clockspring 902 is operably coupled to cable 802 and the cable 802 is operably coupled to housing top 1002. The housing top 1002 is operably coupled to arm 402 which is operably coupled to pull-down string 104. In FIG. 61, the ratchet lock 6002 is unlocked. In FIG. 62, the ratchet lock 6002 is locked. The retractable environmental detector system 6000 having a lock in FIG. 60-63 allows an operator to lock the extended position of the retractor 302 manually similar to adjusting miniblinds having the cam or roller ratchet lock, which allows the operator to change the battery without retracting the retractor 302 up to the ceiling if the operator lets go (releases) the pull-down string 104.

FIG. 64-67 illustrate a retractable environmental detector system 6400 having a lock. The retractable environmental detector system 6400 in FIG. 64-67 includes a ratchet lock 6002 in the retractable smoke detector 1204. In some implementations, the ratchet lock 6002 is a cam ratchet lock. In some implementations, the ratchet lock 6002 is a roller ratchet lock. The retractable smoke detector 1204 also includes the clockspring 902 operably coupled to the ratchet lock 6002. The clockspring 902 is operably coupled to pull-down string 104 and the pull-down string 104 is operably coupled to cover 1210. The retractable smoke detector 1204 also includes battery compartment 1206.

Figure 64:
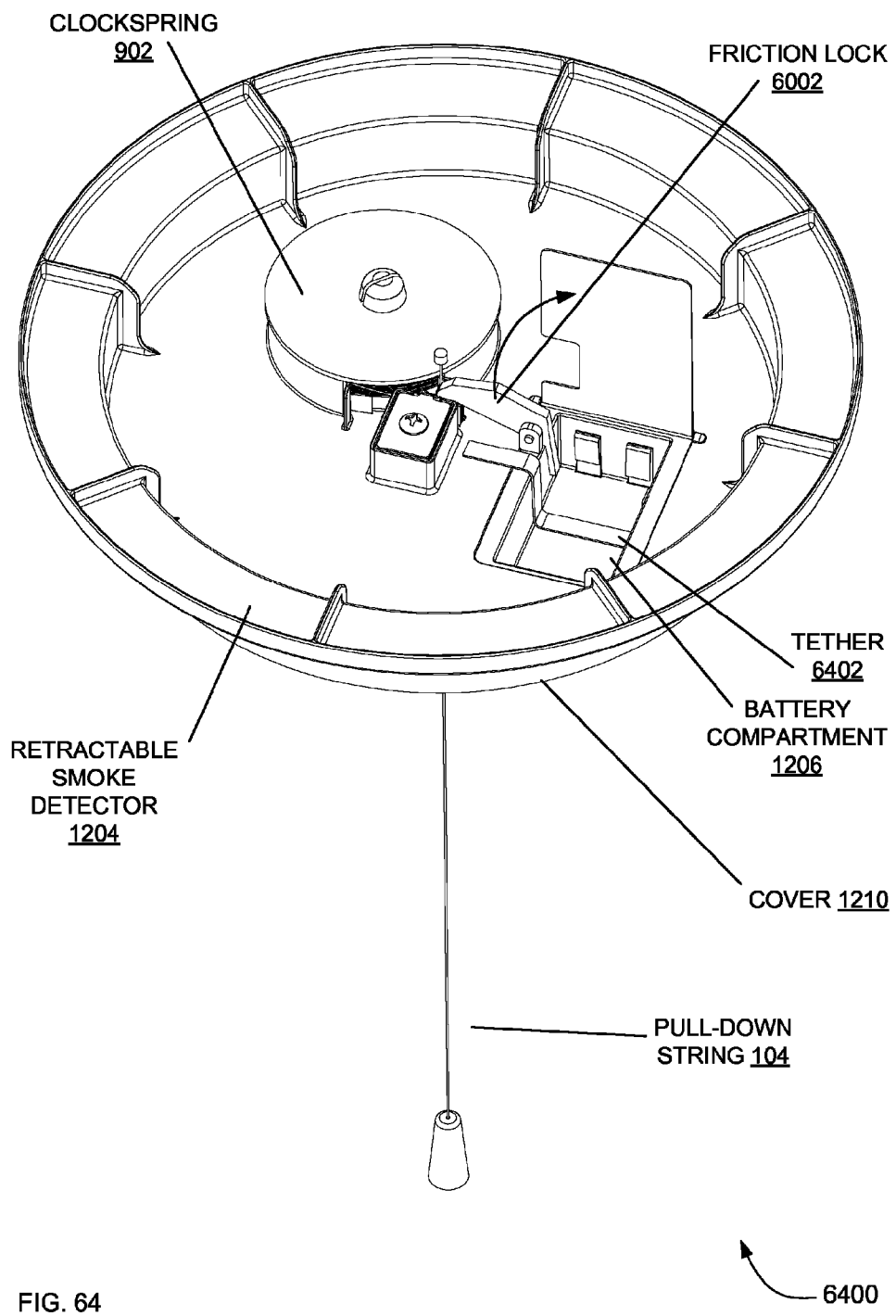
FIG. 64-67 illustrate a retractable environmental detector assembly having a lock.

In FIG. 64, the retractable smoke detector 1204 includes a fabric tether 6402 that provides an easier means to extract the battery (not shown in FIG. 64) from the battery compartment 1206.

Figure 65:
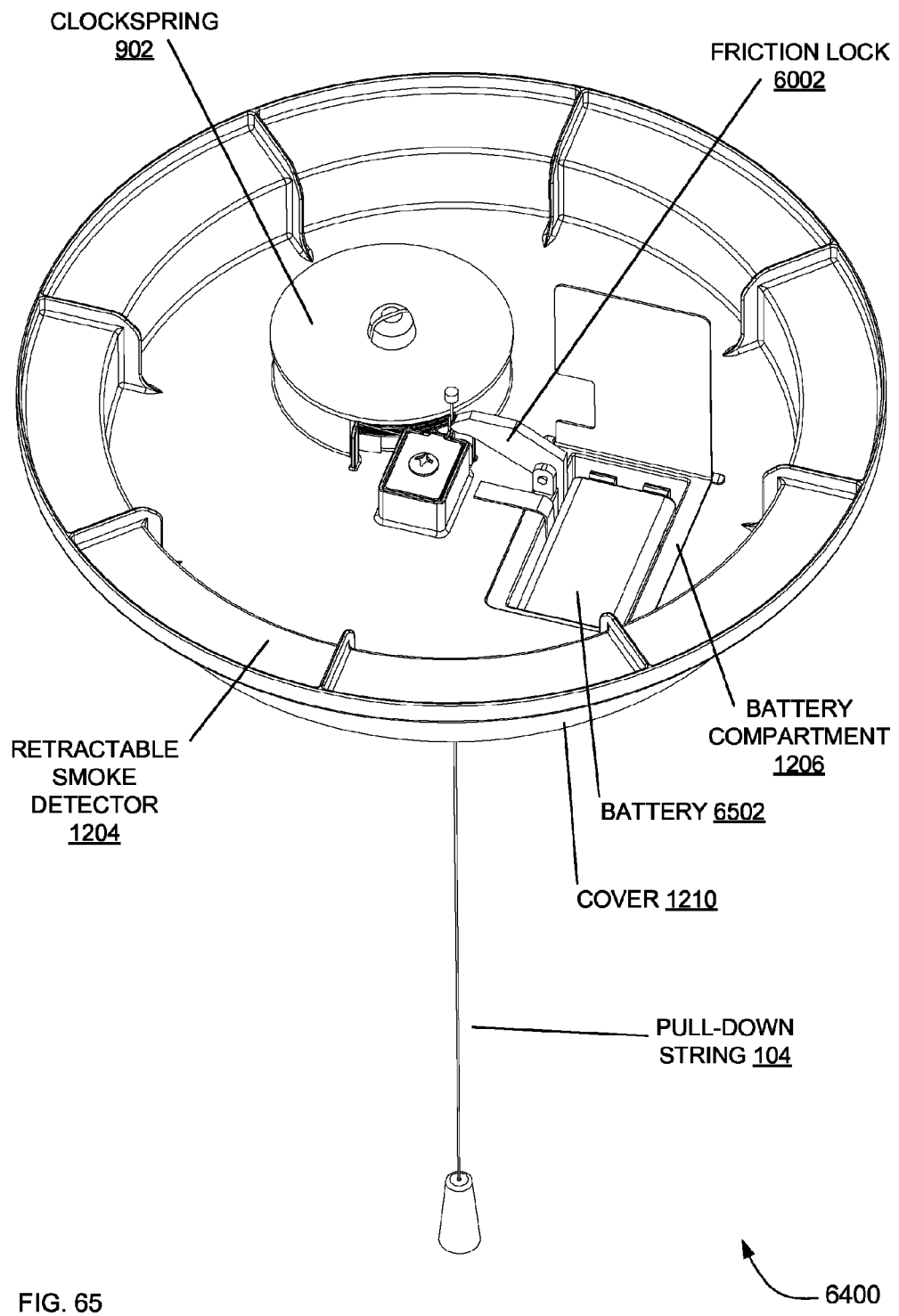
Figure 66:
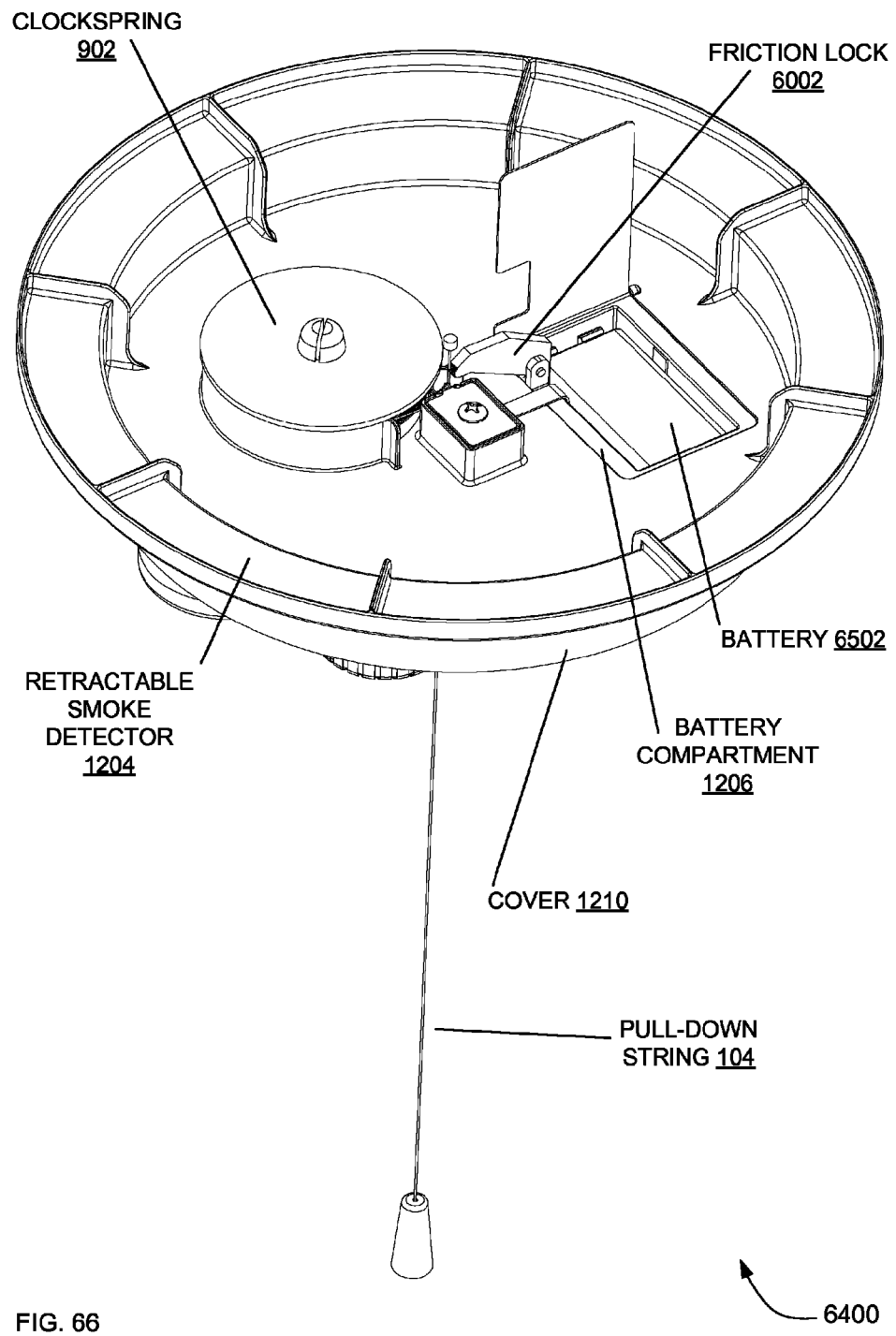
Figure 67:
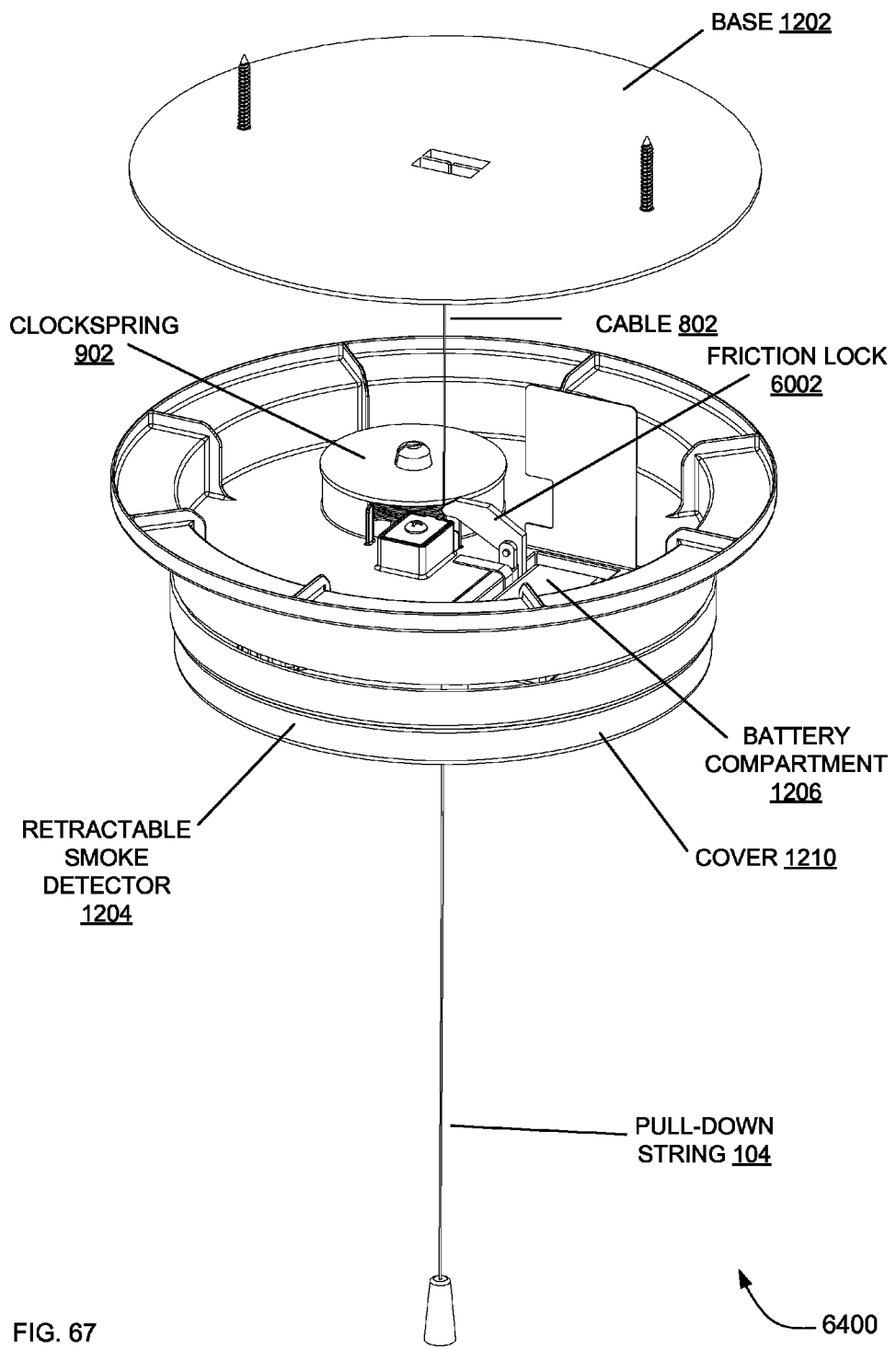

In FIGS. 65 and 66, the battery compartment 1206 includes a battery 6502. The ratchet lock 6002 rotates up and around toward the battery compartment 1206 when the battery 6502 is installed and the battery is operable.

In FIG. 64-67, the ratchet lock 6002 is engaged to lock when the battery 6502 is removed, which disable, prevents or prohibits the retractable smoke detector 1204 to retract to the ceiling. The battery 6502 must be operable and installed in the battery compartment 1206 to disengage or rotate the ratchet lock 6002 so battery 6502 doesn't lock the retractable smoke detector 1204 in a retracted position.

Figure 68:
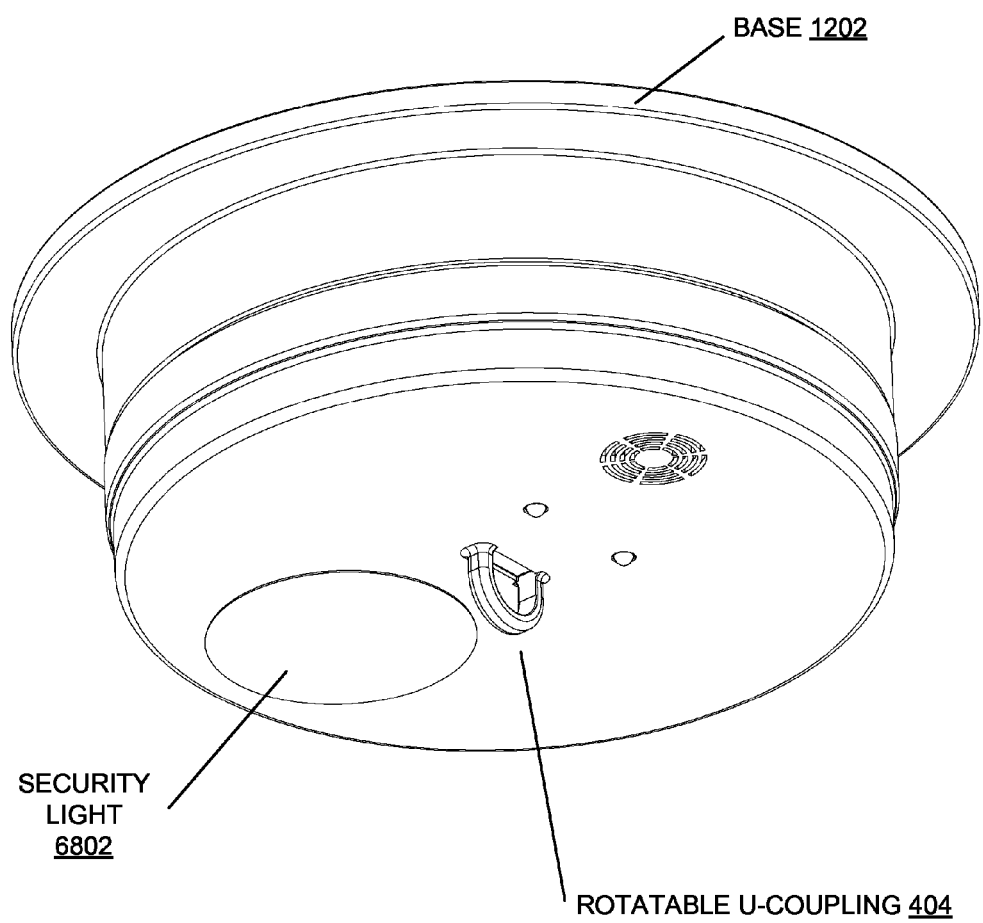
FIG. 68-69 illustrate a retractable smoke detector having a security light in the cover.
Figure 69:
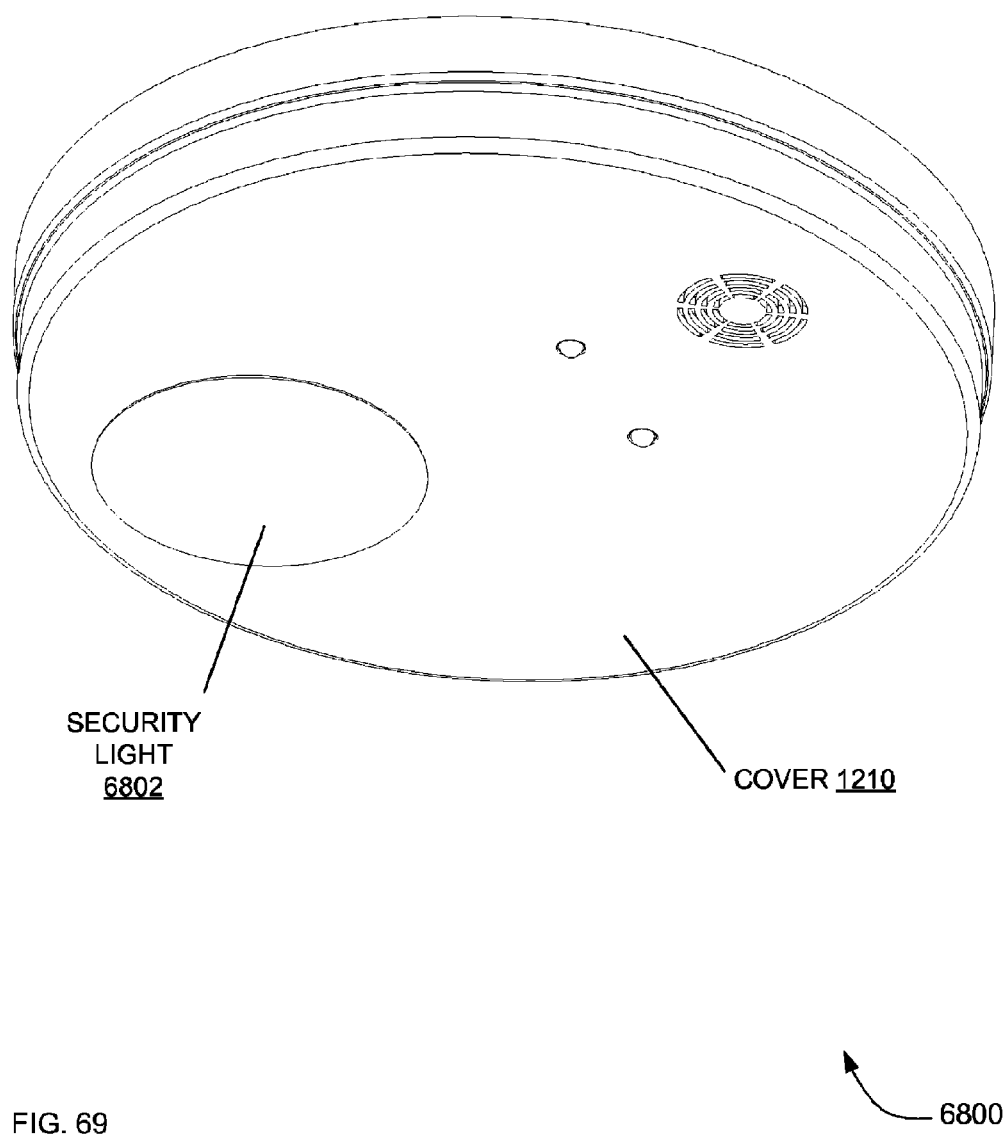

FIG. 68-69 illustrate a retractable smoke detector 6800 having a security light 6802 in the cover. The security light 6802 provides optical illumination when the alarm is triggered, to light up dark hallways or rooms if there is a power failure in the building. The retractable smoke detector 6800 in FIG. 68 includes a rotatable U-Coupling 404 and a base 1202. The retractable smoke detector 6800 in FIG. 69 includes a cover 1210.

FIG. 70-73 illustrate a retractable smoke detection system having a ratchet lock 7002 that acts like adjusting common household window mini blinds. To release the ratchet lock 7002, the bottom portion of the retractable smoke detector 1204 assembly is pulled down at an angle, and then straightened out vertically to lock it into position down from the ceiling. The ratchet lock 7002 pivots, and pinches (with friction) the pull-down string 104 to the guide 1106 locking the bottom portion of the retractable smoke detector 1204 assembly at any height, as an infinite height adjuster. Locking the bottom portion of the retractable smoke detector 1204 assembly at a lowered position allows the operator to let go of the pull-down string 104, as the bottom portion of the retractable smoke detector 1204 assembly will not retract once it is locked in a position. The operator can then easily change the battery 2002.

Once the battery 2002 is changed, the operator can give a tug on the pull-down string 104 and pull the bottom portion of the retractable smoke detector 1204 assembly off at an angle to let the bottom portion of the retractable smoke detector 1204 assembly retract, the tub disengages the ratchet lock 7002 (pull-down string 104 is no longer pinched by friction), and the clockspring 902 will retract the bottom portion of the retractable smoke detector 1204 assembly up to the ceiling as the operator lets the bottom portion of the retractable smoke detector 1204 assembly rise up.

Figure 70:
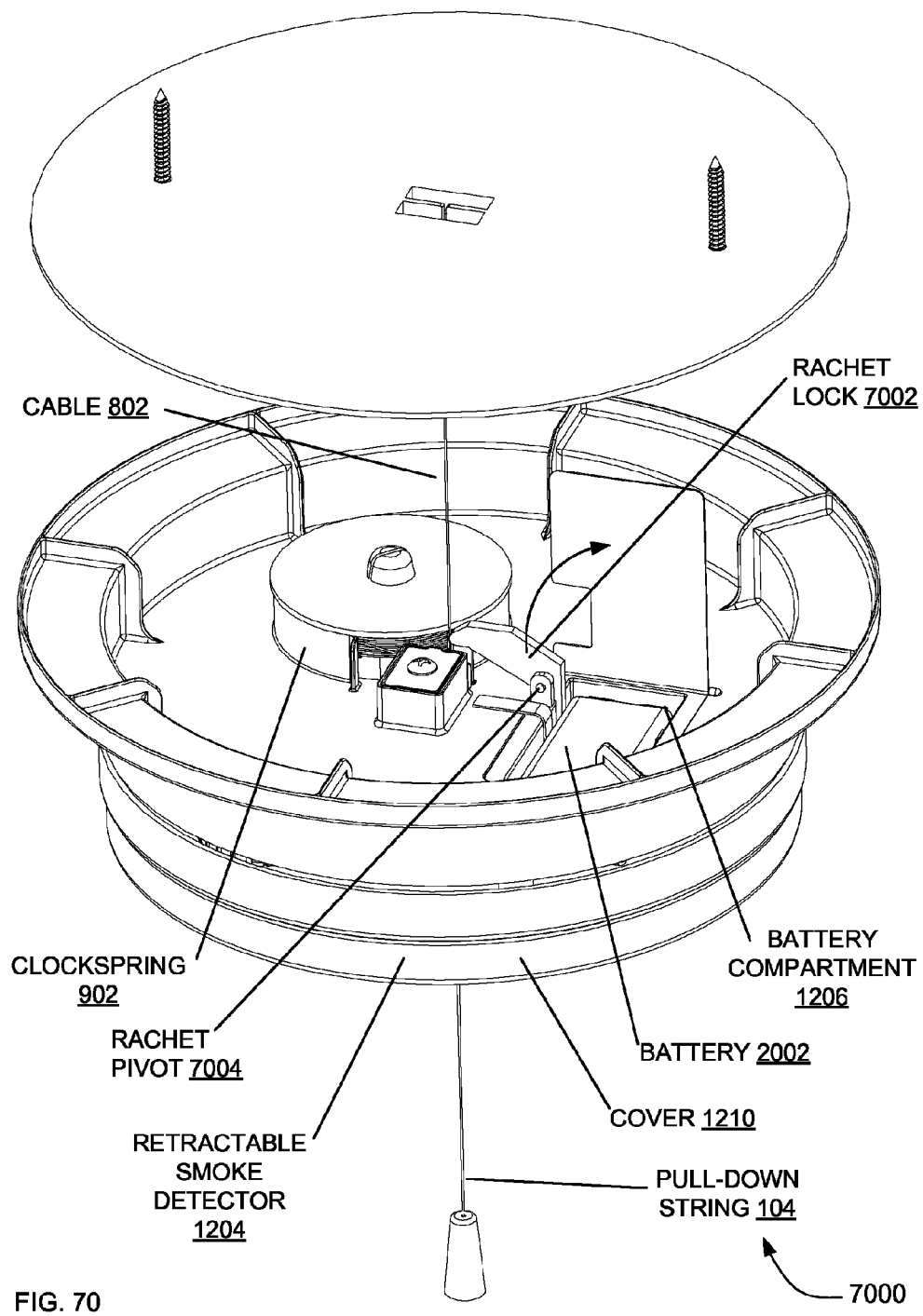
FIG. 70-73 illustrate a retractable smoke detection system having a friction lock that acts like adjusting common household window mini blinds.

FIG. 70 illustrates the retractor being lowered. In FIG. 70, the ratchet lock 7002 is open, allowing the pull-down string 104 to extend and lower the retractable smoke detector 1204.

Figure 71:
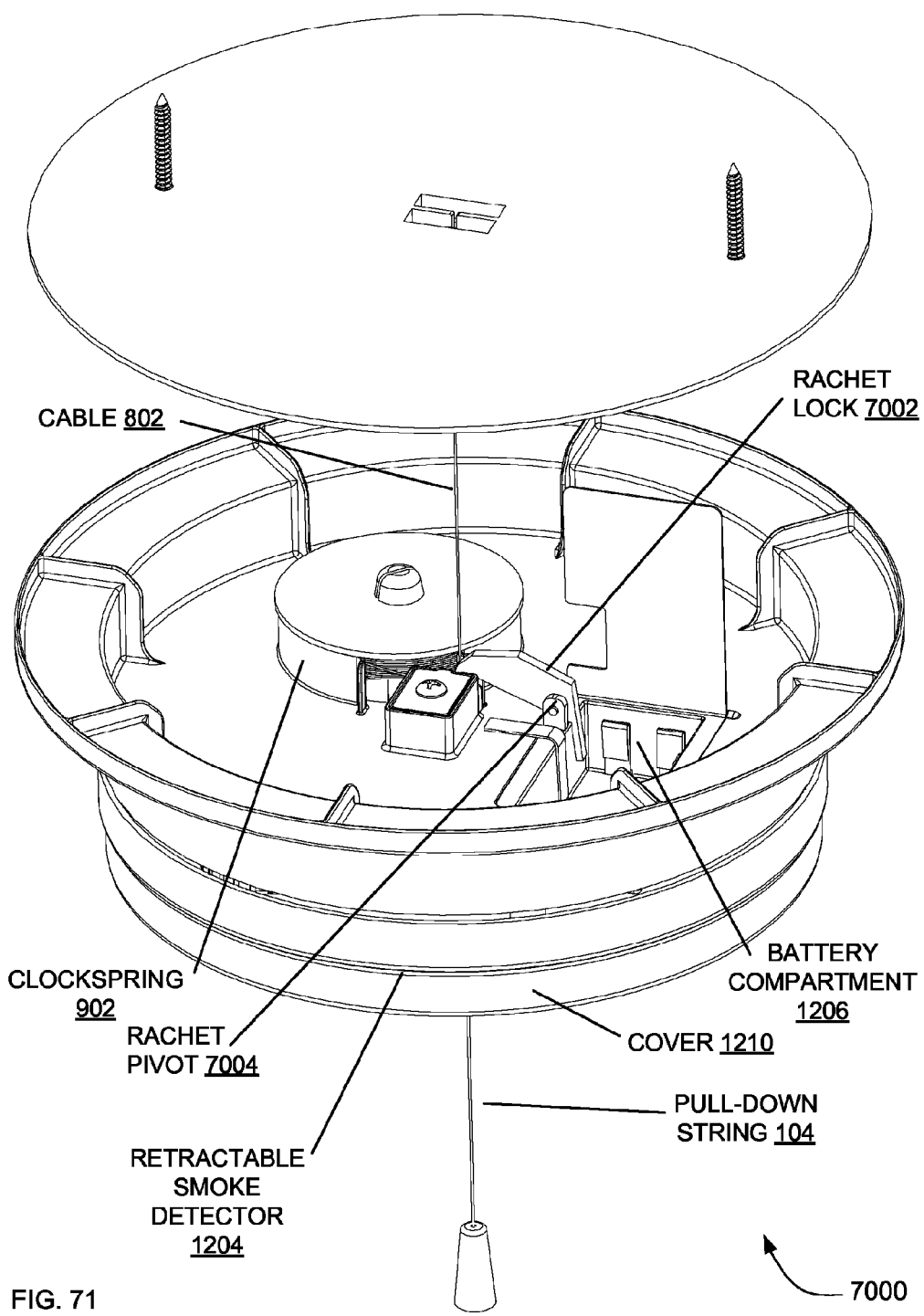

FIG. 71 illustrates the retractable smoke detector 1204 in a locked position. In FIG. 71, the ratchet lock 7002 has pivoted downward and pinched the pull-down string 104 not allowing the pull-down string 104 to retract the retractable smoke detector 1204, at this time the operator can let go of the pull-down string 104, and the retractable smoke detector 1204 is lowered in a locked position.

In regards to FIG. 70-71, when the battery 2002 is removed the ratchet lock 7002 will lock. There is a small lever on the ratchet lock 7002 that is inside the battery compartment 1206 that can be rotated by the battery 2002. So if a battery 2002 is not installed into the battery compartment 1206, the retractable smoke detector 1204 will remain in a lowered position, not allowing the retractable smoke detector 1204 to be retracted to the ceiling. Installing a battery 2002 in the battery compartment 1206 will release the ratchet lock 7002 open because the battery 2002 compresses the lever rotating the ratchet lock 7002 open thus allowing the cable 802 to not be pinched, which allows the retractable smoke detector 1204 to be retracted to the ceiling. This is a safety feature, as most smoke detectors have, requiring a battery 2002 to be installed order to attach the retractable smoke detector 1204 to the ceiling. In other words, when the battery 2002 is removed from the battery compartment 1206, the ratchet lock 7002 will pinch the cable 802. A battery 2002 must be installed to release the ratchet lock 7002 from pinching the cable 802 in order to allow the retractable smoke detector 1204 to retract to the ceiling.

Noting the tether 6402, as most smoke detectors today have a tether 6402 that can be pulled to extract the battery 2002 from the housing. The tether improves ease and convenience of removal of the battery 2002, rather than using fingers to dig the battery 2002 out of the housing pocket.

Figure 72:
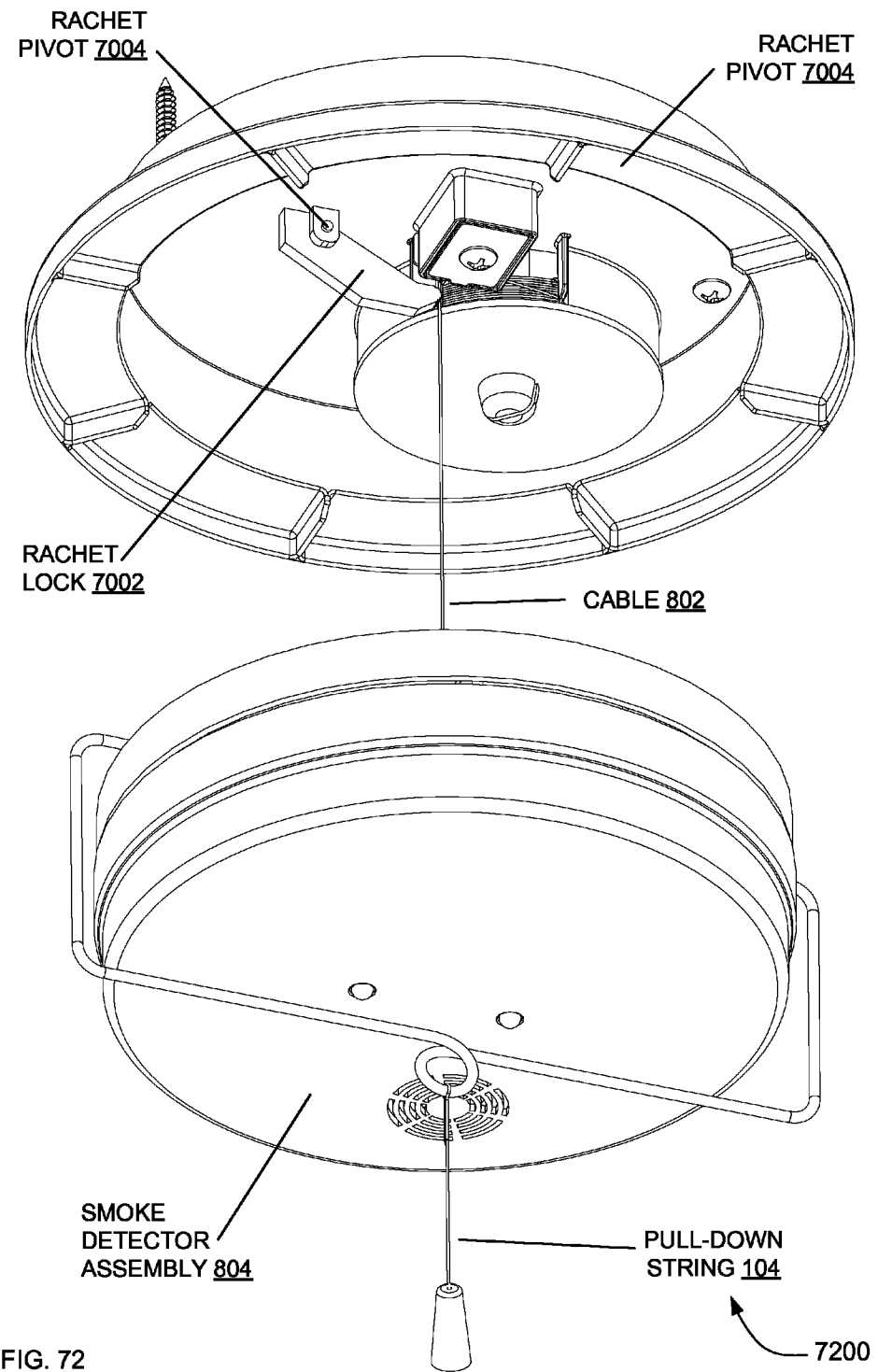

FIG. 72 illustrates the retractor being lowered, the ratchet lock 7002 is open, allowing the pull-down string 104 to extend and lower the retractable smoke detector 1204.

Figure 73:
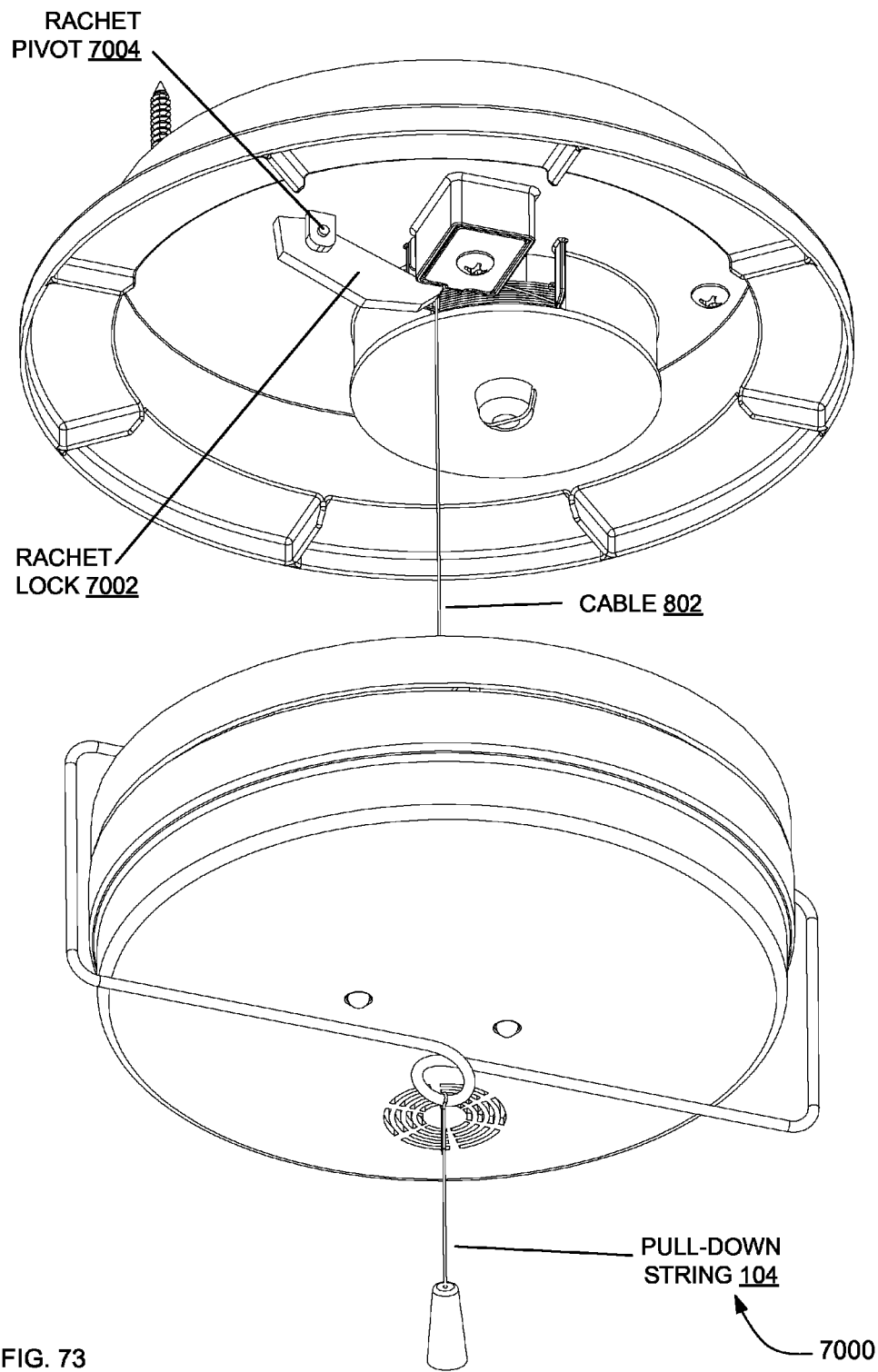

FIG. 73 illustrates the retractable smoke detector 1204 in a locked position, the ratchet lock 7002 has pivoted and pinched the pull-down string 104 not allowing the pull-down string 104 to retract the retractable smoke detector 1204, at this time the operator can let go of the pull-down string 104, and the retractable smoke detector 1204 is lowered in a locked position.

Figure 74:
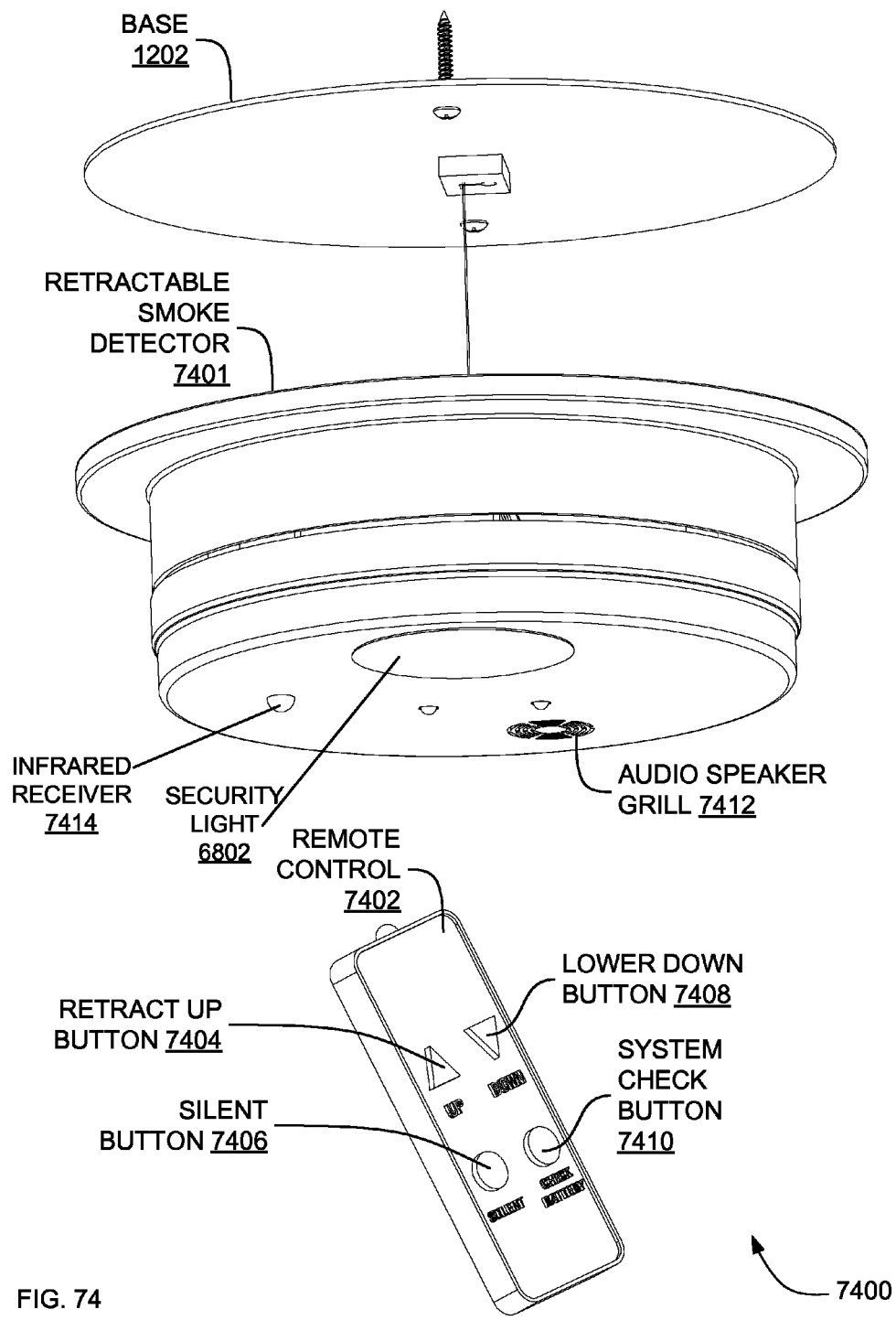
FIG. 74-76 illustrate a retractable smoke detector and a remote control device of the retractable smoke detector.
Figure 75:
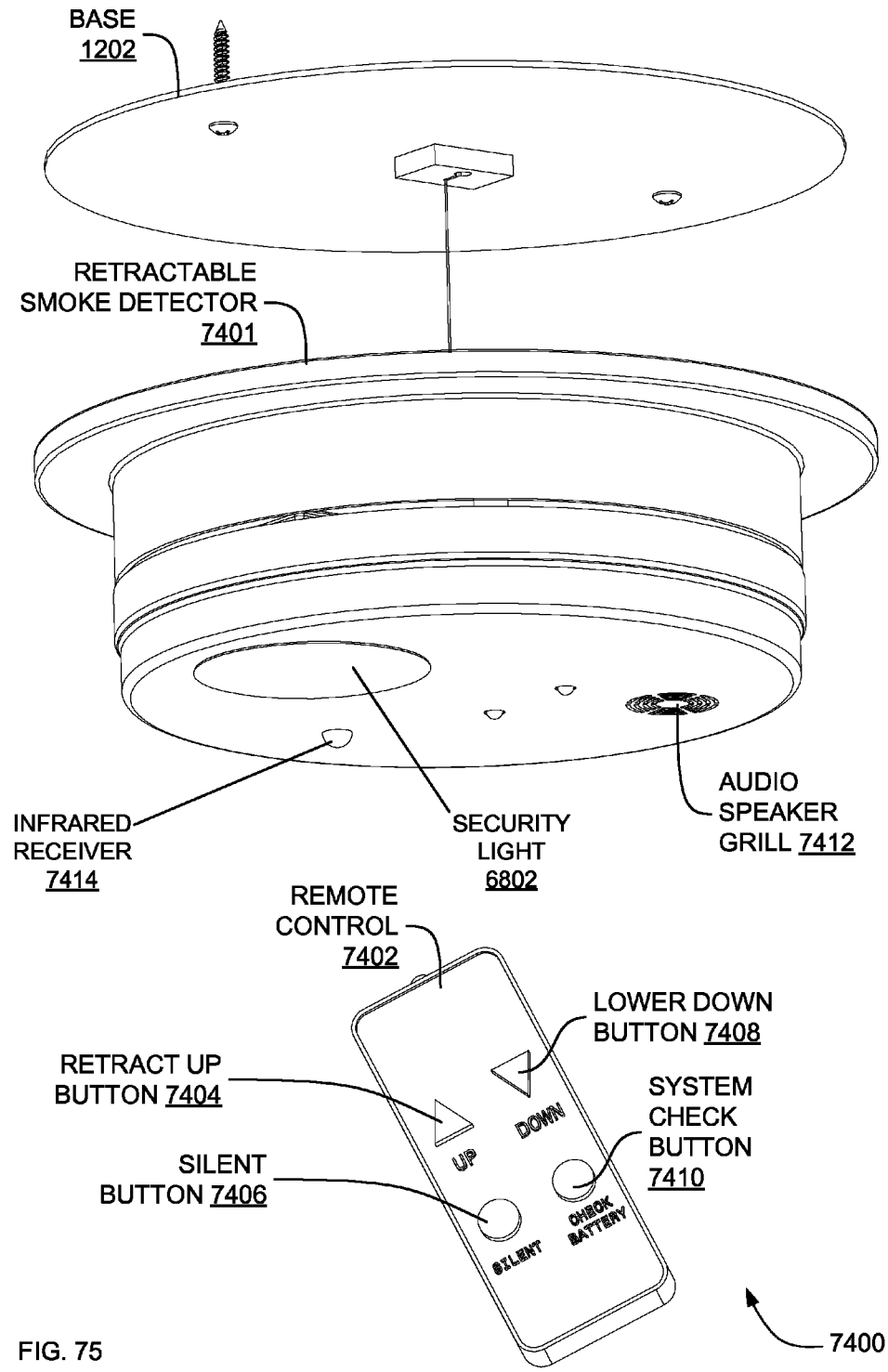
Figure 76:
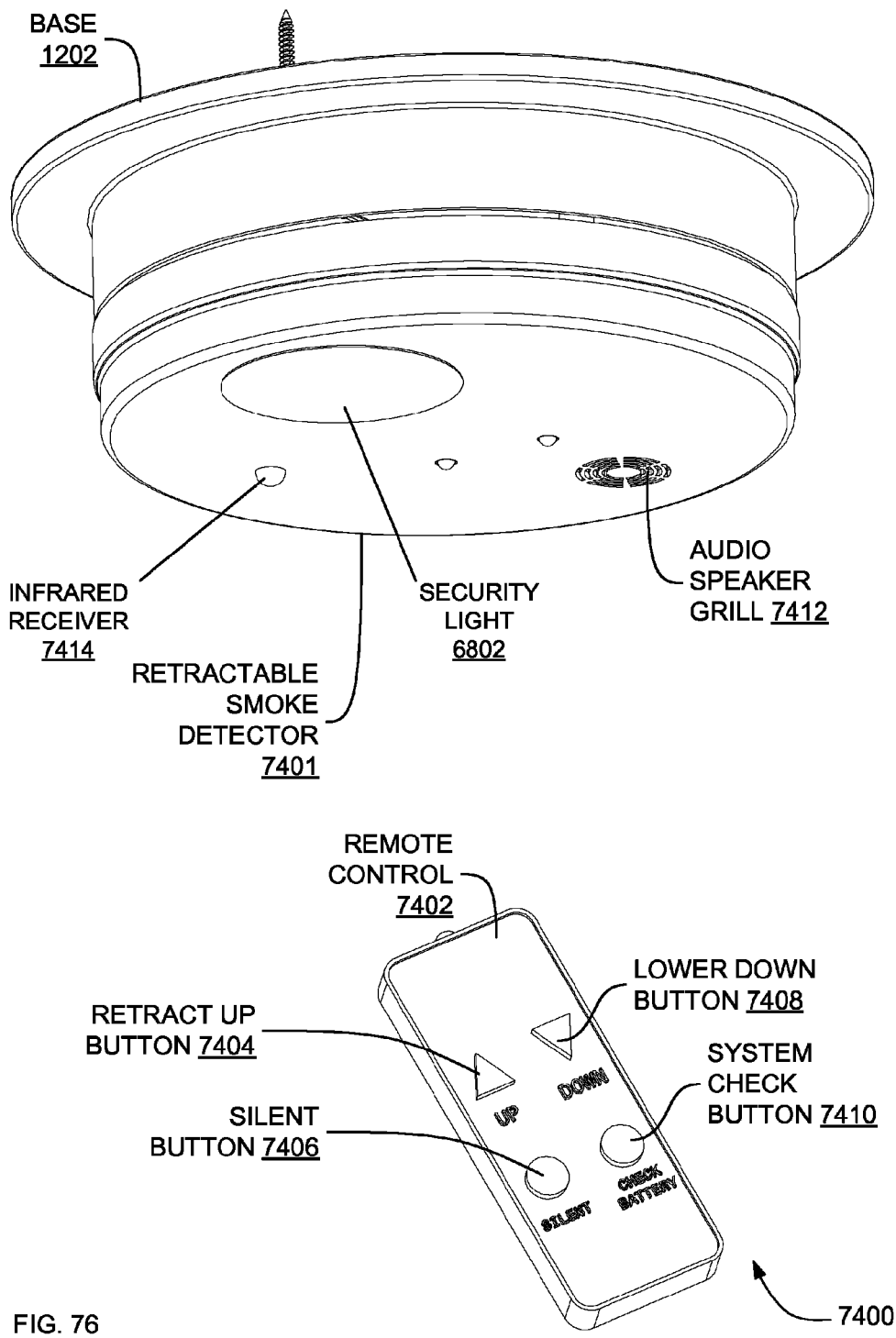

FIG. 74-76 include a retractable smoke detector 7401 and a remote control device 7402 of the retractable smoke detector. The remote control device 7401 transmits an infrared signal or other electromagnetic signal to the retractable smoke detector 7401 in accordance with operation of buttons on the remote control device 7402, such as a retract up button 7404 that instructs or commands the retractable smoke detector 7401 to retract upward towards the base 1202, a silent operation button 7406 that instructs the retractable smoke detector 7401 to mute all audio output from the retractable smoke detector 7401, a lower down button 7408 that instructs or commands the retractable smoke detector 7401 to extend downward from the base 1202 and a system check button 7410 that instructs or commands the retractable smoke detector 7401 to check the battery by triggering an audible beep and/or to briefly actuate/activate (e.g. flash) the security light of the retractable smoke detector 7401 one, two or more times.

CONCLUSION

A retractable environmental detector assembly is described. A technical effect of the retractable environmental detector assembly is extension and retraction of the retractable environmental detector from and to a base or retractor that can be mounted to a ceiling. Although specific implementations are illustrated and described herein, it will be appreciated by those of ordinary skill in the art that any arrangement which is calculated to achieve the same purpose may be substituted for the specific implementations shown. This application is intended to cover any adaptations or variations. For example, although described in terms of a retractable environmental detector, one of ordinary skill in the art will appreciate that implementations can be made in for any environmental detector or any other detector, such as a smoke detector, a heat detector or a CO2 detector.

In particular, one of skill in the art will readily appreciate that the names of the methods and apparatus are not intended to limit implementations. Furthermore, additional methods and apparatus can be added to the components, functions can be rearranged among the components, and new components to correspond to future enhancements and physical devices used in implementations can be introduced without departing from the scope of implementations. One of skill in the art will readily recognize that implementations are applicable to future retractable environmental detectors, different circuitries, and new environmental sensors.

The terminology used in this application meant to include all environments and alternate technologies provide the same functionality as described herein.

The invention claimed is:

1. An apparatus comprising:
a housing, wherein the housing does not include environmental detector circuitry;
a retractor mounted in the housing; and
an environmental detector that is moveably attached to the retractor and that includes the environmental detector circuitry, wherein the retractor further comprises an electric motor.

2. The apparatus of claim 1, wherein the retractor further comprises:
a clockspring.

3. The apparatus of claim 2 further comprising:
an object attached to an exterior of the environmental detector, the object having a rotatable U-coupling.

4. The apparatus of claim 1 further comprising:
an object attached to an exterior of the environmental detector, the object having a string.

5. The apparatus of claim 1, wherein the retractor further comprises:
an rotating member.

6. The apparatus of claim 1, wherein the environmental detector is not in the housing.

7. The apparatus of claim 1, wherein a flexible connector is attached to the retractor.

8. The apparatus of claim 1, wherein the environmental detector further comprises:
a battery compartment.

9. The apparatus of claim 1, wherein the environmental detector circuitry further comprises:
an audible warning speaker and operational switches.

10. An apparatus comprising:
a retractor; and
an environmental detector that is moveably attached to the retractor and that includes environmental detector circuitry, wherein the environmental detector includes an arm that is attached to a top of the environmental detector, wherein the retractor further comprises an electric motor.

11. The apparatus of claim 10, wherein the retractor further comprises:
a clockspring.

12. The apparatus of claim 10 further comprising:
a string attached to the arm.

13. The apparatus of claim 10, wherein the retractor further comprises:
a rotating member.

14. The apparatus of claim 10, wherein the environmental detector is not in the retractor.

15. The apparatus of claim 10, wherein a flexible connector is attached to the retractor.

16. The apparatus of claim 10, wherein the environmental detector further comprises:
a battery compartment.

17. The apparatus of claim 10, wherein the environmental detector circuitry further comprises:
an audible warning speaker and operational switches.

18. An apparatus comprising:
a retractor, wherein the retractor does not include environmental detector circuitry; wherein the retractor includes a friction lock; and
an environmental detector that is moveably attached to the retractor and that includes the environmental detector circuitry wherein the retractor further comprises: an electric motor.

* * * * *